United States Patent [19]
Uramoto et al.

[11] Patent Number: 5,699,117
[45] Date of Patent: Dec. 16, 1997

[54] MOVING PICTURE DECODING CIRCUIT

[75] Inventors: Shinichi Uramoto; Akihiko Takabatake, both of Hyogo, Japan

[73] Assignee: Mitsubishi Denki Kabushiki Kaisha, Tokyo, Japan

[21] Appl. No.: 601,273

[22] Filed: Feb. 14, 1996

[30] Foreign Application Priority Data

Mar. 9, 1995 [JP] Japan ................... 7-049798

[51] Int. Cl.⁶ ................................................ H04N 7/26
[52] U.S. Cl. ................................ 348/390; 348/845.3
[58] Field of Search ......................... 348/384, 390, 348/403, 409, 415, 416, 420, 423, 402, 467, 845.2, 845.3; 358/444, 426, 261.2, 261.3, 261.4; 382/233

[56] References Cited

U.S. PATENT DOCUMENTS

| | | | |
|---|---|---|---|
| 5,291,306 | 3/1994 | Watanabe et al. | 358/444 |
| 5,440,345 | 8/1995 | Shimoda | 348/402 |
| 5,469,273 | 11/1995 | Demura | 358/426 |
| 5,579,052 | 11/1996 | Artieri | 348/416 |

FOREIGN PATENT DOCUMENTS

| | | |
|---|---|---|
| 0 503 956A | 9/1992 | European Pat. Off. . |
| 0 572 263A | 12/1993 | European Pat. Off. . |

OTHER PUBLICATIONS

Tatsuhiko Demura et al, A Single–Chip MPEG2 Video Decoder LSI, ISSCC 94, Digest of Technical Papers, pp. 72–73, IEEE, 1994.

Querol, M., "MPEG/H261–Videodecoder MIT Wenigen Chips", Elektronik, Vo., 41, No. 23, 9 Nov. 1992, pp. 72–75.

Sun and Zdepski, "Error Concealment Strategy for Picture––Header Loss in MPEG Compressed Video", Proceedings of the Spie, vol. 2188, Feb. 1994, pp. 145–152.

European Search Report dated Apr. 11, 1997.

*Primary Examiner*—Amelia Au
*Attorney, Agent, or Firm*—Lowe, Price, LeBlanc & Becker

[57] ABSTRACT

When a macro block synchronizing signal indicating starting of processing is asserted in processing of one processing section which is formed by a macro block header and a macro block, block data of the macro block are decoded in synchronization with the assertion of MBSYNC, and next macro block header information is analyzed in continuation in the processing section. The assertion of the next MB synchronizing signal is stopped until prescribed conditions are established. Processing of the block data of the macro blocks is regularly executed from starting of one processing section, whereby utilization efficiency of operational processors is improved.

32 Claims, 33 Drawing Sheets

FIG. 23

ERROR GENERATION

| MB#1 | MB#2 | MB#3 | MB#4 | MB#5 | MB#6 | MB#7 | MB#8 |
|------|------|------|------|------|------|------|------|
| MB#9 | MB#10 | MB#11 | MB#12 | MB#13 | MB#14 | MB#15 | MB#16 |
| MB#17 | MB#18 | MB#19 | MB#20 | MB#21 | MB#22 | MB#23 | MB#24 |
| MB#25 | MB#26 | MB#27 | MB#28 | MB#29 | MB#30 | MB#31 | MB#32 |

MOVING PICTURE DECODING CIRCUIT

BACKGROUND OF THE INVENTION

1. Field of the Invention

The present invention relates to a picture decoding circuit for expanding compressed picture data and restoring uncompressed picture data, and more particularly, it relates to a moving picture decoding circuit for expanding picture data which are compressed in accordance with a moving picture compression system employing orthogonal transformation and inter-frame/inter-field predictive encoding.

2. Description of the Background Art

There has been proposed a system of encoding an enormous quantity of picture data in high efficiency to reduce the amount of data for transmission and decoding the transmitted picture data encoded in high efficiency thereby restoring the original pictures. Such picture data processing systems include the MPEG (moving picture experts group) standard, which is directed to moving pictures. While the system of encoding pixel data under the MPEG standard is well known in the art, the system of encoding picture data along the MPEG standard is now described, in order to facilitate understanding of the background of the present invention.

FIG. 27 schematically illustrates the structure of a general picture data encoding unit along the MPEG standard. Referring to FIG. 27, the encoding unit includes a subtracter 1000 which obtains difference between input pixel data and corresponding pixel data (reference pixel data) of a predicative picture, a DCT converter 1002 performing discrete cosine transformation (DCT) processing, which is one of orthogonal transformation processing methods, on a signal (prediction error signal) outputted from the subtracter 1000, and a quantizer 1004 which quantizes a signal (DCT coefficient) outputted from the DCT converter 1002.

As described later in detail, pictures include various types such as I, P and B pictures, and prediction systems are varied depending on the types of the pictures. The I pictures are subjected to intra-frame or intra-field encoding, so that input pixel data themselves are encoded. The P pictures are subjected to inter-frame or inter-field predictive encoding from past reproduced pictures. The B pictures are predicted through either or both of past reproduced pictures and future reproduced pictures (frame or field). The B pictures are predictively encoded (prediction-encoded) using the I and P pictures. The B pictures are not employed as reference pictures.

In the case of inter-frame or inter-field prediction, motion compensation is carried out. Blocks in prediction pictures having the highest correlation with blocks (segments serving as processing units) of the current picture are obtained so that predictive encoding is carried out using the blocks having the highest correlation. Displacements between the current and prediction picture blocks are obtained as motion vectors, which are appended to respective pixel data blocks and transmitted. In general, the motion compensation is executed in units of blocks (segments) of 16 by 16 pixels.

The DCT converter 1002 generally executes DCT processing in units of blocks of 8 by 8 pixels. Spatial redundancy (high correlation between adjacent pixels) in the pictures is reduced by the DCT processing. Namely, it is possible to make DCT coefficients localized in a low-frequency coefficient region by carrying out the DCT processing in the DCT converter 1002, thereby enabling reduction of the picture data quantity through processing by quantizer 1004 at the next stage.

In a quantization table 1012, great values are set for high-frequency components. The quantizer 1004 quantizes the DCT coefficients received from the DCT converter 1002 with reference to the quantization table 1012, whereby low-frequency components can be increased in value and high-frequency components can be substantially zeroed in both of horizontal and vertical directions in the spatial frequencies. Thus, the data quantity is reduced.

The encoding unit further includes a zigzag scanner 1006 which sequencizes the quantized data received from the quantizer 1004 in prescribed order in a zigzag fashion, a variable length encoder 1008 which variable-length encodes the data received from the zigzag scanner 1008, and a transmission encoding circuit 1010 which receives the variable-length encoded data from the variable length encoder 1008, motion vector information from a motion vector detector (not shown) and information indicating attributes of other blocks and variable-length encodes the motion vector information and the attribute information in accordance with a prescribed format for outputting while adding error code words etc. thereto.

As shown in a block 1015 on the left side of FIG. 27, the zigzag scanner 1006 sequencizes 8 by 8 DCT coefficients in a zigzag manner successively from the upper left portion to the lower right portion (i.e., high-frequency component region). Among the DCT coefficients shown in the DCT coefficient block 1015 of FIG. 27, the uppermost left one is called a DC coefficient indicating the average value of data of block of 8 by 8 pixels, while the remaining DCT coefficients are called AC coefficients. Nonzero coefficients are efficiently caught by zigzag-scanning the DCT coefficients by the zigzag scanner 1006.

The variable length encoder 1008 successively two-dimensionally variable-length encodes the quantized DCT coefficients received from the zigzag scanner 1006 with respect to both the number (runs) of precedent zero coefficients (null coefficients) and values (levels) of the nonzero coefficients (significant coefficients). This variable length encoder 1008 variable-length encodes the quantized DCT coefficient data received from the zigzag scanner 1006 through a coding table 1014 which is developed along Huffman codes, for example. In the quantized DCT coefficients, many zeros are present in high-frequency components, and many of significant coefficients are present in low-frequency components. Codes of small lengths are allotted to the significant coefficients while codes of large code lengths are allotted to quantized coefficients having small appearance frequencies, thereby further reducing the data quantity.

FIG. 28 illustrates exemplary arrangement of pictures transmitted from the transmission encoding circuit 1010 shown in FIG. 27. 13 pictures having picture numbers 1 to 13 are illustrated in FIG. 28. The pictures of Nos. 1 and 13 are I pictures, and the pictures of Nos. 4, 7 and 10 are P pictures. Two B pictures are inserted between an I picture and a P picture or between a pair of P pictures. The I pictures are subjected to only intra-frame encoding with no predictive encoding. The P pictures are subjected to inter-frame or inter-field predictive encoding (with motion compensation), and the B pictures are bidirectionally prediction-encoded (with motion compensation), for example. The I pictures (I), the P pictures (P) and the B pictures (B) may be field pictures, or frame pictures. In prediction of the B pictures (B), interpolation is carried out with I and P pictures or P pictures which are precedent and subsequent thereto in time base, for example. The P pictures are subjected to predictive encoding (with motion compensation) with I pictures (I) or P pictures (P) which are precedent thereto in time base. Only the I and P pictures are employed as predictive pictures, while the B pictures (B) are not employed as predictive pictures.

FIG. 29 illustrates the structure of one picture. Referring to FIG. 29, a single picture (field or frame) 1020 is divided into a plurality of segments called macro blocks. For the purpose of simplification, the picture 1020 is divided into 32 macro blocks MB#1 to MB#32 in FIG. 29, for example. Processing of a moving picture is executed in units of the segments called macro blocks (in both of encoding and decoding). Each of the macro blocks MB#1 to MB#32 generally includes 256 pixels which are arranged in horizontal 16 pixels by vertical 16 pixels. Therefore, the picture shown in FIG. 29 is formed by 128 by 64 pixels.

FIG. 30 schematically illustrates the structure (syntax) of a bit stream (plural bit widths) of picture data. Referring to FIG. 30, the bit stream is divided into a plurality of layers including a sequence layer, a GOP (group of pictures) layer, a picture layer, a slice layer, a macro block layer and a block layer.

The block layer is formed by a block 1100 including a region 1100a including DCT coefficients, and a region 1100b storing an End Of Block (EOB) indicating an end of the block. The region 1100a stores DCT coefficient data of pixels of 8 rows and 8 columns serving as a unit of DCT processing. If the final AC coefficient of the region 1100a is a nonzero coefficient in this block 1100, the end of block of the region 1100b may not be employed.

The macro block includes a prescribed number of (six) blocks 1100. The macro block on the bit stream includes data blocks formed by the blocks 1100, and a macro block header 1115 for variable-length encoding and storing data attributes, a motion vector etc. of the data blocks.

The slice layer includes slices 1120, each of which is formed by one or a plurality of macro blocks 1100 concatenated in picture scan order. A slice header 1125 storing information indicating a vertical position of the slice on the screen and information such as a start code having a prescribed pattern indicating starting of the slice is provided at the head of the slice 1120. This slice layer, which is the lowermost layer among those to which codes of prescribed patterns are allotted, is employed as the unit of resynchronization in error generation.

The picture layer includes pictures 1130, each of which is formed by a plurality of slices 1120. A picture header 1135 storing information indicating the type of the picture (I picture, P picture etc.) and information such as a start code indicating starting of the picture in a variable length symbol (variable length code word) is arranged at the head of the picture 1130.

The GOP layer includes GOPs 1140 each including a plurality of pictures 1130. Each of the pictures 1130 included in each GOP 1140 includes at least one I picture and zero or a plurality of P or B pictures. A GOP header 1145 storing information such as a GOP start code, a flag indicating that this GOP requires no reference from picture data of a precedent GOP etc. is arranged at the head of the GOP 1140.

The sequence layer includes sequences 1150, each of which is formed by one or a plurality of GOPs 1140 or one or a plurality of pictures 1130. A sequence header 1155 storing information such as the screen format is arranged at the head of the sequence 1150. This sequence header 1155 can be arranged at the head of every GOP 1140 included in the sequence 1150 (for allowing reproduction of pictures from an intermediate stage of the sequence). The sequence header 1155 stores information such as a start code having a prescribed pattern indicating starting of the sequence, horizontal and vertical sizes of the pictures, a picture rate (picture display rates), a bit rate and contents thereof etc.

FIG. 31 illustrates the relation between each picture and the slices. As shown in FIG. 31, a single picture 1130 includes a plurality of slices 1120. The slice 1120, which can have an arbitrary length, returns to the left end upon reaching the right end on the screen.

FIG. 32 illustrates the data block structure of each macro block 1110. The macro block 1100 includes regions 1100aa to 1100ad storing DCT coefficient data Y1 to Y4 for regions obtained by dividing the macro block into four portions, and blocks 1100ae and 1100af including subsampled chrominance signals Cb5 and Cb6 respectively. The chrominance blocks 1100ae and 1100af are subsampled in the vertical and horizontal directions, whereby the four luminance blocks 1100aa to 1100ad and one chrominance block 1100ae (or 1100af) have the same dimensions on the screen. Motion compensation is executed in units of the macro blocks 1110 (MB) each of 16 by 16 pixels, while DCT processing is executed in units of blocks each of 8 by 8 pixels.

FIG. 33 schematically illustrates the structure of a conventional picture decoding circuit 1200. The picture decoding circuit 1200 shown in FIG. 33 expands picture data which are encoded by the encoding unit shown in FIG. 27 and restores the original picture data.

Referring to FIG. 33, the picture decoding circuit 1200 includes a FIFO interface 1210 receiving an incoming bit stream (plural bit width) and storing/reading the same in/from an external memory 1230 in a FIFO (first-in first-out) fashion, a variable length decoder 1212 variable-length decoding pixel data which are supplied through the FIFO interface 1210 in units of segments (macro blocks) and generating quantized DCT coefficient data (quantized indices) of fixed length data, an inverse quantizer 1214 inverse-quantizing the data outputted from the variable length decoder 1212 and generating DCT coefficient data, a scan converter 1216 sequencing the data outputted from the inverse quantizer 1214 for generating DCT coefficient data which are arranged in scan order, an inverse discrete cosine converter 1218 executing inverse discrete cosine transformation, which is one of inverse orthogonal transformation methods, on the data outputted from the scan converter 1216, and a pixel reconfigurator 1220 receiving pixel data (differential data) outputted from the inverse discrete cosine converter 1218 and predictive picture pixel data supplied from the external memory 1230 through a memory interface 1224 for restoring (reconfigurating) original pixel data.

The FIFO interface 1210 accesses the external memory 1230 through the memory interface 1224 to store/read the incoming bit stream in the FIFO fashion thereby buffering the incoming bit stream and eliminating difference between the bit rate thereof and the data processing rate in the picture decoding circuit 1200.

The variable length decoder 1212 detects headers of respective layers from the bit stream supplied through the FIFO interface 1210, analyzes the detected headers, and executes data processing of respective blocks (blocks included in macro blocks) in accordance with the results of the analysis. Thus, the variable length decoder 1212 executes a header analysis operation and variable length decoding processing of quantized DCT coefficients. This variable length decoding processing includes processing of restoring quantized DCT coefficients of fixed lengths from variable-length encoded run-length data.

The inverse quantizer 1214 inverse-quantizes the quantized DCT coefficients received from the variable length decoder through quantized data of a quantization table (quantization matrix: not shown) to restore or reconstruct the DCT coefficients. This quantization matrix may be written in a quantization table which is included in the inverse quantizer 1214 through the variable length decoder 1212.

The scan converter 1216 receives zigzag-scanned DCT coefficient data, shown in FIG. 27, which are supplied from the inverse quantizer 1214, and re-arranges the scan order thereof to the original order. The inverse discrete cosine converter 1218 performs inverse discrete cosine transformation processing on the DCT coefficient data which are supplied from the scan converter 1216, and restores prediction-encoded data. The pixel reconfigurator 1220 reads necessary prediction picture pixel data from the external memory 1230 through the memory interface 1224 in accordance with motion vector data and macro block attribute data from the variable length decoder 1212, adds up the read pixel data with the differential pixel data supplied from the inverse discrete cosine converter 1218 to reconfigure original pixel data, and restores the original pixel data for storing the same in the external memory 1230 through the memory interface 1224.

The processing in the pixel reconfigurator 1220 is varied in correspondence to the I, P and B pictures. In the case of pixel data of pictures such as I pictures which are subjected to intra-frame encoding, pixel data supplied from the inverse discrete cosine converter 1218 are picture data themselves and no predictive encoding is carried out, and hence the pixel reconfigurator 1220 writes the pixel data which are supplied from the inverse discrete cosine converter 1218 in the external memory 1230 through the memory interface 1224. In case of pixel data of P or B pictures which are subjected to inter-frame or inter-field predictive encoding, pixel data which are supplied from the inverse discrete cosine converter 1218 to the pixel reconfigurator 1220 are prediction error signals which are provided by the difference with reference to already decoded pixel data (predictive picture data). In this case, therefore, the pixel reconfigurator 1220 adds up corresponding predictive picture pixel data from the external memory 1230 and the pixel data from the inverse discrete cosine converter 1218 with each other, and writes the results of the addition in the external memory 1230 through the memory interface 1224 again.

The picture data written in the external memory 1230 are read in the raster scan order through the memory interface 1224, and supplied to a display unit through a picture display control circuit (not shown) through a pixel bus interface 1222.

The aforementioned series of processing is executed in units of segments, similarly to the case of encoding. The inverse quantizer 1214, the scan converter 1216, the inverse discrete cosine converter 1218 and the pixel reconfigurator 1220 are pipelined, in order to process the picture data at a high speed.

A control circuit 1226 controls the access to the external memory 1230 and starting and stoppage of the pipeline stage.

FIG. 34 illustrates storage areas of the external memory 1230 shown in FIG. 33. This external memory 1230 is formed by a DRAM (dynamic random access memory), for example, and includes a FIFO area 1232 storing an externally supplied bit stream in the FIFO fashion, a reference picture area 1234 storing reference (prediction) picture pixel data employed for prediction decoding (DPCM decoding) processing in the pixel reconfigurator 1230 (FIG. 33), and a display picture area 1236 storing display picture data to be displayed on a display unit through the display control circuit (not shown in FIG. 33). The FIFO area 1230 is generally called a rate buffer for rate adjustment for absorbing difference between the bit rate of the incoming bit stream and the data processing speed in the picture decoding circuit 1200 (FIG. 33). Due to the employment of the FIFO area 1232, it is possible to compensate for difference in code quantity required in a unit time in picture expansion processing due to processing of variable length-code word data while the transmission rate of the incoming bit stream is kept substantially constant.

FIG. 35 illustrates an exemplary timing chart in relation to control of the picture decoding circuit shown in FIG. 33. This figure shows a picture synchronizing signal which is a synchronizing signal indicating starting of an operation in units of frame or field pictures, and an MB synchronizing signal which is a synchronizing signal indicating starting of an operation in units of segments. The picture synchronizing signal, which is a vertical synchronizing signal, for example, is supplied to the control circuit 1226 shown in FIG. 33 from the display control circuit (not shown). The control circuit 1226 outputs the MB synchronizing signal in synchronization with the picture synchronizing signal. The cycle of the picture synchronizing signal has a constant value which is decided by a display rate of decoded picture data (pixel data read through the pixel bus interface 1222 shown in FIG. 32) on the display unit. This display rate is decided by a level in the MPEG standard. The maximum values of the number of horizontal pixels, the number of vertical pixels and the frame frequencies are standardized in the "level". In a single picture, the number of divided macro blocks is previously determined. Therefore, the number of MB synchronizing signals asserted in a picture synchronizing signal cycle is determined by the pixel number of the picture, i.e., the number of macro blocks in a single picture. This MB synchronizing signal is supplied to each circuit of the picture decoding circuit 1220 from the control circuit 1226 shown in FIG. 33, so that each circuit executes prescribed processing synchronously.

FIG. 36 is a timing chart showing processing which is carried out in a segment unit processing section. This figure shows the picture decoding circuit as a decoder. An operation of this picture decoding circuit (decoder) is started in synchronization with the MB synchronizing signal. The variable length decoder 1212 (see FIG. 33) is activated in synchronization with the MB synchronizing signal to detect and analyze headers from the bit stream supplied through the FIFO interface 1210, thereby deciding the processing to be subsequently executed. Then, decoding of actual data (hereinafter referred to as decoding of block data) of respective blocks of macro blocks is carried out in accordance with the processing operation decided by the header analysis.

In parallel with the decoding operation in the decoder, executed is access to the external memory 1230, including writing of the bit stream in the FIFO area 1232 shown in FIG. 34, reading of pixel data from the FIFO area 1232 as to the bit stream to be decoded, writing of the decoded picture data in the reference picture area 1234 or the display picture area 1236 (B pictures are not employed as reference (prediction) pictures), reading of data from the display picture area 1236 of the external memory for display of the picture data, and reading of predicting picture data employed for predictive encoding/decoding processing in the pixel reconfigurator 1220 from the reference picture area 1234.

FIG. 36 also shows the processing operation of a single macro block. In the following description, it is assumed that the term "segment" includes both of a macro block including a plurality of blocks, and a macro block header including attribute data of the macro block, and the term "macro block" simply includes a plurality of data blocks.

A header analysis part decodes a header part of the segment, and decides processing to be subsequently executed and attributes of the macro block to be processed. After the decoding of the header part of the macro block, luminance signals (Y signals) and chrominance signals Cb and Cr of respective blocks of the macro block are decoded. At this time, an operation of reconfiguring motion vectors from those obtained by the decoding of the macro block header part is carried out in parallel (a plurality of motion vectors are employed in the case of B pictures). An exemplary decoding operation of such a decoder is described in "A Single-Chip MPEG2 Video Decoder LSI" by Demura et al., ISSCC 94, Digest of Technical Papers, pp. 72 to 73, FIG. 2, for example. In the case of this processing, therefore, the time required for the header analysis depends on the length of the header part, and hence the period of the MB synchronizing signal, i.e., the time length of a single processing section differs for different processing sections.

In the picture decoding circuit, the bit stream is processed in units of segments. As shown in FIG. 30, headers are provided on heads of the respective layers excluding the block layer. Start codes indicating starting of the layers are arranged on the head portions of the headers. Each start code 1300 has a width of 32 bits which are arranged in units of bytes, as shown in FIG. 37.

Referring to FIG. 37, the start code 1300 includes a 3-byte prefix 1310 having a prescribed pattern indicating that this is a start code, and a 1-byte layer start code 1320 having a pattern which is specific to each layer. For example, a start code indicating starting of a picture layer of the MPEG2 standard has the following pattern:

0000 0000 0000 0000 0000 0001 0000 0000 while a start code indicating starting of a sequence layer has the following pattern:

0000 0000 0000 0000 0000 0001 1011 0011 In the aforementioned start codes, the prefix is formed by upper 24 bits (3 bytes), and the layer start code is formed by a lower byte (8 bits).

In the MPEG2 standard, header information is arranged following the start code in each layer which is higher in order than the macro block layer. No start code is arranged on the macro block layer. The header information is fixed length data, while detailed description thereof is omitted. The header (macro block header) of the macro block layer includes variable-length encoded information.

FIG. 38 illustrates an exemplary structure of a macro block header 1350. Referring to FIG. 38, the macro block header 1350 includes a macro block address area 1352 storing information (a macro block address) indicating the position of the macro block on the screen and the number of macro blocks to be skipped (macro block address increment), an area 1354 storing a macro block type indicating a method of processing the macro block, an area 1356 storing motion vectors of the macro block, and a CBP area 1358 storing CBP (coded block pattern) indicating whether or not respective blocks of the macro block other than in I pictures include DCT coefficient data.

The macro blocks which are skipped by the macro block address increment are those having no codes of DCT coefficients among those subjected to no motion compensation as to P pictures, for example. The macro block type stored in the area 1354 includes information as to whether or not the macro block is subjected to intra-frame/intra-field predictive encoding, whether or not the same is subjected to motion compensation, and the like.

The motion vector area 1356 stores motion vectors in the case of motion compensated prediction. In the case of I pictures, no motion vectors are stored in the motion vector area 1356. In relation to P pictures, on the other hand, motion vectors along a prediction system (odd and even fields (top and bottom fields) in the case of frame predictive encoding system) can be employed. Also as to B pictures, the number of employed motion vectors varies according to the prediction system. Therefore, the bit width of the motion vector storage area 1356 differs for different segment. Therefore, a block as to which the information stored in the CBP area 1358 indicates inclusion of no DCT coefficient data is absent in data transmission.

The information included in the respective areas 1352, 1354, 1356 and 1358 of the macro block header 1350 is entirely expressed by variable length code words (variable length symbols). Therefore, the time required for entirely analyzing the information of the macro block header 1350 varies according to the attributes of the macro blocks (the method of processing, the number of the motion vectors etc.).

It is possible to specify what processing is carried out on the macro block following the macro block header 1350 by analyzing the header information. In general, analysis of the information of the macro block header 1350 is started in synchronization with the MB synchronizing signal (MBSYNC) as shown in FIG. 36, so that decoding of the macro block data is performed only after the information of the macro block header 1350 is entirely analyzed. Namely, a code decoding part of the variable length decoder 1212, the inverse quantizer 1214, the scan converter 1216, the inverse discrete cosine converter 1218 and the pixel reconfigurator 1220 shown in FIG. 33 are kept in operation stoppage states after the MB synchronizing signal (MBSYNC) is asserted until the information of the macro block header 1350 is entirely analyzed, and these operational processors are brought into operating states only after the macro block header information is entirely analyzed. FIG. 39 illustrates such a state that headers of macro blocks MB#A, MB#B and MB#C are completely analyzed at times Ta, Tb and Tc respectively, and then block data are decoded, for example.

Therefore, when a long time is required for the header analysis in the macro block MB#C, for example, the operation stoppage times of the operational processors following the variable length code decoder are so increased that utilization efficiency of the operational processors is reduced and the picture data cannot be decoded at a high speed.

In order to prevent such reduction in utilization efficiency of the operational processors, the operational processing may conceivably be carried out in a pipeline manner.

FIG. 40 schematically illustrates a pipeline which is defined by respective stages of operational processors from an inverse quantizer to a pixel reconfigurator. In the structure shown in FIG. 40, variable-length decoded data having header analyzed are dispatched into the pipeline every assertion of MB synchronizing signal MBSYNC. Inverse quantization, scan conversion, inverse DCT and pixel decoding stages in the pipeline stages process the supplied data in a pipeline mode respectively.

When header analysis and variable length decoding of the segment (the macro block header and the macro block) MB#A are completed and a next MB synchronizing signal MBSYNC is asserted, the respective block data of the macro block MB#A are dispatched into the pipeline and successively processed.

If a long time is required for header analysis of the next segment MB#B, data of the macro block MB#B are not yet introduced into the pipeline upon completion of data processing of the respective blocks of the macro block MB#A. Thus, vacancy is caused in the pipeline stages and pipeline utilization efficiency is reduced.

When header analysis and variable length decoding of the segment MB#B are completed, the data of variable length decoded words of the macro block MB#B are dispatched into the pipeline stages in accordance with assertion of a next MB synchronizing signal MBSYNC.

If header analysis of the next segment MB#C is completed in a short time and variable length decoding for data of respective blocks of the macro block MB#C is also quickly completed correspondingly, a next MB synchronizing signal MBSYNC is asserted following completion of the variable length decoding of the macro block MB#C. If data processing of the respective blocks of the macro block MB#B is not yet completed in the inverse quantization stage of the pipeline at this time, block data of the next macro block MB#C are dispatched during data processing of the respective blocks of the macro block MB#B. Thus, the data of the respective blocks of the macro blocks MB#B and MB#C are mixedly processed, and the data processing (expansion processing) cannot be correctly performed but breaks down. Thus, a large pipeline cannot be introduced, and improvement of utilization efficiency of the operational processors through the use of the pipeline is limited.

In a picture decoding circuit for processing moving picture data, particularly data of pictures having a large screen size of HDTV (high definition television) or the like, it is necessary to process a large quantity of data at a high speed (the frequency of a frame or a field, i.e., the cycle of this picture synchronizing signal is decided by the display speed for the picture data after expansion), and the amount of operations at operational processors (such as an inverse DCT converter, for example) in the expansion procedure becomes extremely large. In order to compensate for reduction of utilization efficiency of the operational processors and implement high-speed data processing, therefore, it is necessary to increase the operating speeds of the respective operational processors (increase the frequencies of clock signals deciding the operational processing speeds). Thus, the number of on and off times of the elements forming the operational processors and the number of charging and discharging times of signal lines per unit time are increased, leading to increase of current consumption.

As another method, it is also conceivable to provide a plurality of operational processors in parallel with each other and simultaneously drive the same in parallel with each other thereby compensating for reduction of utilization efficiency. In this case, however, the element number is disadvantageously increased to increase the device scale.

When interruption processing from an external control unit is caused during the picture expansion procedure, for example, it is necessary to initialize the picture decoding circuit after completion of the interruption. If the processing is restarted from the interrupted state, however, display is performed from an intermediate stage of the picture. In this case, it may be impossible to synchronize processing of the subsequent picture with the display on the display unit. If first picture display is executed immediately after initialization in synchronization with the picture synchronizing signal such as the vertical synchronizing signal, for example, pictures out of synchronization are thereafter displayed (boundaries between the pictures are displayed on the screen). In the MPEG standard, a sequence header is arranged on the head of each GOP (group of pictures) to allow reproduction from an arbitrary GOP. However, no processing to be executed in resetting (initialization) of the picture expansion procedure is mentioned. Further, no prior art mentions such an operation of initialization of picture expansion processing.

SUMMARY OF THE INVENTION

An object of the present invention is to provide a picture decoding circuit which can efficiently execute expansion of picture data.

Another object of the present invention is to provide a picture decoding circuit including an efficiently operating pipeline stage.

Still another object of the present invention is to provide a picture decoding circuit which is excellent in utilization efficiency of operational processors.

A further object of the present invention is to provide a picture decoding circuit which can reliably execute processing from a first macro block of a picture in resetting (in initialization and re-synchronization) without reducing processing efficiency.

A picture decoding circuit according to a first aspect of the present invention includes a header decoder receiving an incoming bit stream and analyzing information of a header of a segment, a controller generating a data processing start indication signal in response to a signal indicating completion of analysis of the segment header information from the header decoder, and a data processor which is activated in response to the data processing start indication signal for executing predetermined processing on a data block of the segment following the header. The header decoder continuously analyzes data of a header which is supplied following the data block, whereby one processing section is started from processing of the data block and ended in analysis of the header.

A picture decoding circuit according to a second aspect of the present invention includes an analyzer detecting a header of a segment from a supplied bit stream for analyzing this header information. This analyzer includes a circuit generating a signal indicating completion of analysis of all the header information.

The picture decoding circuit according to the second aspect further includes a data processor including a portion for generating fixed length code data by carrying out variable length decoding on data of a data block following the header of the segment for restoring the data of the data block in accordance with the result of analysis of the analyzer, an error detector generating an error detection signal indicating an error which is detected in the processing of either the analyzer or the variable length decoder, code detector detecting a start code having a predetermined pattern from the incoming bit stream in response to the error detection signal, an activator activating the analyzer in response to a code detection signal from the code detector, and a delayer for delaying activation of the data processor until prescribed conditions are satisfied in response to an analysis completion indication signal from the analyzer in activation of the error detector.

A picture decoding circuit according to a third aspect of the present invention includes a controller generating a processing start signal in response to a reset request signal requesting initialization of picture expansion processing, code detector detecting a start code having a predetermined pattern from an incoming bit stream in response to the processing start signal from the controller, a header analyzer detecting a segment from the incoming stream in response to a code detection signal from the code detector in code detection for analyzing information of its header and generating a signal indicating that all analysis of the head information is completed, and a stop control for stopping the operation of data processor carrying out processing of a data block of the segment until prescribed conditions are satisfied in response to the header analysis completion indication signal.

In the picture decoding circuit according to the first aspect, the header is analyzed following decoding of the data block, and starting of data processing is instructed after the header is entirely analyzed. One processing section is started at processing of the data block and ended at analysis of the header. When the data processing start is designated, the data processor immediately executes processing. Therefore, the stop period of the operational processor is reduced and the utilization efficiency thereof is improved. Further, the standby time of the operational processor is reduced, whereby the time period of one processing section can be reduced to implement high-speed processing.

In the picture decoding circuit according to the second aspect, a start code having a prescribed pattern is detected when an error is caused in a header analysis or variable length decoding process and the header of a segment following the start code is analyzed, and the start of processing of a data block following the analyzed header is delayed until a prescribed condition is satisfied after completion of the analysis. Processing is started from a prescribed segment even in occurrence of an error and the processing section is started at processing of the data block in the restarting of the processing, whereby reduction of utilization efficiency of the operational processor can be also suppressed in starting of the processing after recovery from the error. Further, it is possible to maintain such regularity that the processing section is started at decoding of the data block.

In the picture decoding circuit according to the third aspect, a start code having a prescribed pattern is detected upon request for resetting, and a header of a segment following the start code is analyzed and the subsequent processing is stopped until establishment of the prescribed condition. Also in request for resetting, processing can be reliably started from a macro block of a segment of a desired position.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 23 illustrates an error concealment processing in the operation sequence shown in FIG. 22;

DESCRIPTION OF THE PREFERRED EMBODIMENTS

Figure 1:
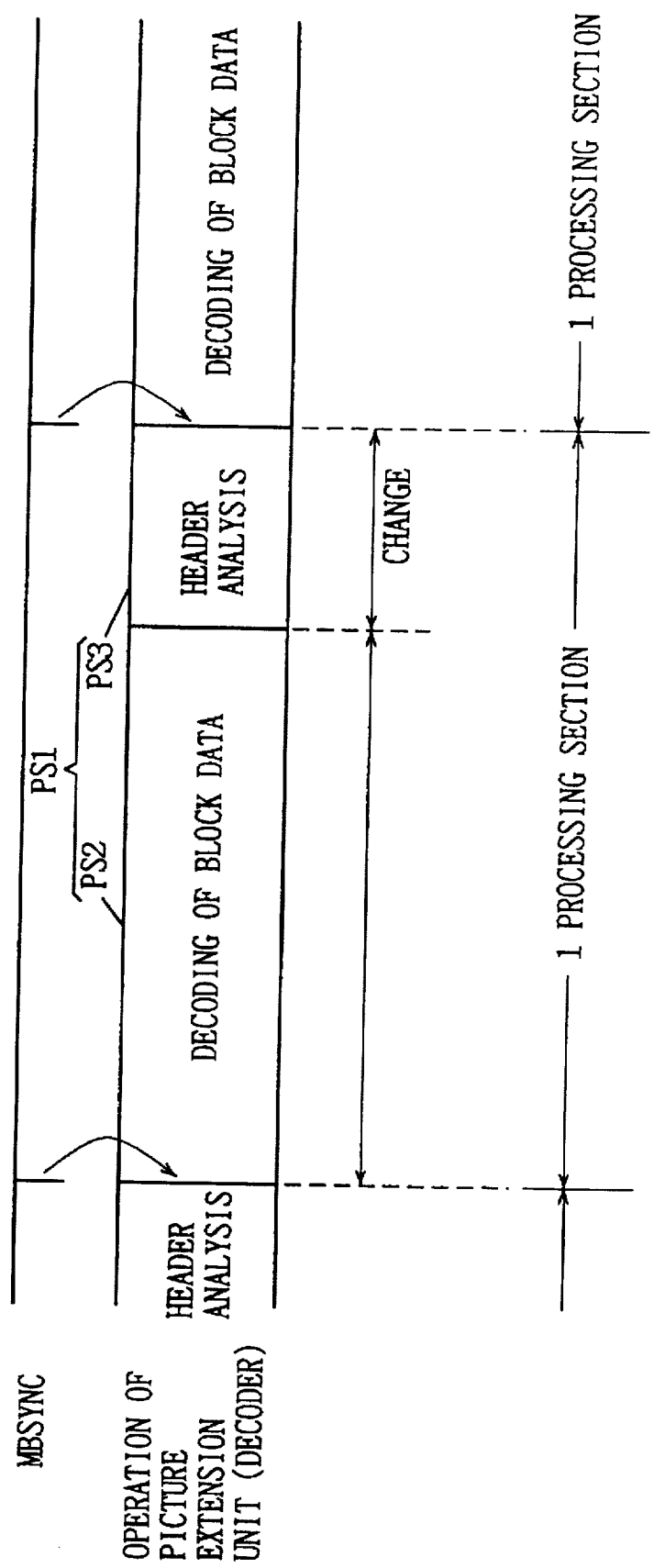
FIG. 1 schematically illustrates an operation in one processing section of a picture decoding circuit according to the present invention.

FIG. 1 illustrates an operation in one processing section PS1 of a variable length decoding part in a picture decoding circuit according to the present invention. The processing section PS1 of a variable length decoding part (hereinafter referred to as a decoder (VLD)) includes a decoding period PS2 for decoding data of respective blocks of a macro block, and a period PS3 following the decoding period PS2 for analyzing header information. The decoding period PS2 is started in response to assertion of an MB synchronizing signal MBSYNC, to decode the block data consisting of a variable length symbol group on the basis of a quantization index. In the header analysis period PS3, information of a header part (sequence and picture headers may be included in addition to a macro block header) for a next processing section is entirely analyzed. After completion of the analysis period PS3, i.e., after completion of analysis of all information of the next macro block header, starting of the next processing section PS1, i.e., decoding processing of data of blocks of the next macro block, is delayed until prescribed conditions are established. Referring to FIG. 1, the block data of the next macro block are decoded following completion of the analysis period PS3. However, the time period of the analysis period PS3 varies depending on the header information. Decoding processing of encoded block data (the data of the respective blocks of the macro block) is completed in a fixed constant time. The data of the respective blocks of the macro block are variable-length encoded, with different code lengths. When the variable length codes are decoded at a 1 symbol/1 clock cycle rate, for example, each block of the macro block has 8 by 8 pixels, and the maximum number of the symbols per block is 64. When the time period of the decoding period PS2 is set in the aforementioned manner, therefore, a fixed time length can be attained. When variable-length encoding is carried out at the rate of 1 symbol/1 clock cycle, run-length data are decoded and DCT coefficients of the respective blocks are successively obtained along the decoded run-length information. In this case, therefore, the maximum value of the time required for the run-length decoding can be previously determined, and if the time required for such run-length decoding is previously set at a constant value and when DCT coefficient data of the blocks are obtained at a rate of one pixel per clock from the decoded run-length information, the time period is fixed also in this case. Also when the time required for the run-length decoding is varied and accordingly the time period of the decoding period PS2 fluctuates, the time period required for decoding the block data can be suppressed within a constant time (about the maximum decoding time). The decoder (VLD) outputs DCT coefficients (quantization index) of fixed lengths.

According to the structure of the processing period shown in FIG. 1, the following advantages are obtained: The data of the blocks of the macro block are decoded in synchronization with the MB synchronizing signal MBSYNC. Therefore, each computing element included in the picture decoding circuit can start its operation after completion of header analysis with no standby time. Therefore, an inverse quantizer, a variable length decoder, a scan converter, an inverse discrete cosine converter and a pixel reconfigurator can start processing with no delay (particularly when the elements construct a pipeline), whereby utilization efficiency of various computing elements of the picture decoding circuit can be improved.

Further, the time periods of the decoding period PS2 and the analysis period PS3 can be remarkably reduced by driving various operational processors included in the picture decoding circuit in a pipeline manner as described later.

Figure 2A:
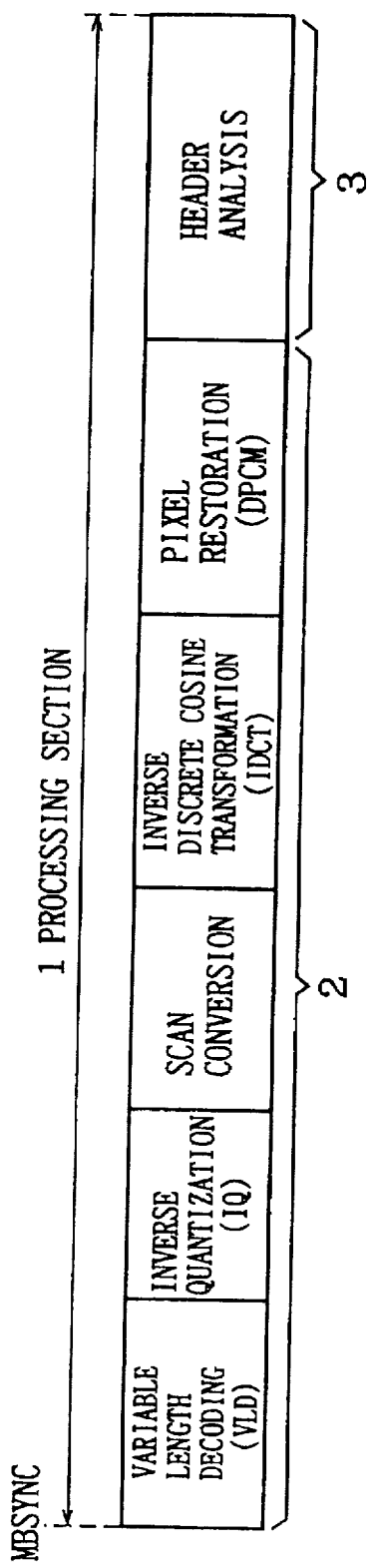
FIGS. 2A and 2B illustrate the structure of one processing section (unit) of the picture decoding circuit according to the present invention and an effect of pipeline arrangement.
Figure 2B:
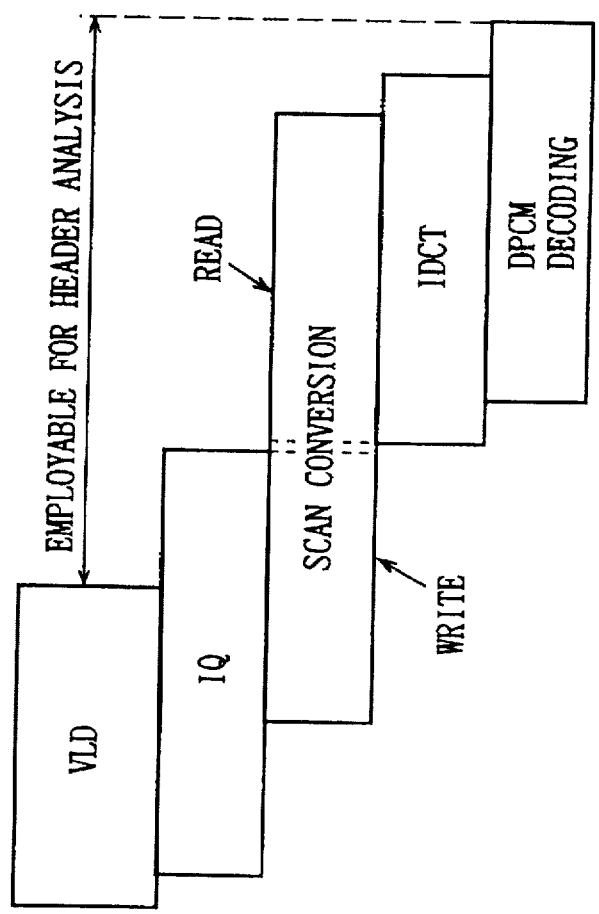

FIGS. 2A and 2B specifically illustrate the structure of each processing section. Referring to FIG. 2A, the decoding period PS2 of one processing section includes variable length decoding processing (VLD) for variable-length decoding variable length codes and generating quantized DCT coefficients of fixed lengths, inverse quantization processing (IQ) on the variable-length decoded DCT coefficient data, scan conversion processing carrying out conversion of scan order of the inverse-quantized DCT coefficients, inverse discrete cosine transformation processing (IDCT) of the scan-converted data, and pixel restoration processing (DPCM: differential PCM) for restoring original pixel data from the pixel data after the inverse discrete cosine transformation. Referring to FIG. 2A, the time period of a decoding period in the processing section is the total sum of times required for the respective processing operations.

FIG. 2B illustrates an exemplary structure in the case of executing the respective processing operations included in the decoding period 2 in a pipeline manner. When the variable length decoding processing (VLD) is completed, the header information can be analyzed in the variable length decoder. Therefore, header information of a next segment can be analyzed in parallel with the inverse quantization processing (IQ), the scan conversion processing (write/read of data to a buffer memory, accompanying address conversion), the inverse discrete cosine transformation processing (IDCT) and the pixel restoration processing (DPCM). Thus, reduction of the time periods of the decoding period PS2 and the analysis period PS3 can be implemented by carrying out the processing in the pipeline mode due to parallel processing of the header information analysis and decoding of block data through the pipeline, the time period for one processing section can be remarkably reduced, and high-speed arithmetic processing (expansion) can be executed. The structure of the pipeline is described later again in detail.

Figure 33:
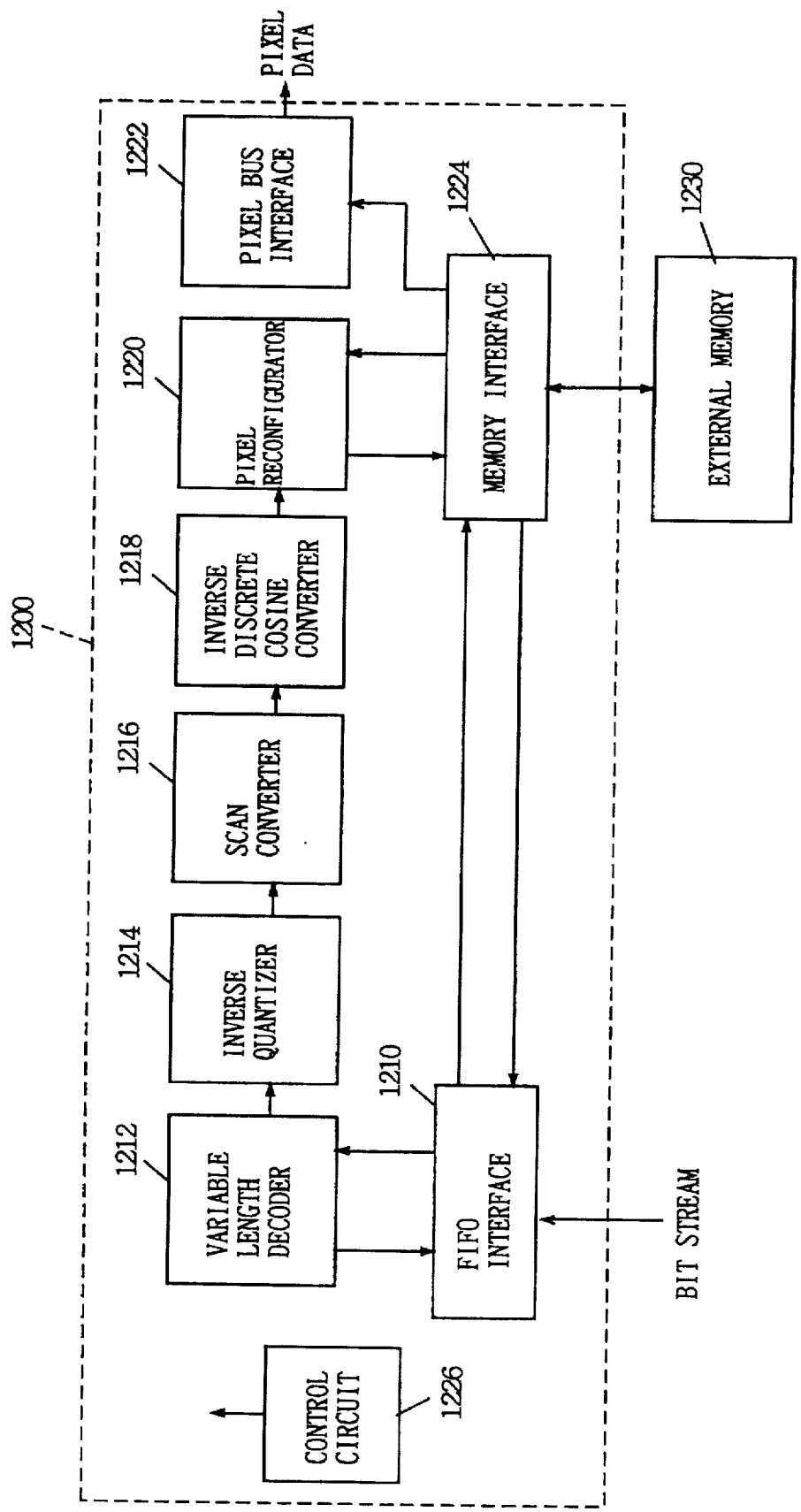
FIG. 33 is a block diagram schematically showing the structure of a picture decoding circuit to which the present invention is directed.
Figure 34:
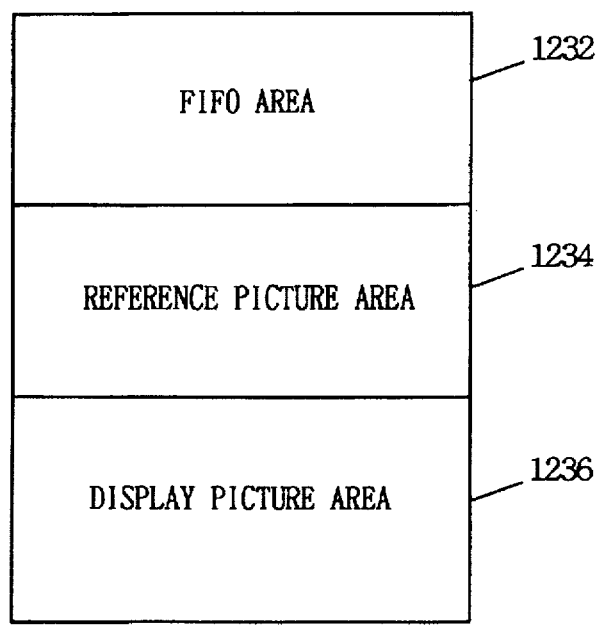
FIG. 34 illustrates the structure of storage areas of an external memory shown in FIG. 33.
Figure 35:
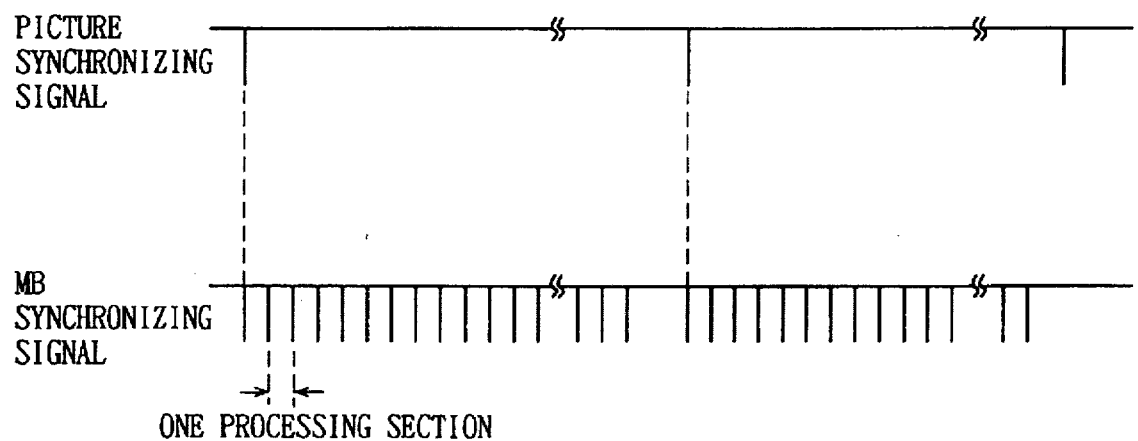
FIG. 35 illustrates a processing section of a conventional picture decoding circuit.
Figure 36:
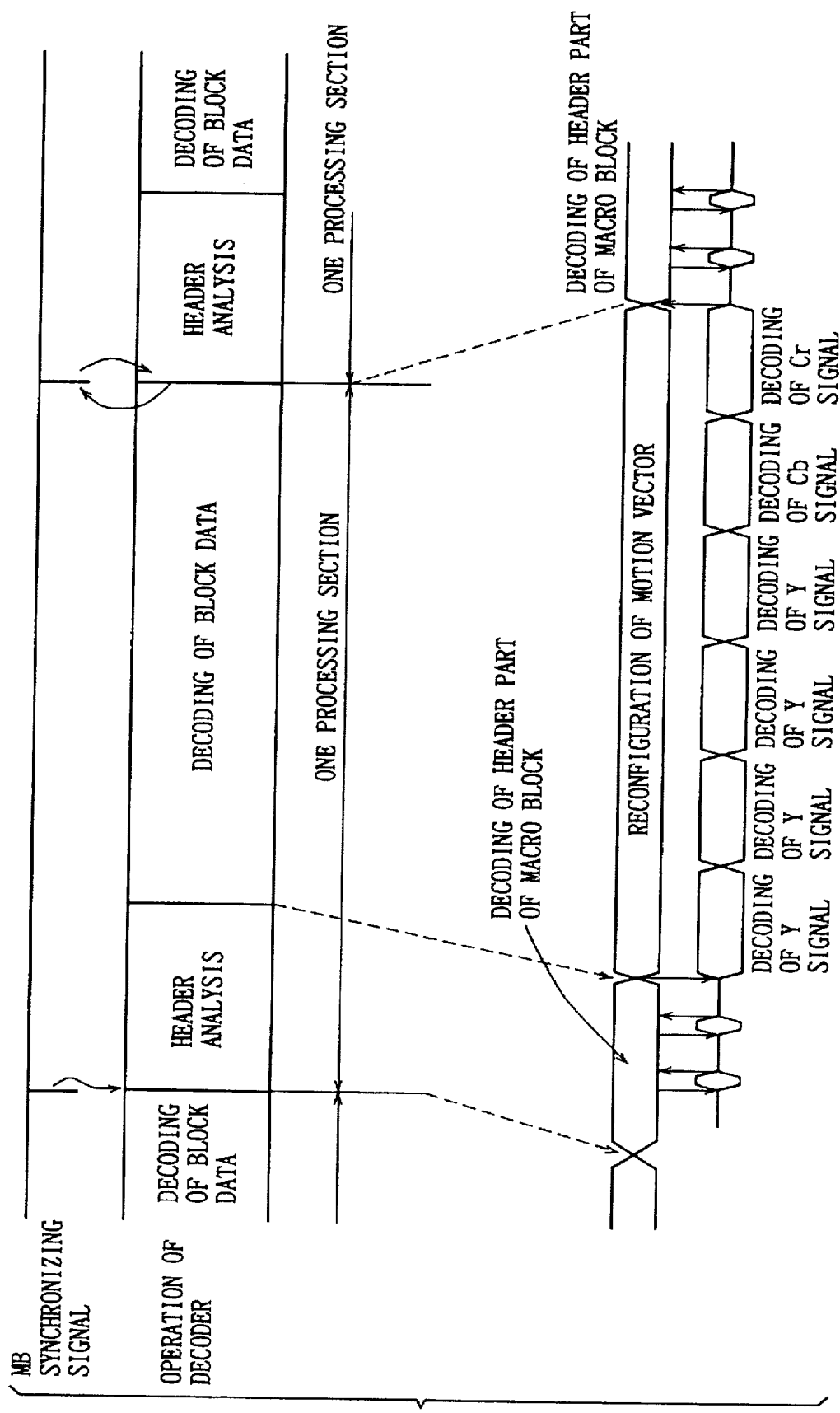
FIG. 36 illustrates an operation of the conventional picture decoding circuit.
Figure 37:
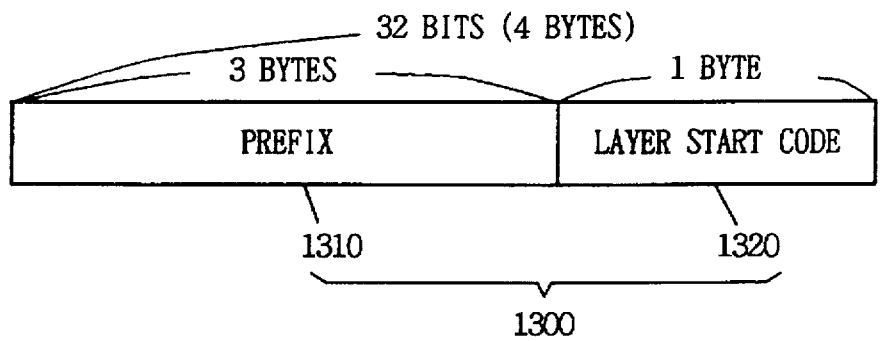
FIG. 37 illustrates the structure of a start code.
Figure 38:
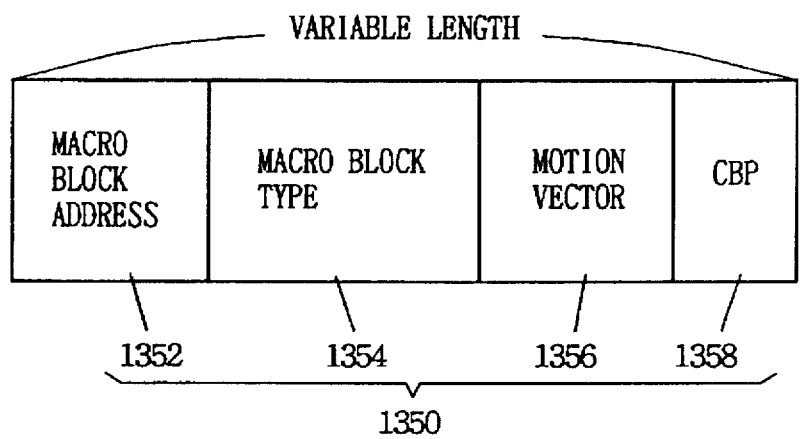
FIG. 38 illustrates the structure of a header part of a macro block layer.
Figure 39:
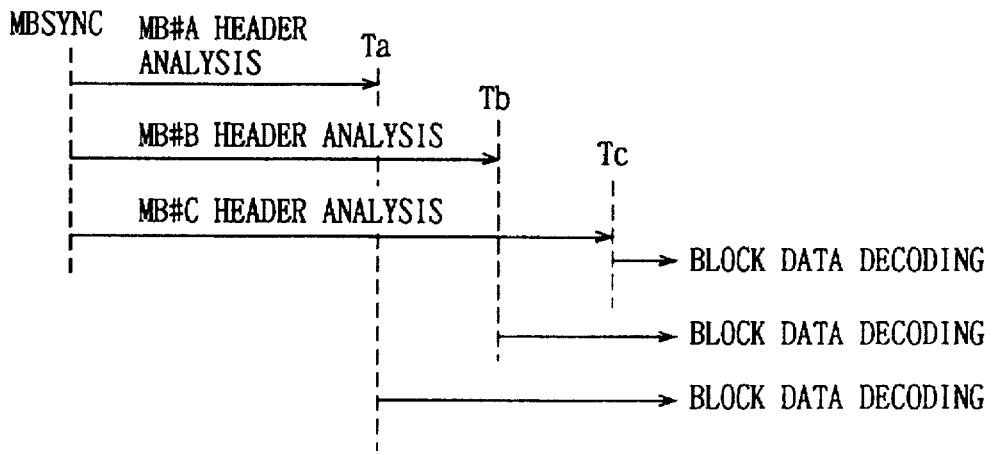
FIG. 39 illustrates a problem in the conventional picture decoding circuit.
Figure 40:
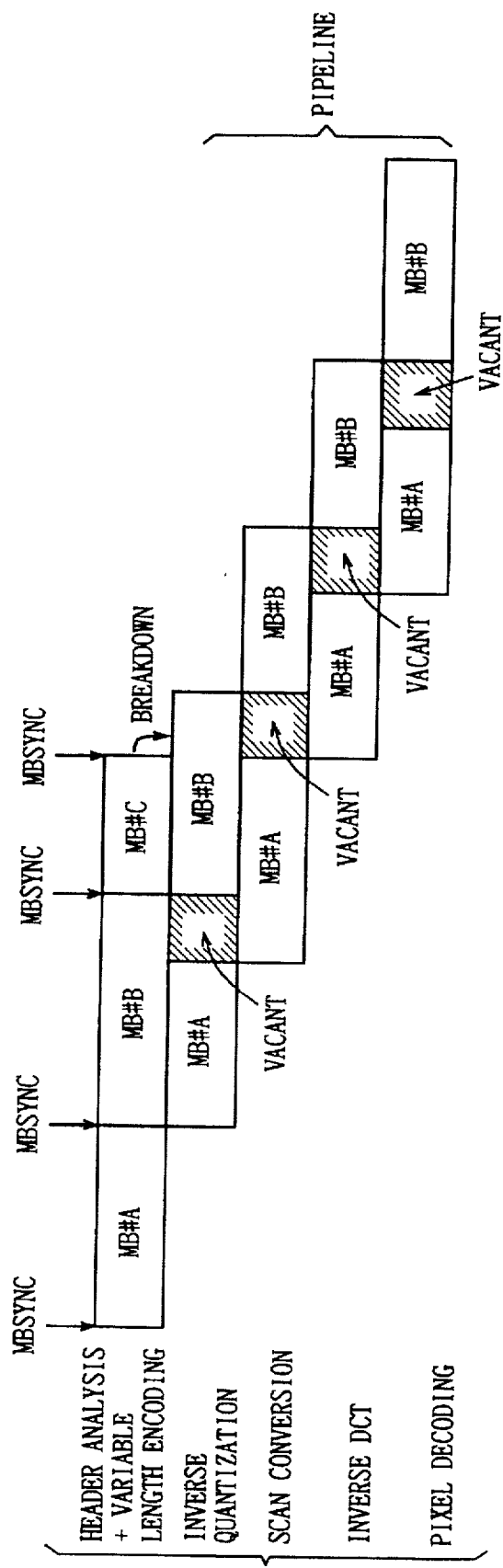
FIG. 40 illustrates another problem in the conventional picture decoding circuit.

The external structure of the picture decoding circuit according to the present invention is schematically identical to the structure shown in FIG. 33. Internal structures of a variable length decoder 1212 and a control circuit 1226 are different. These structures are described later in detail.

Figure 3:
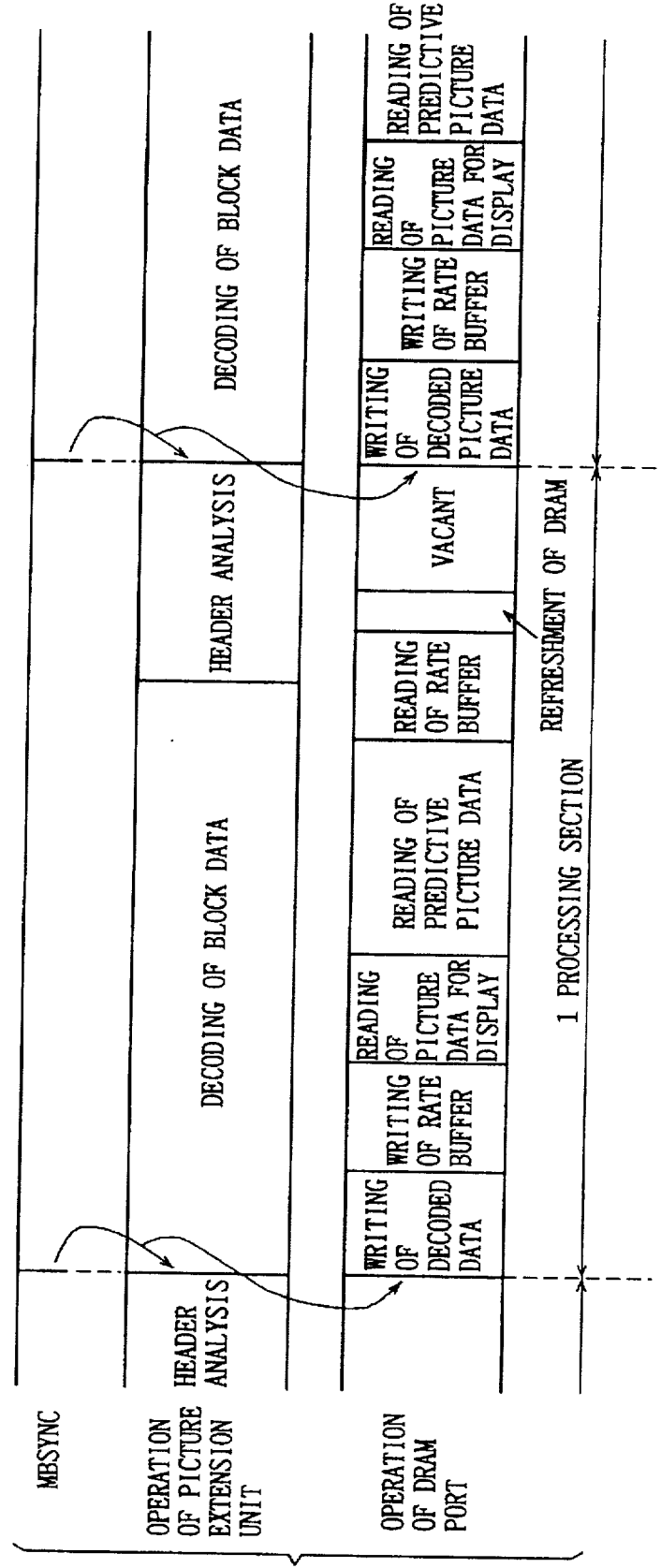
FIG. 3 illustrates the operations of one processing section of the picture decoding circuit and a DRAM port according to the present invention.

FIG. 3 illustrates operations of the decoder (picture decoding circuit) and a port of an external memory device (DRAM). Referring to FIG. 3, decoding of block data of the segment is started in response to assertion of the MB synchronizing signal MBSYNC in the picture decoding circuit (decoder). When the decoding of the block data is completed, header information of the next segment is analyzed. One processing unit time period is just ended when analysis of the header information is completed, and decoding of block data of the macro block of the next segment is started.

With respect to the DRAM, on the other hand, pixel data decoded in a precedent processing unit time period (section) are first written in response to assertion of the MB synchronizing signal MBSYNC. Then, an externally supplied bit stream is written in a predetermined time period through the FIFO interface 1210 shown in FIG. 32. When the writing of the bit stream in the DRAM port (writing in a rate buffer) is completed, picture data for display are then read out. When the reading of the picture data for display (pixel data of the macro block, for example) is completed, predictive picture data employed for restoration of prediction encoded pixel data are then read out. In such reading of the predictive picture data, picture data of two pictures which are precedent and subsequent in time are read in the case of interpolation prediction, for example, in the case of B pictures. Therefore, the reading of the predictive picture data varies depending on the encoding mode of the block data to be decoded.

When the reading of the predictive picture data is completed, the bit stream to be processed is then read out (reading of the rate buffer). In the reading of the rate buffer, the quantity of read data is previously set. It is necessary that the bit stream employed for analysis of the header information in the processing unit carrying out reading of the rate buffer and the block data of the segment decoded in the next processing unit (section) are prepared in a buffer included in the variable length decoder which is described later. It is possible to guarantee storage (prefetch) of the bit stream employed for the header analysis in the corresponding processing section and the block data employed in the next processing section in a buffer memory included in the variable length decoder by reading the bit stream from the rate buffer in each processing (unit) section. Here, one processing unit corresponds to one processing section.

After the reading of the rate buffer, DRAM refreshing is carried out, and refreshing of memory data stored in the DRAM which is an external memory device is executed. In the operation of the DRAM port, the aforementioned operations are successively executed in a single processing unit time. In the operation sequence shown in FIG. 3, no access is made until the next processing section is started after completion of the DRAM refreshing operation, and the DRAM port enters an empty (wait) state. The DRAM refreshing is illustrated as being carried out last in one processing section. However, this DRAM refreshing may be executed at proper timing in the section of one processing unit.

Figure 4:
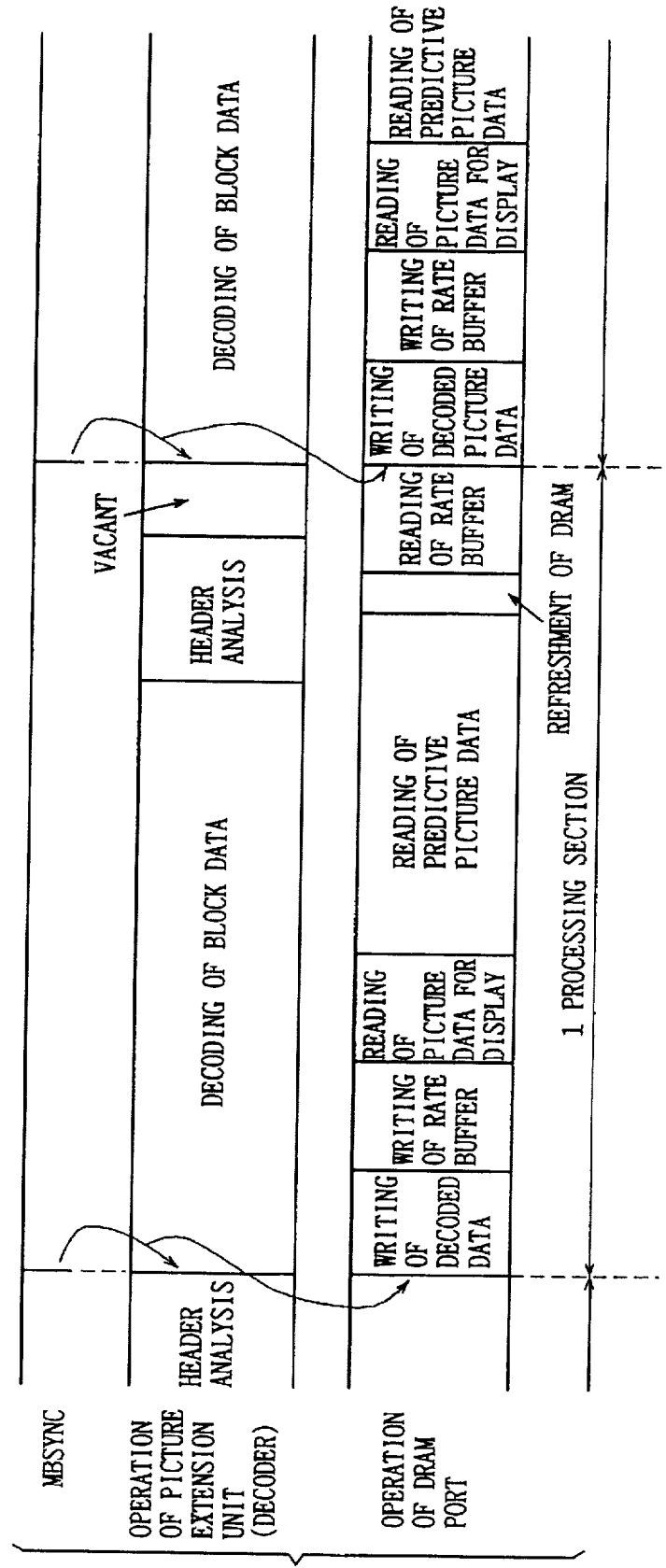
FIG. 4 illustrates other operation sequences of the picture decoding circuit and the DRAM port according to the present invention.

FIG. 4 illustrates another sequence of operations of the picture decoding circuit and the DRAM port in one processing section. Referring to FIG. 4, decoding of the block data (data of the respective blocks of the macro block) is carried out in the picture decoding circuit (decoder) in synchronization with assertion of the MB synchronizing signal MBSYNC similarly to the sequence shown in FIG. 3, and then header information of the next segment is carried out after completion of the decoding. In the sequence shown in FIG. 4, starting of decoding processing of the block data of the next segment is delayed after completion of analysis of the header information.

In the DRAM port, on the other hand, writing of decoded data, writing in the rate buffer, reading of picture data for display, reading of predictive picture data and reading of the rate buffer are successively executed in synchronization with assertion of the MB synchronizing signal MBSYNC. DRAM refreshing is executed before the reading of the rate buffer. This DRAM refreshing can be executed in one processing section at arbitrary timing, as described above. One processing section is completed by completion of the reading of the rate buffer. In response to the completion of the processing section, the MB synchronizing signal MBSYNC is asserted in order to instruct starting of decoding of the block data of the next segment. An empty period between the analysis of the head information and the starting of decoding of the next block data is described later in detail.

The writing of the decoded data, the writing in the rate buffer, the reading of the picture data for display, the reading of the predictive picture data and the reading of the rate buffer are carried out with respect to the DRAM port in the prescribed order in this processing section, whereby it is not necessary to discriminate the priority of the accesses to the DRAM or to provide a bus arbiter for adjusting the accesses to the DRAM, and the device structure is simplified.

Further, it is possible for the processing operations to be adapted for the pipeline structure of the operational processors of the picture decoding circuit described later in detail, by writing the decoded data first in the processing section. In addition, it is possible to prepare picture data which are necessary for the subsequently executed reading of the picture data for display in the DRAM by writing the decoded data in advance. Namely, the decoded data are immediately displayed in the case of B pictures (the B pictures are not employed as predictive pictures). It is possible to write the bit stream in the rate buffer without changing the operation mode (write mode/read mode) of the DRAM and with no delay of the externally supplied bit stream by writing the bit stream in the rate buffer subsequently to the writing of the decoded data. It is not necessary to stall the operation of the display control unit which is separately provided in the exterior, since the picture data for display are read in advance of the reading of the predictive picture data. Namely, the number of the predictive pictures to be read varies depending on the processing method (predictive encoding) for the segment in the reading of the predictive picture data. Therefore, the time required for completion of the reading of the predictive picture data varies with the type of picture. Thus, it is possible to supply the display picture data to the display control unit substantially at the same timing in each respective processing section by reading the picture data for display in advance of reading of the predictive picture data having a different timing of completion in one processing section, and utilization efficiency of the display control unit is not damaged.

The bit stream is read from the rate buffer at the last of the processing section with no problem, since only supply to the variable length decoder (1212: see FIG. 33) of a bit stream which is required for block data decoding processing and header analysis in the next section is required. The predictive picture data are read in advance of the reading of the rate buffer, so that the predictive picture data can be reliably loaded in the buffer memory which is provided in the pixel reconfigurator of the picture decoding circuit and the arithmetic processing of forming the predictive pictures can be reliably executed subsequently in synchronization with starting of the next processing section.

Figure 32:
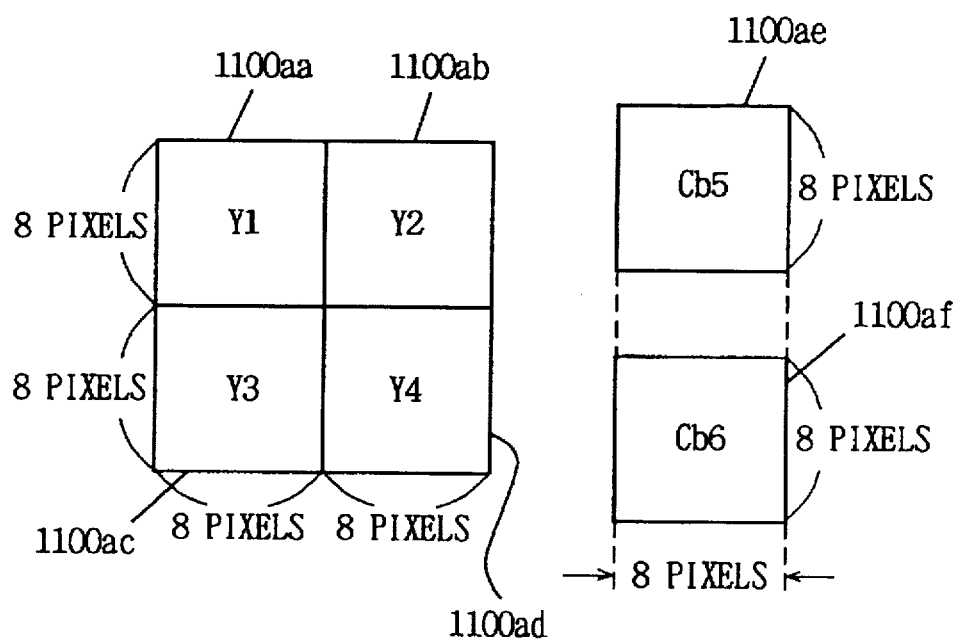
FIG. 32 illustrates the structure of a block layer shown in FIG. 30.

The access to the DRAM port is started in synchronization with the MB synchronizing signal MBSYNC, whereby the read timing for the predictive picture data can be previously predicted and bus control is simplified (access control to the DRAM is carried out by the control circuit 1226 shown in FIG. 32, the structure of which is described later in detail). Namely, it is possible to recognize the type of the macro block and its position on the screen by analyzing the header information in advance. The DRAM has the structure of a frame memory. Therefore, it is possible to previously predict change of row addresses etc. in the writing of the decoded data and the reading of the picture data for display by analyzing the header information in advance, whereby the times required for the writing of the decoded data and the reading of the picture data for display can be predicted in response and the read timing for the predictive picture data can be predicted in response. Thus, control of the memory interface shown in FIG. 32 and the loading operation of the predictive picture data in the pixel reconfigurator can also be arbitratedly carried out.

Figure 5:
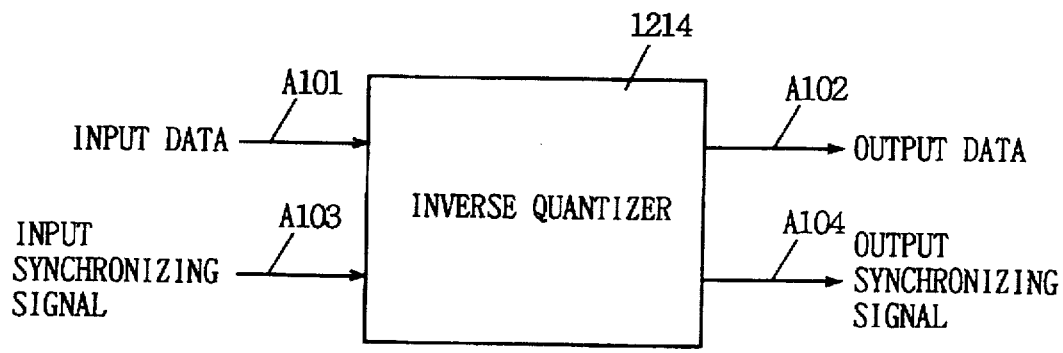
FIG. 5 illustrates structures of input and output signals in and from an inverse quantizer which is employed in the picture decoding circuit according to the present invention.

FIG. 5 schematically illustrates the structure of the inverse quantizer forming the pipeline in units of clock cycles. This inverse quantizer 1214 receives quantized DCT coefficient data consisting of variable-length decoded fixed length data through an input bus A101 while receiving an input synchronizing signal indicating starting of each block (each block of the macro block) through a signal line A103, carries out inverse quantization processing in a pipeline mode, and outputs DCT coefficient data from an output bus A102 while outputting an output synchronizing signal indicating starting of the block of the output data through a signal line A104.

Figure 6:
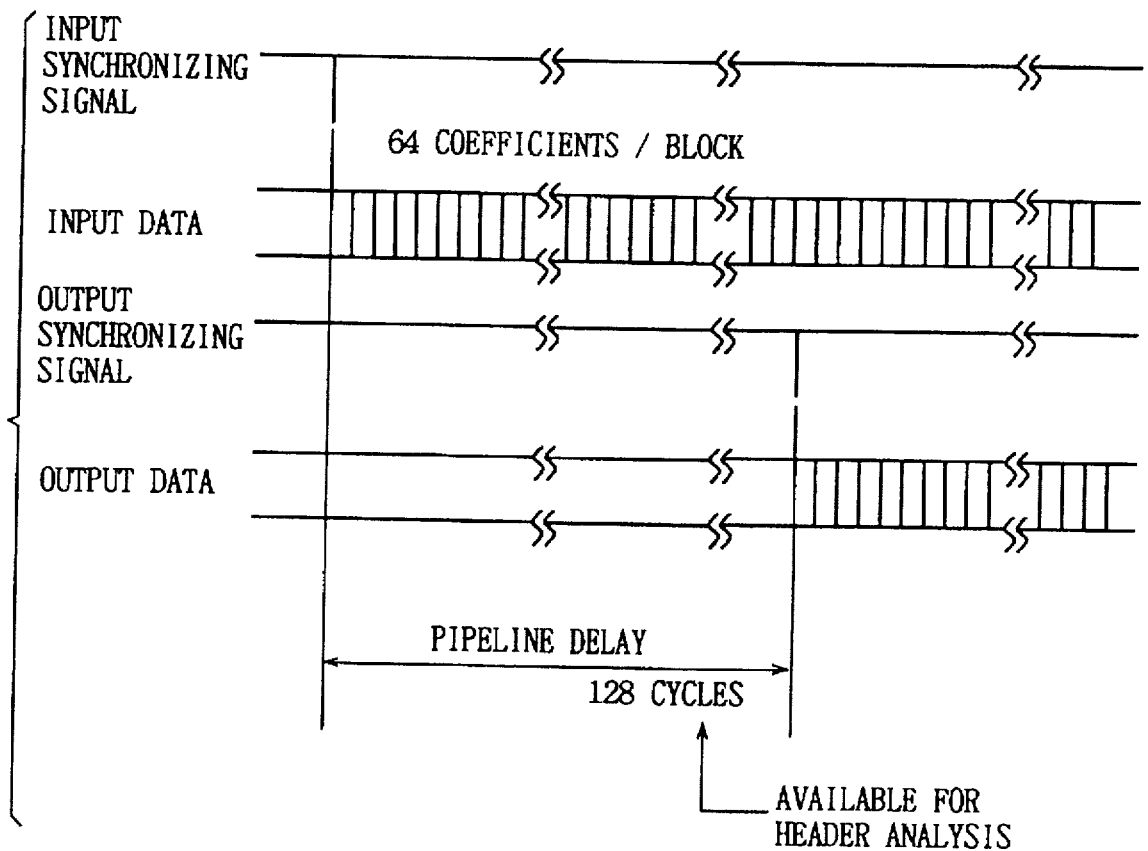
FIG. 6 illustrates the relations between the input and output signals of the inverse quantizer shown in FIG.

The inverse quantizer 1214 carries out arithmetic processing inverse to that in quantization on the quantized DCT coefficients which are converted to fixed length codes using a previously prepared quantization table (for example, it carries out multiplication with corresponding coefficients of the quantization table: when division is made by corresponding coefficients of the quantization table in quantization). At this time, multiplication processing is executed in a pipeline manner. In general, this inverse quantizer 1214 comprises a pipeline having 128 extra stages as compared with the VLD, IDCT and DPCM processing stages, as shown in FIG. 6. When the input synchronizing signal is supplied through the signal line A103 and the data are successively supplied through the input bus A101 as shown in FIG. 6, therefore, inverse-quantized data are outputted after a lapse of 128 cycles. The input data supplied to the inverse quantizer 1214 are provided by the variable length decoder 1212 shown in FIG. 33. Before all output data appearing at the output bus A102 from the inverse quantizer 1214 are outputted, or before the same are supplied to an inverse DCT device through the scan converter as shown in FIG. 2B, the input data are ended in advance of at least 128 cycles. During this period, therefore, the variable length decoder can be utilized for 5 header analysis. Thus, the processing following the inverse quantizer and the header analysis can be executed in parallel with each other (see FIG. 2B).

Figure 7:
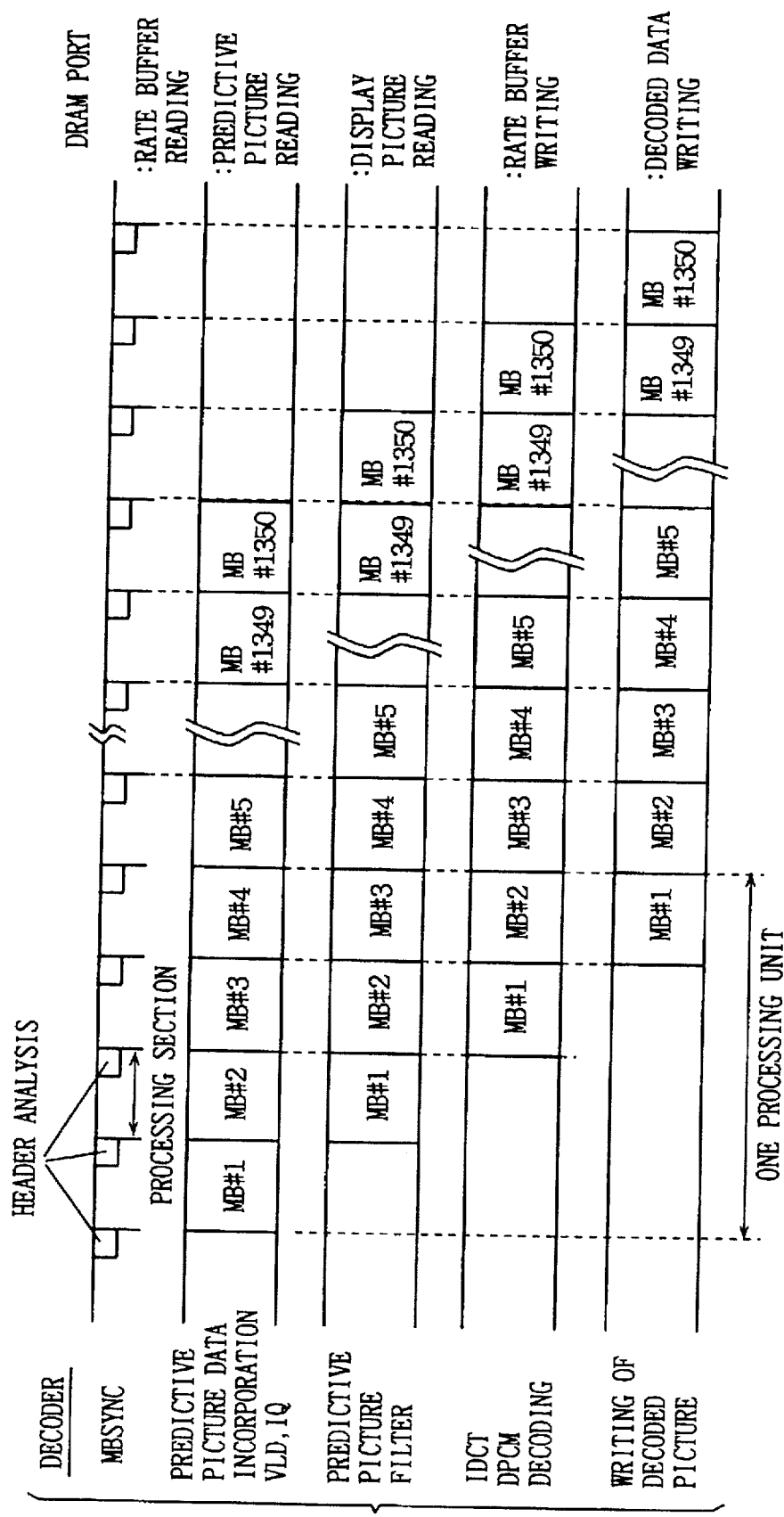
FIG. 7 illustrates a pipeline structure of operational processors of the picture decoding circuit according to the present invention and a processing sequence for block data.

FIG. 7 illustrates another pipeline mode for the picture decoding circuit. In the picture decoding circuit shown in FIG. 7, pipeline processing is executed by a pipeline of four stages in synchronization with the MB synchronizing signal MBSYNC. Referring to FIG. 7, the first stage pipeline reads a predictive picture from the DRAM, variable-length decodes the DCT coefficients (formation of fixed length DCT coefficient data), and carries out inverse quantization processing. In the reading of the predictive picture data from the DRAM, motion vectors are extracted from header information analyzed in a precedent processing section, so that the predictive picture data are read from the DRAM in accordance with the extracted motion vectors.

The second pipeline stage carries out filter processing of the predictive picture data read from the DRAM. In the filter processing of the predictive pictures, a plurality of predictive pictures in the case of fractional prediction accuracy are synthesized (averaged) by interpolation. In the case of B pictures of interpolation prediction, picture data of two pictures which are precedent and subsequent in time are synthesized with each other (the picture data are synthesized with weighting according to respective time distances). Thus, the predictive picture data are formed.

The third pipeline stage carries out inverse discrete cosine transformation processing (IDCT) and predictive difference code decoding processing (DPCM decoding). In the IDCT processing, inverse discrete cosine transformation processing of DCT coefficient data subjected to inverse quantization processing (IQ) is executed. In the DPCM decoding process, predictive differential encoding (addition) of pixel data formed by the IDCT processing and predictive picture data formed by predictive picture filter processing is carried out, to form original pixel data. When the macro blocks are I pictures, the IDCT processed data correspond to the original pixel data (when no DC prediction is made). The DPCM decoded and restored pixel data are written in the buffer which is included in the picture decoding circuit.

The fourth pipeline stage writes the decoded picture data in the DRAM. Namely, writing into the DRAM is carried out from the buffer.

It is possible to remarkably reduce the time period of the processing unit by carrying out the processing of the picture decoding circuit, following the header analysis in a pipeline manner in units of segments (macro blocks). Assuming that the MB synchronizing signal MBSYNC is asserted at an interval of one processing section in FIG. 7, and therefore four processing sections are required for decoding block data of one macro block. Analysis of the header information is executed in each processing section. FIG. 7 shows an operation sequence in the case of processing a digital NTSC signal (720 valid pixels/line, 480 lines/frame) in units of macro blocks each consisting of 16 by 16 pixels every frame, for example. First to 1350-th macro blocks MB#1 to MB#1350 are processed by the four stage pipelines in the units of segments (one segment (macro block) is processed in one processing section).

FIG. 7 also shows access to the DRAM port in the case of carrying out the internal arithmetic processing operation in the picture decoding circuit in a pipeline manner, in correspondence to the pipeline stages in the picture decoding circuit.

As shown in FIG. 7, processing of the segments which are the units of picture expansion processing can be executed in a pipeline manner over a plurality of processing sections due to the pipelined processing of the respective operational processors of the picture decoding circuit in units of segments, whereby the time required for all processing of one segment (time for one processing unit) can be effectively reduced. As shown in FIG. 7, one segment is processed in a processing section of a time of about ¼ one processing unit, in the case of the four stage pipeline structure.

The time period of the processing section shown in FIG. 7 may be fixed to a constant clock cycle number. However, it is also possible to change the time period (clock cycle number) of the processing section in accordance with the attributes of the segment.

Figure 8:
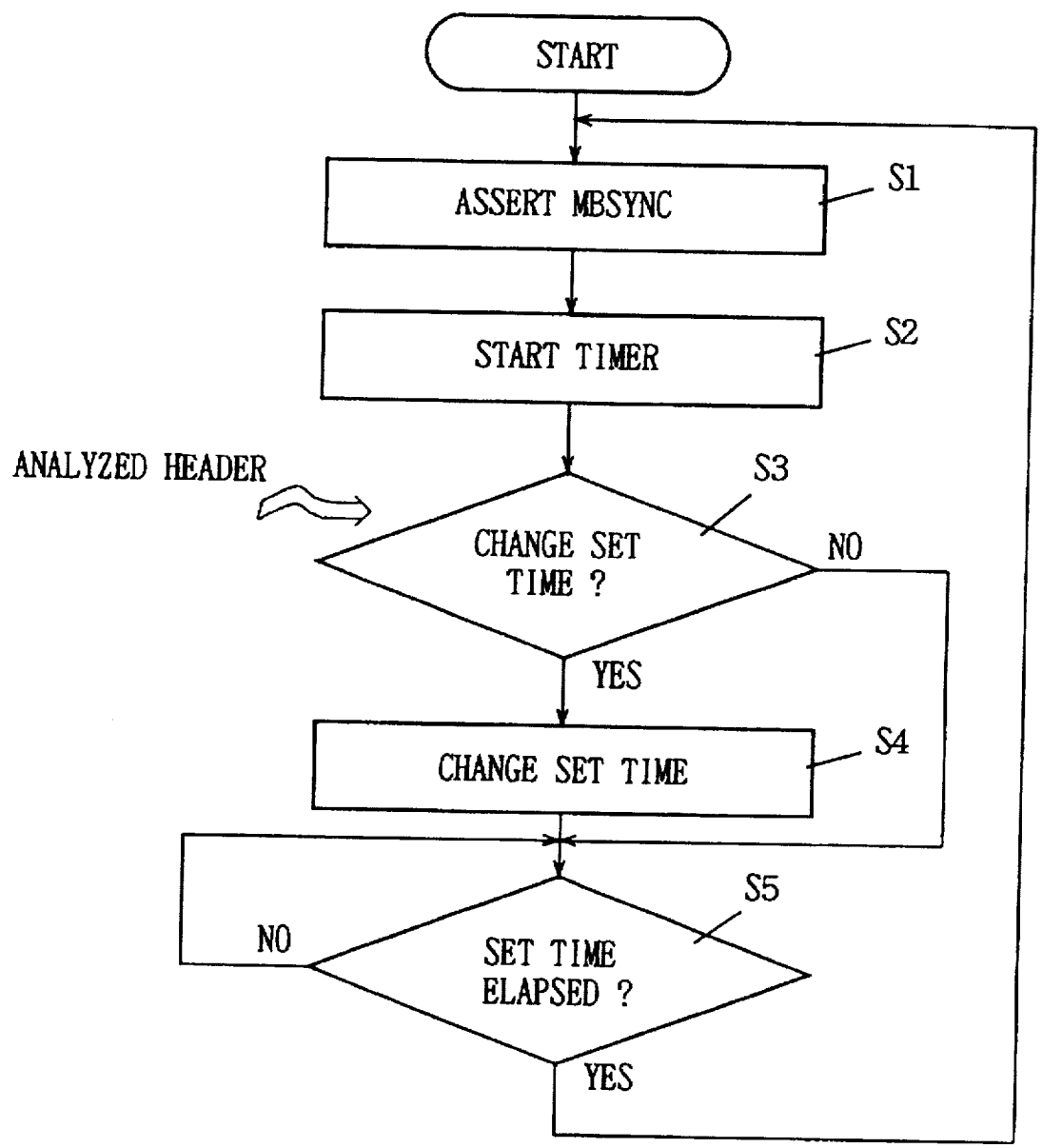
FIG. 8 is a flow chart representing an operation for setting the time period of one processing section in the picture decoding circuit according to the present invention.

FIG. 8 illustrates an operation flow for changing the time period of the processing section. With reference to FIG. 8, a method for changing the clock cycle number of the processing section is now described.

First, the MB synchronizing signal MBSYNC is asserted (step S1). In response to this assertion of the MB synchronizing signal MBSYNC, a timer included in the control circuit 1226 (see FIG. 33) is started of counting (step S2).

After the timer operation is started, a determination is made as to whether or not it is necessary to change a set time on the basis of the header information analyzed in the precedent processing section (step S3). When the processing method for the macro blocks is complicated (in the case of B pictures subjected to bidirectional predictive encoding with motion prediction in fractional accuracy, for example), the processing unit time period is increased. In this case, the set time is increased in accordance with the analyzed header information. When a determination is made that the change of the set time is necessary at the step S3, the time of the processing section is set at a proper value (long or short) in accordance with the analyzed header information. When a determination is made that the set time needs not be changed at the step S3, on the other hand, set time change processing at a step S4 is skipped. Then, a determination is made as to whether or not the count time of the timer reaches the set time (step S5). If the set time elapses, the process returns to the step S1, so that the MB synchronizing signal MBSYNC indicating starting of the next processing section is asserted. The step S5 is repetitively executed up to a lapse of the set time.

The steps S3 and S4 may be carried out in parallel with the step S1. As to the change of the set time, if the timer is formed by a counter and a stored reference value of a register and the count of the counter is compared by a comparator detecting matching/mismatching therebetween and the MB synchronizing signal MBSYNC is asserted in accordance with the result of comparison of the comparator, the reference value of the register is changed. When a counter of a variable stage number is employed and the stage number of the counter is changed upon changing of the set time, a count-up signal of the counter can be utilized as the MB synchronizing signal MBSYNC.

When the time period of the processing section is constant, the steps S3 and S4 are omitted.

Figure 9:
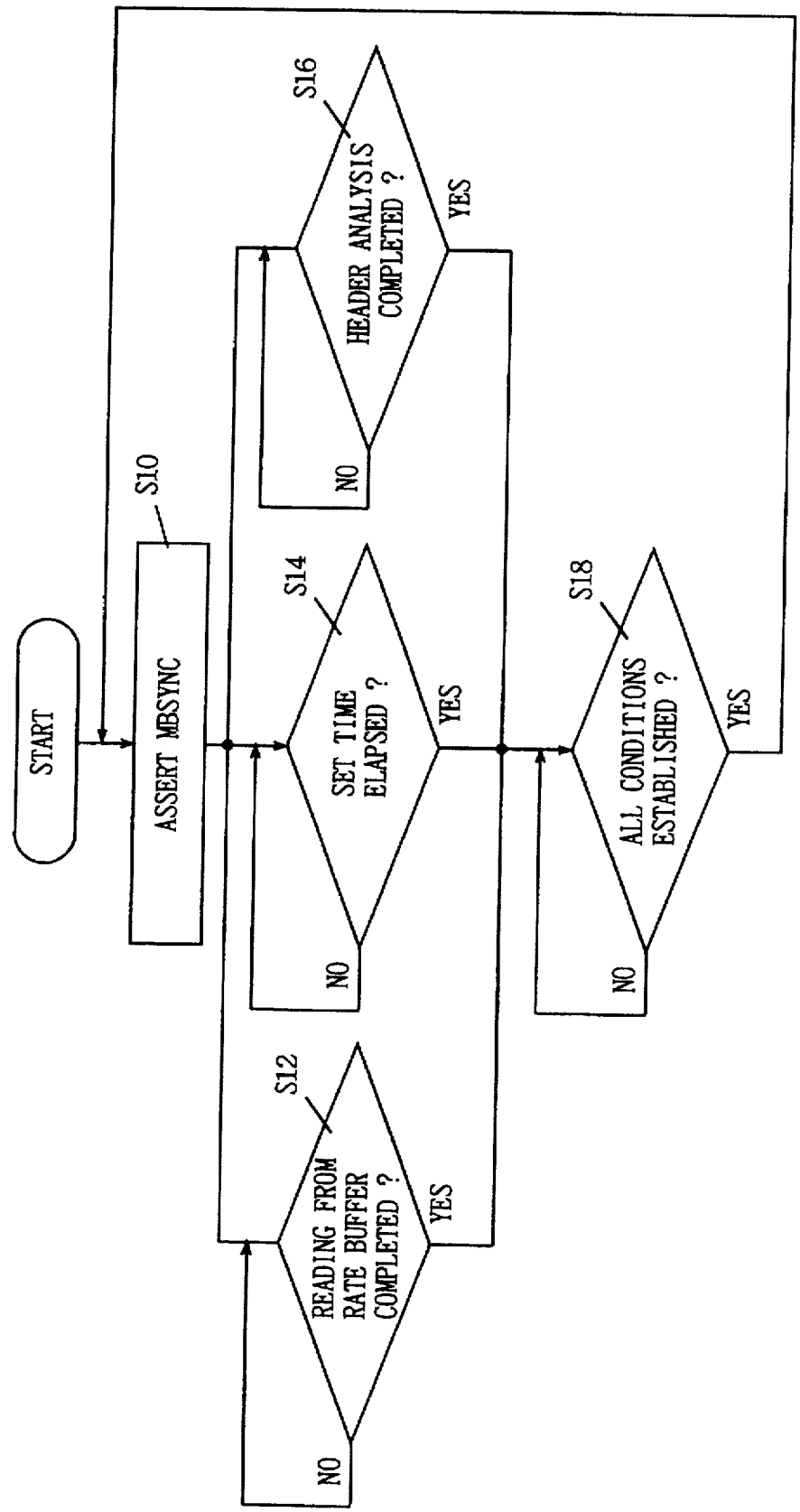
FIG. 9 illustrates another operation sequence for deciding one processing section in the picture decoding circuit according to the present invention.

FIG. 9 illustrates another technique of setting the time period of the processing section. The control operation shown in FIG. 9 is also executed in the control circuit 1226 shown in FIG. 32. The structure of the control circuit 1226 is described later in detail.

The processing section is started and the MB synchronizing signal MBSYNC is asserted (step S10). Then, steps S12, S14 and S16 are executed in a parallel mode. At the step S12, a determination is made as to whether or not loading of the bit stream from the rate buffer into the variable length decoder is completed. At the step S14, a determination is made as to whether or not a prescribed set time elapses from the assertion of the MB synchronizing signal MBSYNC. At the step S16, a determination is made as to whether or not analysis of header information is entirely completed. A signal indicating whether or not the analysis of the header information is entirely completed is outputted from the variable length decoder, as described later in detail. The results of these determinations are monitored at a step S18, so that the process returns from the step S18 to the step S10 if all results of the determination at the steps S12, S14 and S16 are affirmative (YES), and the MB synchronizing signal MBSYNC designating starting of the next processing section is asserted.

It is possible to reliably start the next processing section after necessary processing is completed by executing the processing operation shown in FIG. 9. It is possible to prevent the next section from being started in an intermediate stage of the data processing (during the data read operation from the rate buffer or the header analysis operation, for example). As compared with a structure of fixedly setting the time period of the processing section, therefore, the series of processing from the variable length decoding operation to the pixel restoration processing is reliably started in a pipeline mode after all necessary processing is completed (after all necessary data are supplied). Referring to FIG. 9, the set time at the step S14 may be rendered changeable in accordance with the attributes of the segments to be decoded (see FIG. 8).

As hereinabove described, it is possible to remarkably reduce the segment processing sections in time by bringing the respective operational processors of the picture decoding circuit into a pipeline structure in the units of the segments.

Error Processing Operation:

The data of the bit stream inputted in the picture decoding circuit may include error bits. In the bit stream subjected to variable length encoding, lengths of symbols are different from each other. When an error bit is mixed, therefore, an error of one symbol exerts an influence on a following symbol and hence correct variable length decoding cannot be carried out. Due to the mixed error bit, the picture decoding circuit makes transition from a steady, normal state of carrying out correct decoding to an unsteady, abnormal state incapable of carrying out correct decoding. The picture decoding circuit must carry out return from such an abnormal state to the normal state and processing of suppressing quality deterioration of decoded pictures in the abnormal state to the minimum. The processing which is carried out between error detection and return to the correct state is called error processing. Processing for reducing the influence by the error on the display screen which is carried out on the segments processed in the abnormal state is called "error concealment processing". The error processing operation and the error concealment processing are now described.

Figure 10:
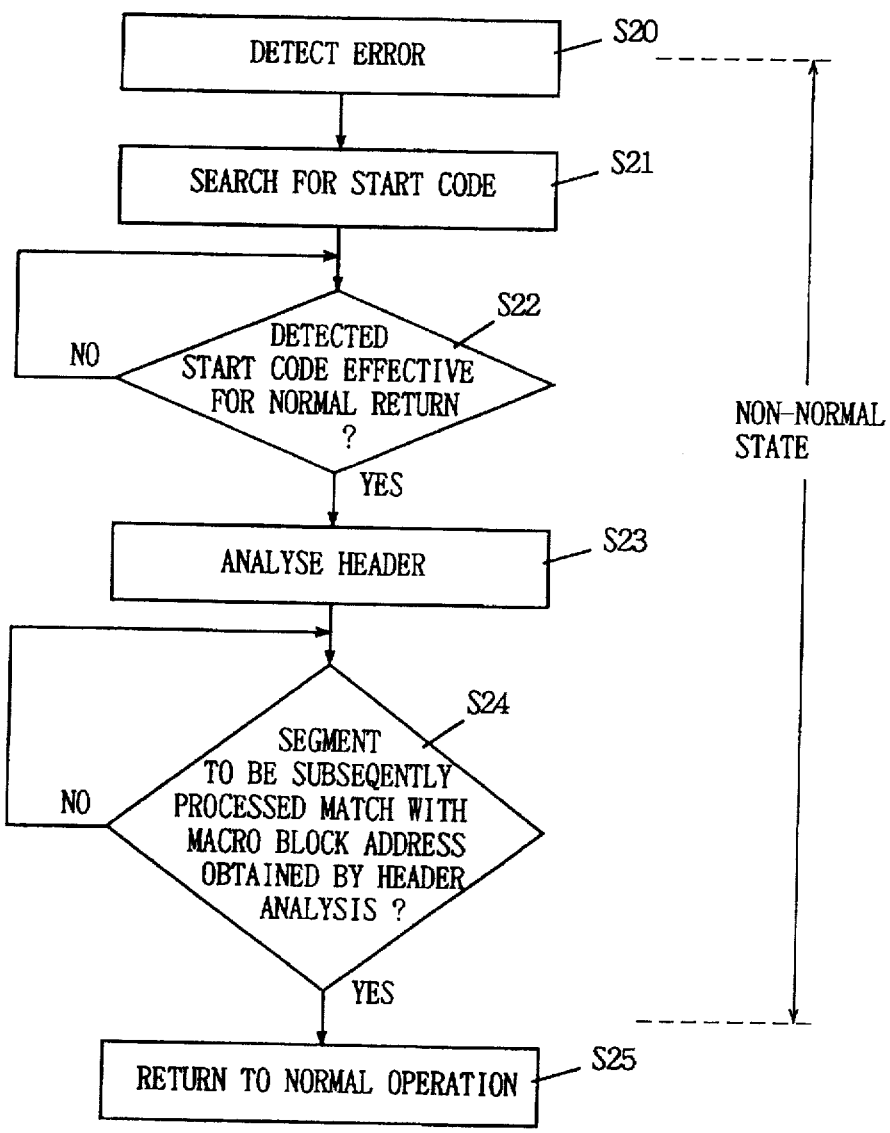
FIG. 10 is a flow chart representing an operation in an error state in the picture decoding circuit according to the present invention.

FIG. 10 is a flow chart schematically representing an operation of the picture decoding circuit upon error detection. The operation of the picture decoding circuit in error detection is now described with reference to FIG. 10.

First, an error is detected at a step S20. In this error detection, a determination on occurrence of an error is made when a necessary symbol is not found in header analysis including a start code in the variable length decoder, or a corresponding symbol is not found in variable length decoding processing of the quantization index, for example, and an error detection signal is generated based on the result of comparison.

When the error is detected, a start code having a particular pattern is searched (step S21). In the MPEG standard, the start code includes a slice start code, a picture start code, a GOP start code or a sequence start code for indicating starting of a layer, or a sequence error code.

When the start code is detected through the search process, a determination is made as to whether or not the detected start code is effective for correct return (step S22). For example, a sequence error code which is a start code is not effective for the correct return (return to the steady state). Therefore, search for another start code is continued.

Figure 11:
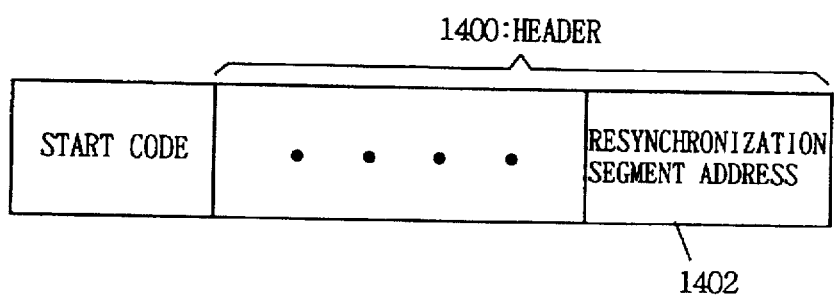
FIG. 11 illustrates the structures of a header of a segment and a start code accompanying the same employed in the present invention.

When a start code effective for correct return is detected, a header following this start code is analyzed (step S23). At this time, header information included in the first segment following the start code is analyzed. Through this header analysis, the segment which must return to the normal state (steady state) is identified. As shown in FIG. 11, a header 1400 (including all headers up to a macro block header preceding macro blocks of the segment) stores resynchronization segment address information 1402 indicating the position on the display screen of the segment (macro block) at which return is made to the normal state in error generation. In the MPEG standard, for example, the resynchronization segment address information 1402 corresponds to a slice vertical position and macro block address increment included in the slice header. A resynchronization segment address is identified by analyzing the header 1400, whereby the segment which should return from the unsteady state to the steady state can be identified.

When the valid start code is a sequence start code, a GOP start code or a picture start code in the MPEG standard, for example, the segment which should return to the steady state is the first segment of the picture.

When the detected start code is a slice start code, return to the steady state can be started from the first segment of the slice layer since the slice layer is provided for preventing error propagation. The header of the slice layer includes information indicating the position on the screen as described above, and the information indicating the position on the screen is utilized as the resynchronization address.

After the header information is analyzed, variable length decoding processing of the data of the macro block following the header is waited until prescribed conditions are established.

Namely, a determination is made as to whether or not the segment to be subsequently processed in the picture decoding circuit corresponds to the macro block address obtained in the header analysis carried out at the step S23 (step S24).

In the search for the start code, the bit stream which is supplied to the picture decoding circuit is employed for the start code search, and no decoding processing of macro block data included in the bit stream is carried out. On the other hand, the picture decoding circuit outputs picture data subjected to the error concealment processing which is described later in detail every processing section. For example, it is possible to recognize the address (position on the screen) of the segment processed in each processing section by counting the MB synchronizing signal MBSYNC defining each processing section in the control unit, for example. Therefore, it is possible to discriminate whether or not a segment to be processed in the next processing section corresponds to the macro block address obtained in the header analysis in the control unit. When the macro block address of the segment to be subsequently processed matches with the macro block address obtained by the header analysis, return is made to the normal operation from the next processing section under control by the control unit (step S25). Also in the return from the unsteady state to the steady state, the header information is analyzed in advance and the decoding processing of the block data is started in accordance with the MB synchronizing signal MBSYNC, whereby no reduction of the utilization efficiency is brought in the respective operational processors of the picture decoding circuit.

In the error development, reading of the predictive picture data in each processing section may be stopped so that this period is utilized for data reading from the rate buffer. This is because the pixel data of the macro block can be replaced by average value data of pixel data of a macro block in a same common picture in error development, as described later in detail. Thus, it is possible to search for the necessary start code at a high speed.

Figure 12:
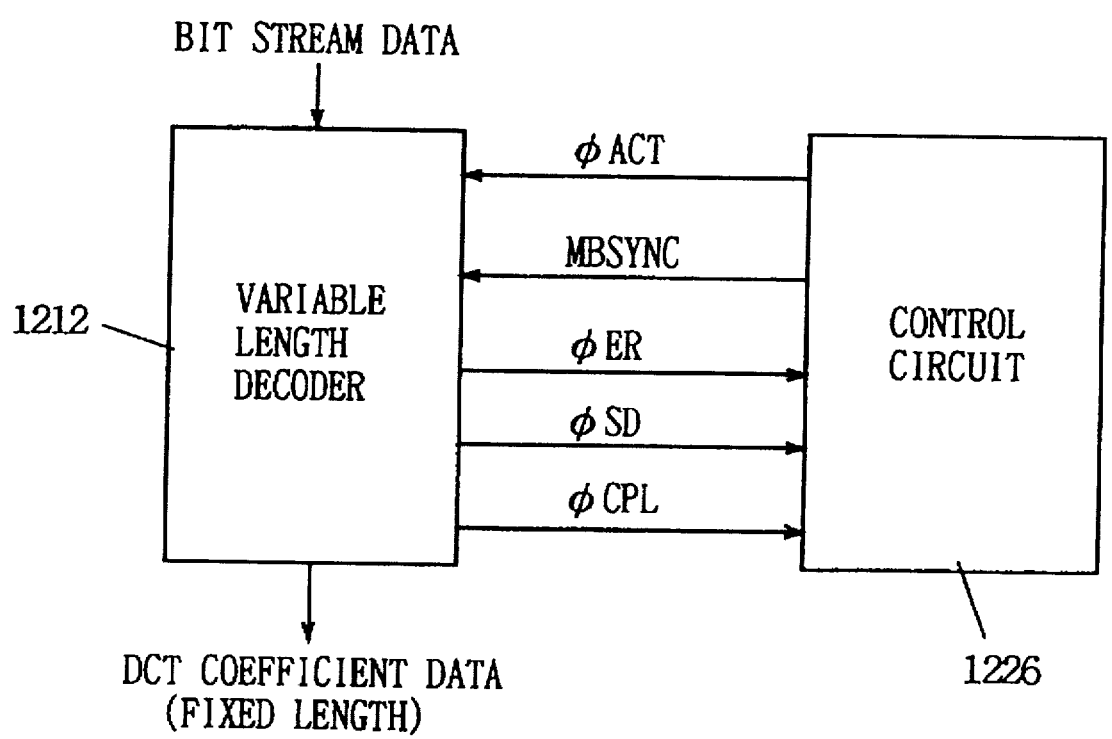
FIG. 12 illustrates the structure of a part of the picture decoding circuit according to the present invention which is related to the operation in an error state.

FIG. 12 schematically illustrates the structure of a part related to the processing operation of error detection and the return in the picture decoding circuit. This figure shows only the variable length decoder 1212 and the control unit 1226. The variable length decoder and the control unit are denoted by the same reference numerals as those of the variable length decoder and the control unit shown in FIG. 32. This is for indicating that the functions of picture decoding processing itself are identical between the inventive and conventional units, but the structures are different from the conventional components as described above.

The control unit 1226 supplies a start signal φACT for starting picture decoding processing and the MB synchronizing signal MBSYNC to the variable length decoder 1212. The variable length decoder 1212 outputs to the control unit 1226 an error detection signal φER, a valid start code (start code effective for return to the normal operation) detection indication signal φSD and a processing unit decoding completion indication signal φCPL indicating that the information of the header of the segment is entirely analyzed. The operation of the structure shown in FIG. 12 is now briefly described with reference to FIG. 13 which is an operation sequence diagram thereof. The control unit 1226 asserts the MB synchronizing signal MBSYNC onto the variable length decoder 1212. The variable length decoder 1212 decodes the block dsyn in synchronization with the assertion of the MB synchronizing signal MBSYNC, and outputs fixed length DCT coefficient data. After completion of the decoding of the block data, information of the header of the next segment is analyzed. When analysis of the header information is entirely completed, the variable length decoder 1212 asserts the processing unit decoding completion indication signal φCPL onto the control unit 1226. When the processing unit decoding completion indication signal φCPL is asserted, the control unit 1226 asserts the MB synchronizing signal MBSYNC again onto the variable length decoder 1212 after prescribed conditions are satisfied. In response to this, decoding processing of the block data is executed. When an error is detected in the decoding procedure, the variable length decoder 1212 asserts the error detection indication signal φER. In response to the assertion of the error detection indication signal φER, the control unit 1226 enters an error state. In this error state, error concealment processing described later is executed. The variable length decoder 1212 searches for a start code in response to the assertion of the error detection indication signal φER. When a valid start code is detected, the variable length decoder 1212 asserts the start code detection indication signal φSD. When the start code is detected, the variable length decoder 1212 analyzes the information of the header part of the segment following the start code, and asserts the processing unit decoding completion indication signal φCPL at the point of time when the analysis is completed, onto the control unit 1226. The control unit 1226 determines whether or not the segment to be executed in the next processing section is that whose header information is analyzed in accordance with the analyzed header information and the start code information, and asserts the MB synchronizing signal MBSYNC in response to the assertion of the processing unit decoding completion indication signal φCPL if the segment is to be executed in the next processing section. In the sequence shown in FIG. 13, therefore, the process returns to the steady state (normal state) from the processing section following that causing the error.

Figure 13:
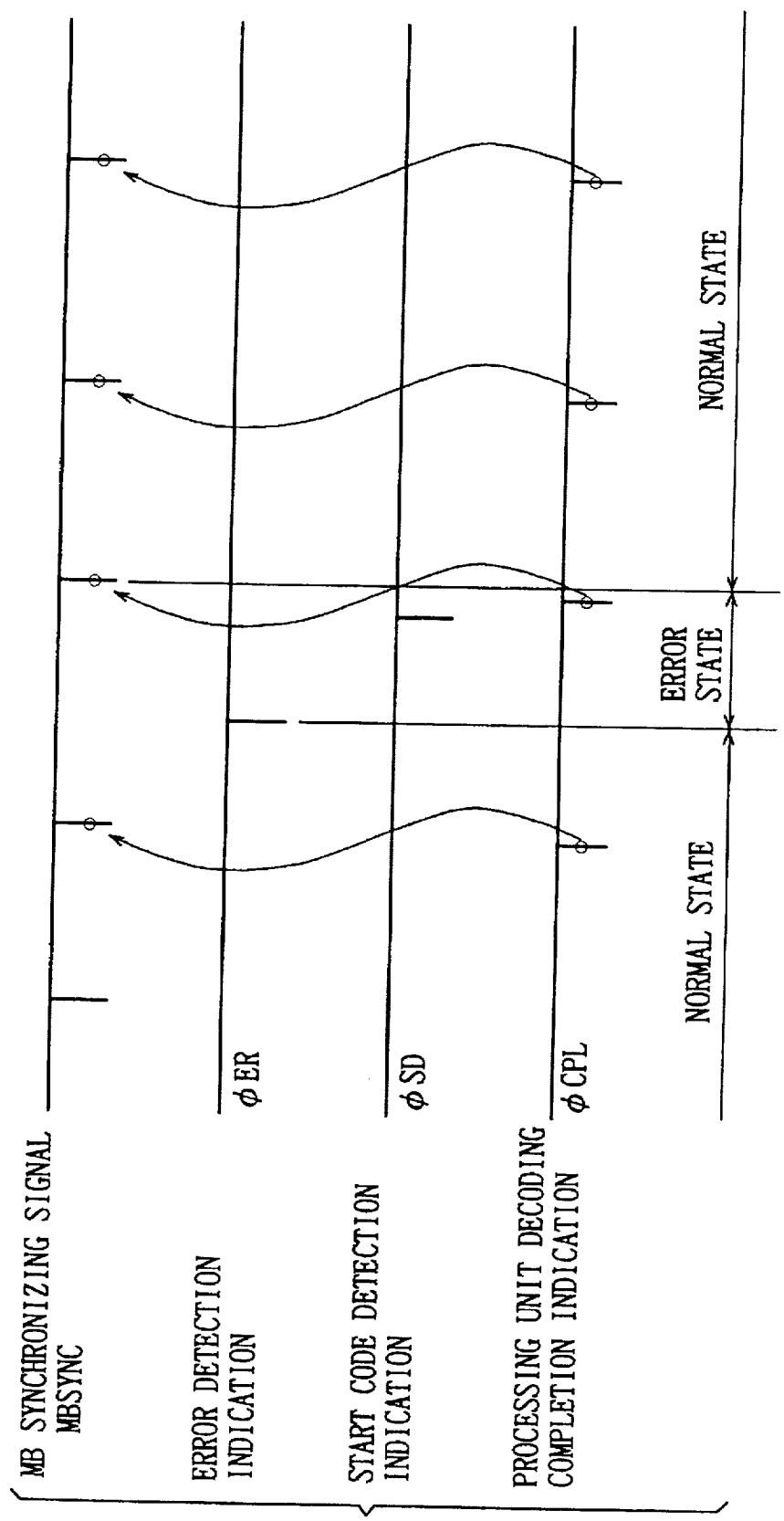
FIG. 13 illustrates an operation sequence of the structure shown in FIG. 12 in an error state.
Figure 14:
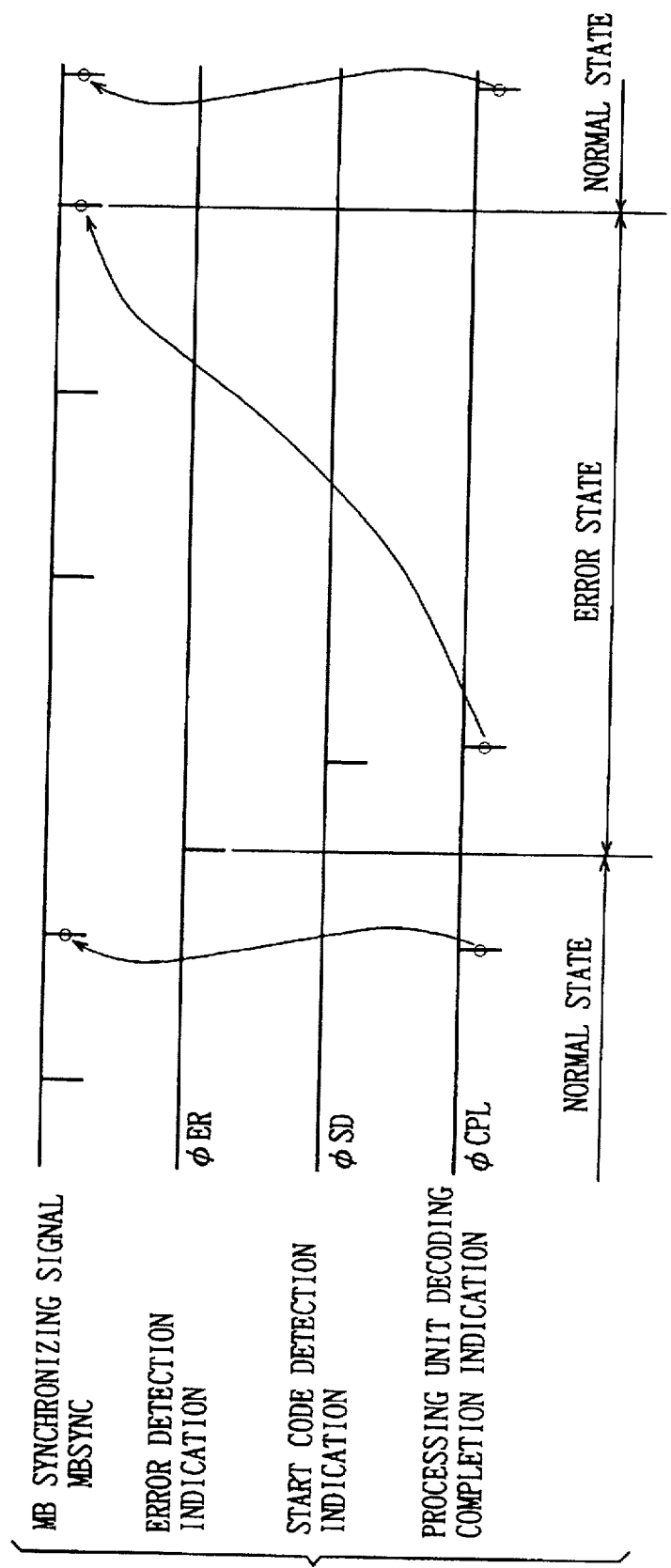
FIG. 14 illustrates another operation sequence of the structure shown in FIG. 12 in an error state.

FIG. 14 illustrates another operation sequence of the picture decoding circuit in error detection. Referring to FIG. 14, an operation sequence identical to that shown in FIG. 13 is executed after the error detection indication signal φER is asserted in error detection until the processing unit decoding completion indication signal φCPL is asserted.

Upon assertion of the processing unit decoding completion indication signal φCPL, the control unit 1226 determines a time when the segment of the analyzed header must be processed from the analyzed header information (detection of the macro block address). When the analyzed segment is not to be executed in the next processing section, the control unit 1226 asserts the MB synchronizing signal MBSYNC on conditions of assertion of the processing unit decoding completion indication signal φCPL, a lapse of a prescribed time (see FIG. 9) from the precedent MB synchronizing signal MBSYNC and vacancy (nonuse) of the DRAM port. In the error time, the processing of the block data of the analyzed segment is brought into a standby state. Until the processing section for the segment which is analyzed and brought into the standby state is reached, the MB synchronizing signal MBSYNC is asserted every lapse of the prescribed time on the condition of vacancy of the DRAM port. The vacancy of the DRAM port is made one of conditions in the error state since it is necessary to write decoded data from the picture decoding circuit in the DRAM port. In this error state, the processing unit decoding completion indication signal φCPL may be maintained in an asserted state. Namely, the processing unit decoding completion indication signal φCPL may be reset by assertion of the MB synchronizing signal MBSYNC when the block data are to be processed in the next processing section.

When the processing section for processing the segment in the standby state is reached, the picture decoding circuit enters the normal state in accordance with assertion of the MB synchronizing signal MBSYNC, to decode the block data of the segment in the standby state.

When a processing section for an actual decoding is detected from the resynchronization segment address obtained at the time of the header analysis in the error state for return to the normal state, the following method can be employed: A counter which is reset in synchronization with a picture synchronizing signal (e.g., a vertical synchronizing signal VSYNC) indicating starting of a picture is employed to count the MB synchronizing signal MBSYNC, and the macro block address (position on the screen) of each processing section is monitored in accordance with the count value. When an address subsequent to the monitored macro block address is equal to the resynchronization address, the block data of the segment at the standby state must be processed in the next processing section. Since the header information is entirely analyzed before assertion of the MB synchronizing signal MBSYNC, this determination processing can be reliably carried out in a processing section which is precedent to that for actually executing the decoding processing.

Also in such error development, the header information is entirely analyzed and the subsequent processing is brought into a standby state and processing of the standby state block data is executed in synchronization with the MB synchronizing signal MBSYNC when the processing must be carried out. The block data to be processed are immediately supplied to the variable length decoder 1212 in synchronization with the MB synchronizing signal MBSYNC also in return from the error state to the normal state, and hence the processing can be executed at a high speed. In the operation sequence shown in FIG. 14, no block data are newly supplied to the picture decoding circuit during the period of the error state. The error concealment processing described later in detail is executed in this processing section.

Figure 15:
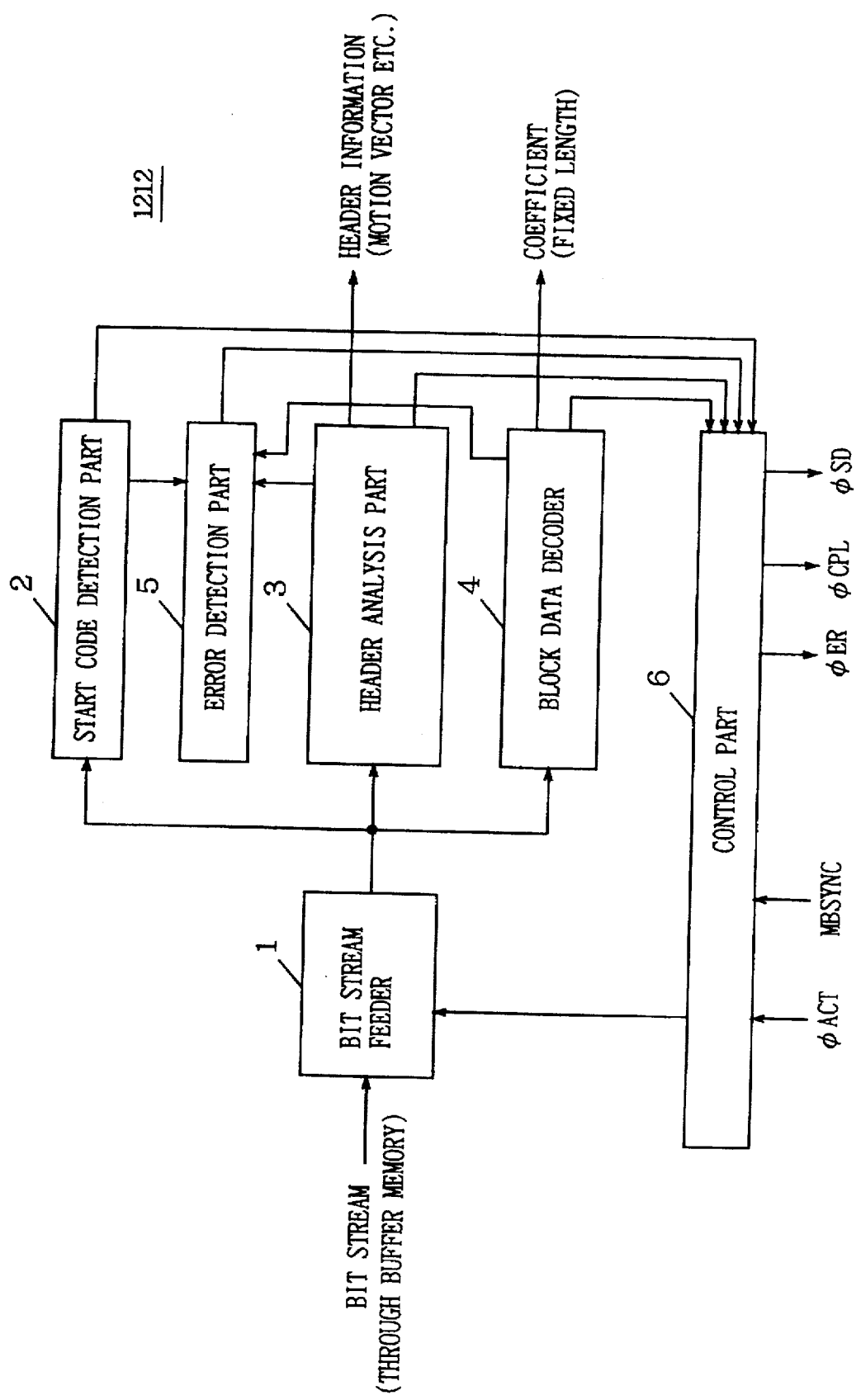
FIG. 15 illustrates the internal structure of a variable length decoder shown in FIG. 12.

FIG. 15 specifically illustrates the internal structure of the variable length decoder 1212 shown in FIG. 12. Referring to FIG. 15, the variable length decoder 1212 includes a bit stream feeder 1 receiving the bit stream which is read from the rate buffer through a buffer memory (not shown) and supplying bit stream data from the head (first) bit of a variable length symbol, a start code detector 2 receiving the data from the bit stream feeder 1 and detecting the start code, a header analysis part 3 receiving the bit stream data from the bit stream feeder 1 and analyzing the header information, a block data decoder 4 decoding the block data included in the bit stream data from the bit stream feeder 1 and generating fixed length quantized DCT coefficient data, an error detection part 5 detecting occurrence of an error in response to an error detection signal from the start code detection part 2, the header analysis part 3 and the block data decoder 4, and a control part 6 controlling the operation of the variable length decoder 1212.

The control part 6 receives a start request signal φACT (this signal is described later in relation to an operation in resetting) and the MB synchronizing signal MBSYNC, and outputs an error detection indication signal φER, a processing unit decoding completion indication signal φCPL and a start code detection indication signal φSD. This control part 6 receives a detected start code from the start code detection part 2, and asserts the start code detection indication signal φSD when the start code is effective for return to the steady state. The control part 6 also receives a header information analysis completion indication signal (detected by end bit detection of the header) from the header analysis part 3 and asserts the processing unit decoding completion indication signal φCPL. The control part 6 asserts the error detection indication signal φER in response to the error detection signal from the error detection part 5.

The control part 6 further receives the start code from the start code detection part 2, information indicating a bit lengths of analyzed variable length code from the header analysis part 3, and bit length information of a decoded variable length code from the block data decoder 4, deletes the processed (detected, analyzed or decoded) variable length code in the bit stream feeder 1, detects a next head bit of a variable length code and supplies the next variable length code from the head (first) bit to the header analysis part 3 or the block data decoder 4 from the feeder 1. The bit stream feeder 1 regularly outputs data bits successively from the most significant bit of a variable length code under the control of control part 6. The start code detector 2 constantly monitors the bit data from the bit stream feeder 1, to detect whether or not the start code is included.

The header analysis part 3 analyzes variable length code words (header information) supplied from the bit stream feeder 1 immediately subsequently to the completion of the decoding operation of the block data decoder 4 under control by the control part 6 (this control path is not shown). The block data decoder 4 is activated in synchronization with the MB synchronizing signal MBSYNC under control by the control part 6, and decodes the variable length codes supplied from the bit stream feeder 1.

The header analysis part 3 extracts information such as motion vectors, a processing method (prediction method) for the macro blocks and the like as well as return (resynchronization) segment address information in error generation for supplying to the control unit. The block data decoder 4 outputs a fixed length quantization index to the next stage inverse quantizer.

The header analysis part 3 is described as constantly analyzing variable length codes. However, the sequence header, the GOP header and the picture header are fixed length data, which are subjected to fixed length decoding. Whether the header analysis part 3 carries out analysis of fixed length codes or analysis of variable length codes is decided by the control part 6 in accordance with the start code detected in the start code detection part 2. The control part 6 instructs the header analysis part 3 about which analysis operation should be carried out in accordance with the detected start code. Alternatively, such a structure that the header analysis part 3 itself determines which operation is carried out along a syntax may be employed. Further, the start code detection part 2 is described as constantly searching for the start code. However, the start code detector 2 may alternatively be so structured that its detecting operation is stopped in operations of the header analysis part 3 and the block data decoder 4.

Figure 16:
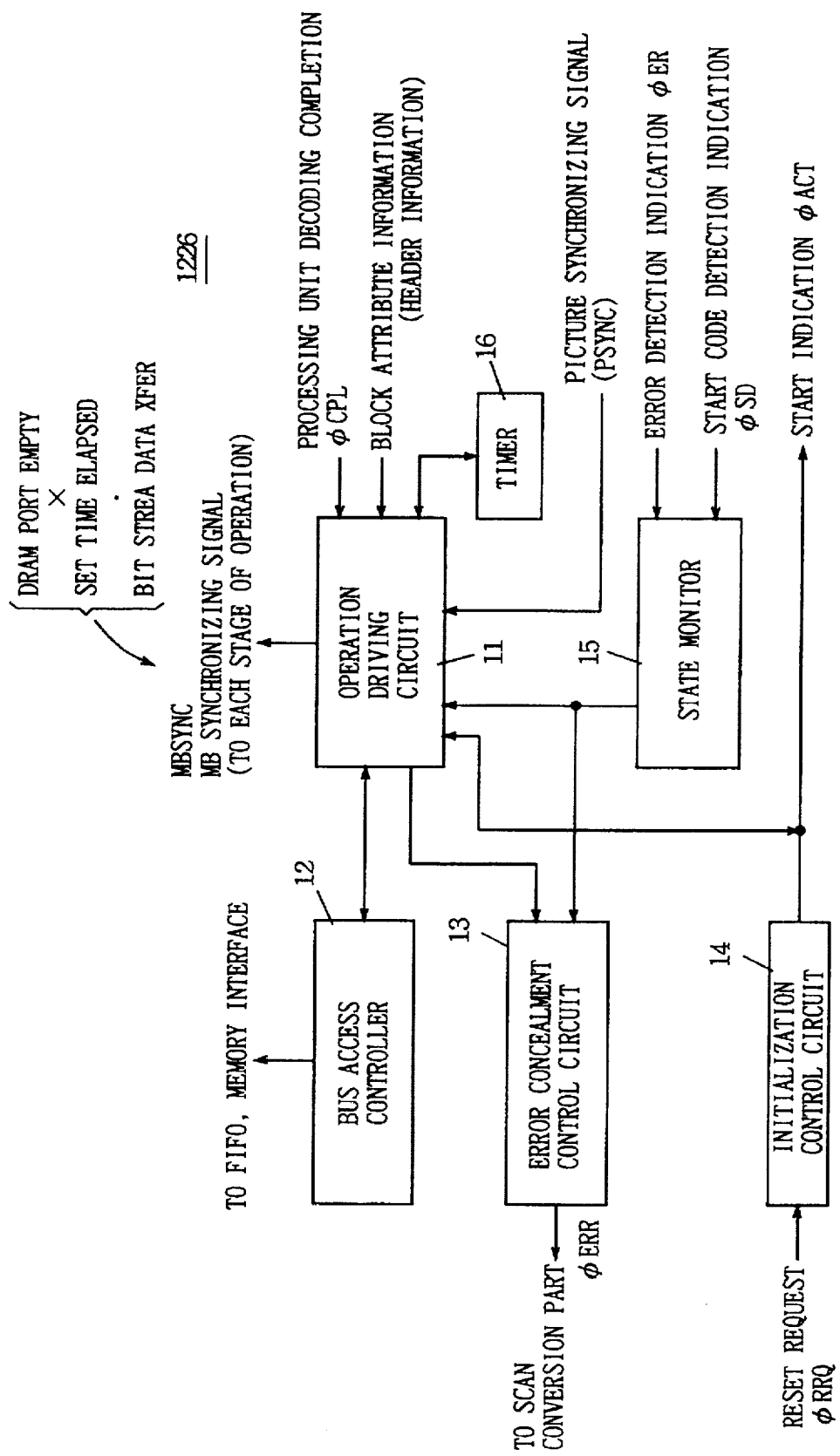
FIG. 16 is a block diagram showing the internal structure of a control unit shown in FIG. 12.

FIG. 16 specifically illustrates the internal structure of the control unit 1226 shown in FIG. 12. Referring to FIG. 16, the control unit 1226 includes an initialization control circuit 14 outputting a start indication signal φACT for the variable length decoder in response to a reset request indication signal φRRQ, a state monitor 15 monitoring the progress state of the processing of the variable length decoder in accordance with the error detection indication signal φER and the start code detection indication signal φSD from the variable length decoder, and an operation driving circuit 11 receiving the starting indication signal φACT from the initialization control circuit 14, the output signal from the state monitor 15, a picture synchronizing signal PSYNC indicating starting of a picture, a processing unit decoding completion indication signal φCPL supplied from the variable length decoder and header information (block specifying information) and supplying the MB synchronizing signal MBSYNC to respective pipeline stages of computing units of the decoding circuit.

The initialization control circuit 14 asserts the starting indication signal φACT for supplying to the variable length decoder when the reset request signal φRRQ requesting resetting of a decoding operation of picture data is asserted. This reset request signal φRRQ may be a decoding processing start indication signal for instructing the starting of decoding the picture data, or a reset request indication signal resulting from interruption of an external control unit. Further, the reset request signal φRRQ may be generated when an error state is caused in continuation for a prescribed time duration or the error detection indication signal is successively asserted by a prescribed number of times in a prescribed time.

The state monitor 15 informs the operation driving circuit 11 of the fact that an error occurs in the decoding process of the variable length decoder in response to assertion of the error detection indication signal φER, and of the fact that the variable length decoder enters a preparation stage for return to the normal state upon assertion of the start code detection indication signal φSD.

The operation driving circuit 11 starts clocking of a timer 16 upon assertion of the MB synchronizing signal MBSYNC. The timer 16 carries out its counting operation, and supplies a time-out signal to the operation driving circuit 11 upon reaching a set time. This timer 16 may be so structured that the operation driving circuit 11 changes the set time in accordance with block attribute information (header information) supplied from the variable length decoder (see FIG. 8). In a normal state, the operation driving circuit 11 asserts the MB synchronizing signal MBSYNC when the processing unit decoding completion indication signal φCPL is asserted, the time-out signal from the timer 16 is asserted and a signal indicating a vacant state (reading from the rate buffer is completed) of a DRAM port is received from a bus access controller 12.

Upon error generation, the operation driving circuit 11 carries out the following operation in accordance with a signal outputted from the state monitor 15: The operation driving circuit 11 includes a counter (not shown) which is reset in response to the picture synchronizing signal PSNC and counts up every assertion of the MB synchronizing signal MBSYNC. The count value of this counter indicates the position on the screen (macro block address) of the segment processed in the variable length decoder. When it is informed from the state monitor 15 of the fact that a start code effective for normal return is detected in accordance with the start code detection indication signal φSD, the operation driving circuit 11 extracts a resynchronization address from the block attribute information which is supplied following the start code detection indication signal φSD. It compares the resynchronization address with the count value of the counter, and determines whether or not it is possible to return to the normal state from the next processing section. If it is possible to return to the normal state at the next processing section, the operation driving circuit 11 asserts the MB synchronizing signal MBSYNC in response to assertion of the processing unit decoding completion indication signal φCPL which is supplied following the start code detection indication signal φSD, time out indication of the timer 16 and a rate buffer reading completion (DRAM port empty) indication signal from the bus access controller 12. The respective operational processors following the variable length decoder (block data decoder of FIG. 15) operate in response to the MB synchronizing signal MBSYNC.

When the next processing section is not yet that in which return to the normal state should be made, on the other hand, the operation driving circuit 11 outputs the MB synchronizing signal MBSYNC in accordance with the time-out signal outputted from the timer 16 and the signal of the bus access controller 12 indicating nonuse of the DRAM port. In this error state (the state where the next processing section is not that in which return to the normal state should be made), the MB synchronizing signal MBSYNC may be supplied to the pipeline stages of the respective operational processors excluding the variable length decoder. Alternatively, the MB synchronizing signal MBSYNC may be supplied to the respective operational processors of the pipeline stages including the variable length decoder (block data decoder) while a normal return inhibition signal is asserted from the operation driving circuit 11 to be supplied to the variable length decoder simultaneously at this time so that a variable length decoding operation by the variable length decoder can be inhibited. Also in the error state, the picture decoding circuit outputs picture data (the error concealment processing described later is carried out).

When a segment in a standby state is to be executed in the next processing section, the operation driving circuit 11 asserts the MB synchronizing signal MBSYNC in accordance with the time-out signal outputted from the timer 16 and the signal indicating the empty state of the DRAM port outputted by the bus access controller 12. Thus, the operation driving circuit 11 returns to the normal state, and stops the operation of comparing the count value of the counter with the resynchronization segment address. In this normal state, the operational processors following the variable length decoder (block data decoder) operate in accordance with the MB synchronizing signal MBSYNC from the operation driving circuit 11, to execute prescribed normal processing respectively.

The bus access controller 12 controls an access operation to the DRAM port under control by the operation driving circuit 11. Namely, it executes port control of the FIFO interface 1210 and the memory interface 1224 shown in FIG. 32 successively in a prescribed order. Namely, the bus access controller 12 first writes completely decoded picture data from the pixel reconfigurator 1220 in the external memory (DRAM) 1230 through the memory interface 1224 in synchronization with the MB synchronizing signal MBSYNC from the operation driving circuit 11 (in a normal operation).

After completion of this write operation, the bus access controller 12 executes writing of the bit stream from the FIFO interface 1210 in the external memory (DRAM) through the memory interface 1224 (writing in the rate buffer), reading of display picture data from the external memory (DRAM) 1230 in the pixel bus interface 1222 through the memory interface 1224, transfer of predictive picture data from the external memory (DRAM) 1230 through the memory interface 1224, and transfer of data from the external memory (DRAM) 1230 into the variable length decoder through the FIFO interface 1210 and the memory interface 1224 (transfer to a buffer memory (not shown)) (reading of the rate buffer). During this time, the bus access controller 12 executes refreshing of the external memory (DRAM) 1230 at prescribed intervals, and inhibits access to the external memory during this refreshing. In the error state, the bus access controller 12 may utilize the period of reading predictive picture data as a period of reading data from the rate buffer in response to the error state indication signal from the operation driving circuit 11. Further, a completion time of reading the predictive picture data may be decided in accordance with the block attribute information from the operation driving circuit 11.

An error concealment control circuit 13 controls the error concealment processing described later in detail. This error concealment control circuit 13 is started in response to the error detection indication signal φER from the state monitor 15 to instruct the error concealment processing (signal φERR) to the scan conversion part or to the pixel reconfigurator and the scan conversion part, and instructs completion of this error concealment processing in response to a normal state return indication from the operation driving circuit 11.

According to the embodiment of the present invention, as hereinabove described, the start code which is effective for return from the error state to the steady (normal) state is detected in error generation, then analysis of the header information of the segment is executed and processing of the block data of the segment is delayed up to arrival of the processing section for actual processing, whereby return to the normal state can be carried out also in error development without reducing the utilization efficiency of the operational processors.

Figure 17:
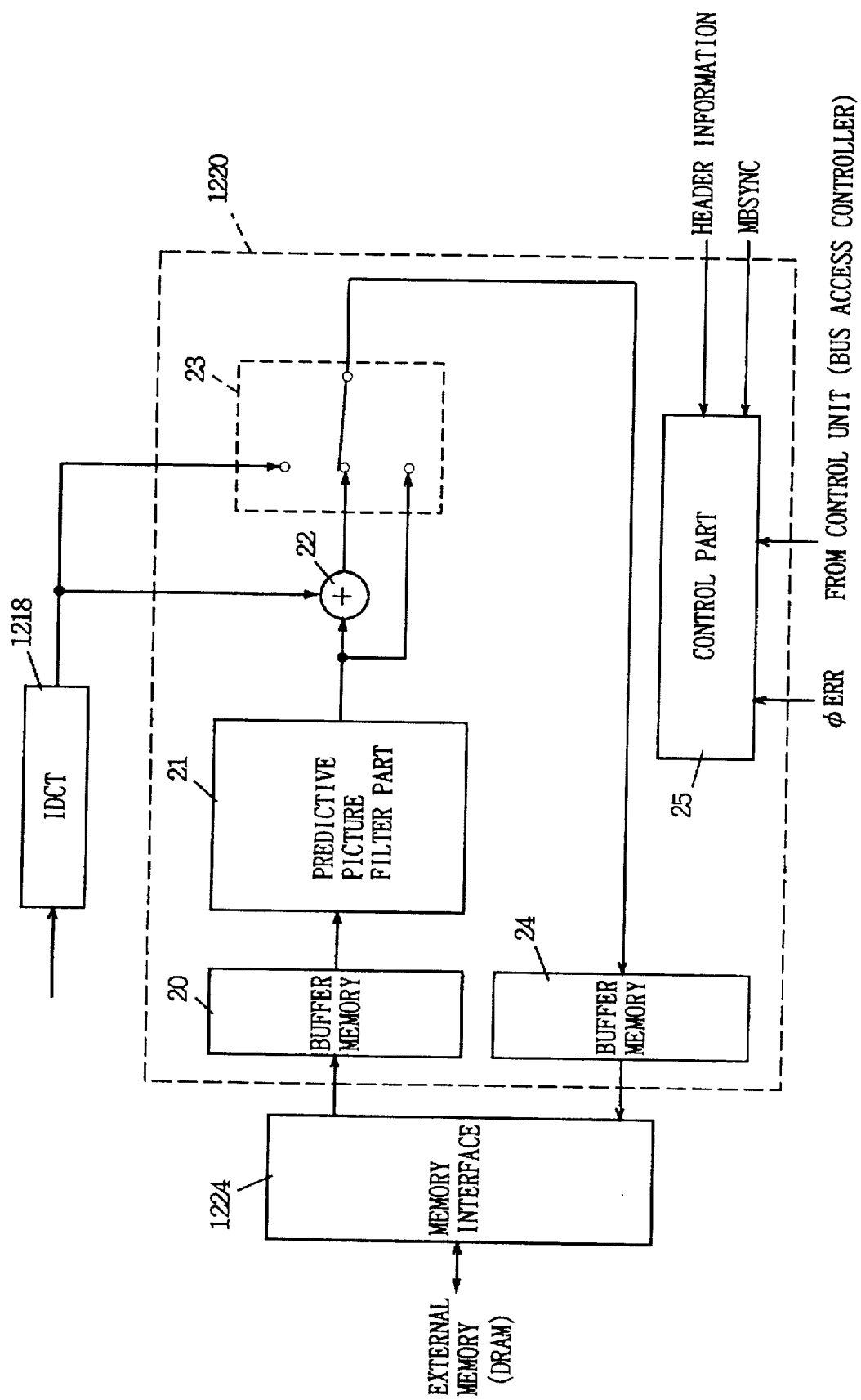
FIG. 17 illustrates the structure of a pixel reconfigurator in the picture decoding circuit according to the present invention.

Error Concealment Processing 1:

FIG. 17 schematically illustrates the structure of the pixel reconfigurator 1220 of the picture decoding circuit according to the present invention. Referring to FIG. 17, the pixel reconfigurator 1220 includes a buffer memory 20 temporarily storing data supplied through the memory interface 1224, a predictive picture filter part 21 forming predictive pictures through the picture data stored in the buffer memory 20, a computing element 22 5 illustrated as an adder for adding up data from the inverse discrete cosine transformation part (IDCT) 1218 and an output signal from the predictive picture filter part 21 and carrying out DPCM decoding, a selection circuit 23 selecting one of the data outputted from the IDCT 1218, data outputted from the computing element 22 and the pixel data from the predictive picture filter part 21, and a buffer memory 24 temporarily storing output data of the selection circuit 23. The storage data of the buffer memory 24 are stored in the external memory (DRAM) as decoded pixel data through the memory interface 1224. Macro block types of B pictures include (1) intra-frame/intra-field prediction employing neither one of forward prediction and reverse (backward) prediction, (2) forward prediction in which prediction is made based on past reproduced pictures, (3) reverse prediction in which prediction is made based on the future pictures, and (4) interpolation prediction employing both of past and future pictures.

The predictive picture filter part 21 carries out prescribed processing in accordance with the macro block type, and forms predictive pictures. The pixel reconfigurator 1220 further includes a control part 25 for controlling the operation of pixel reconfiguration. The control part 25 receives header information supplied from the variable length decoding part, the MB synchronizing signal MBSYNC and the error detection indication signal φERR from the control unit (see FIG. 16), and a bus employment allowing signal from the control unit (bus access controller). The control part 25 decides filter processing which is executed in the predictive picture filter part 21 in accordance with the macro block type included in the header information. Further, the control part 25 controls data writing and data reading in and from the buffer memories 20 and 24 in synchronization with the MB synchronizing signal MBSYNC.

As to picture data which are loaded in the buffer memory 20 through the memory interface 1224, addresses are generated in accordance with motion vector information formed through the result of analysis of the header analysis part in the variable length decoder and necessary picture data (reference segment data) is read from the external memory (DRAM). In error development, the motion vector information is formed on the basis of transmitted motion vector information. As described later, this motion vector may be set at zero in the case of an error generation. Alternatively, motion vector indicating a macro block which is precedent by one line may be employed in the case of an error generation. Namely, macro block data of a corresponding portion in the predictive picture(s) are read in error generation.

Under control by the control part 25, the selection circuit 23 selects the data from the IDCT 1218 when the processed macro block is an intra-predicted macro block (I pictures and intra-predicted B pictures), selects the data outputted from the computing element 22 with respect to a prediction encoded macro block other than intra prediction, and selects the output data from the predictive picture filter part 21 in error processing. An error countermeasure operation in the case of employing the pixel reconfigurator shown in FIG. 17 is now described.

Figure 18:
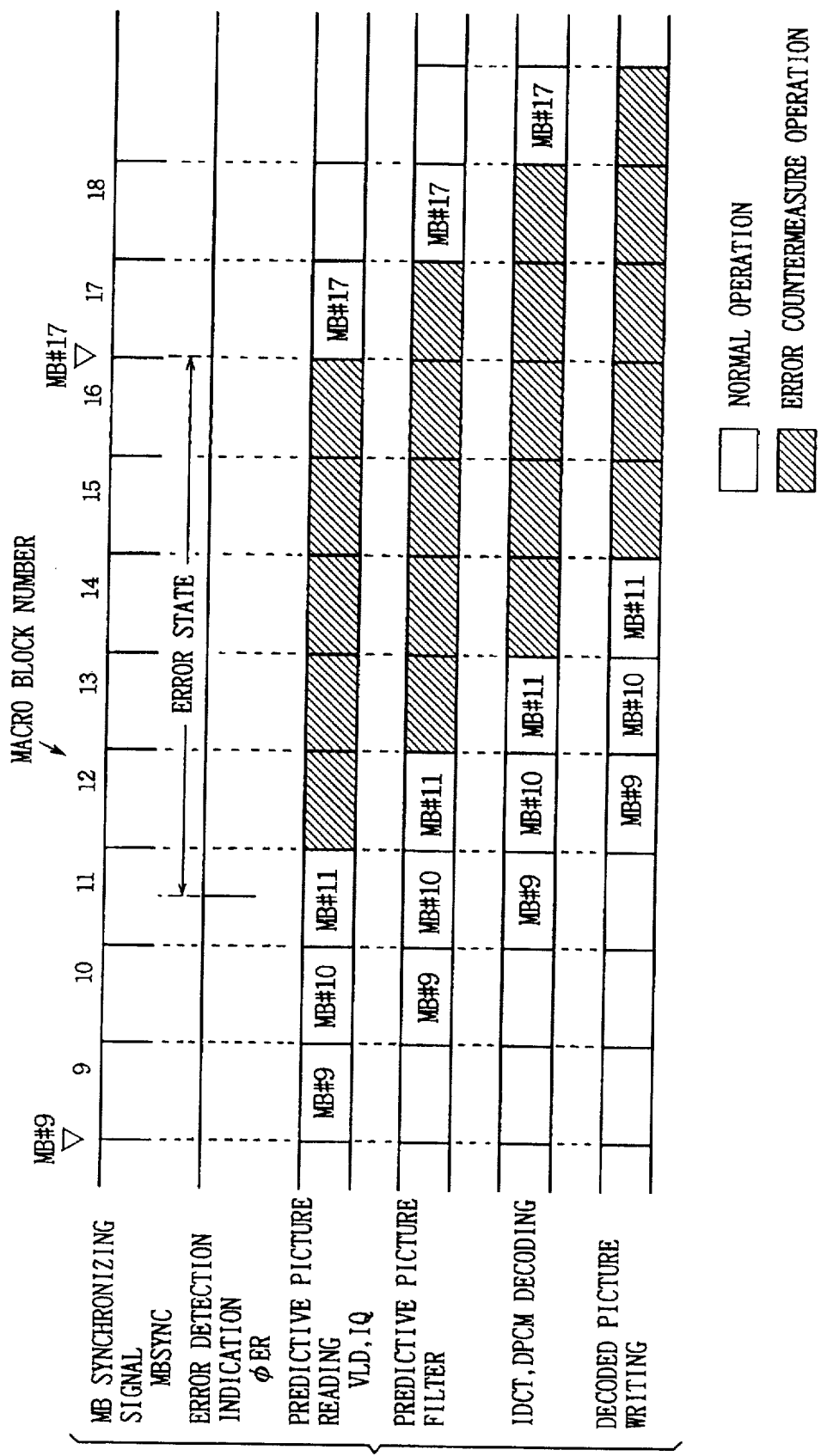
FIG. 18 illustrates an operation sequence in an error state in the picture decoding circuit according to the present invention.

FIG. 18 is an operation sequence diagram representing the error countermeasure operation of the picture decoding circuit in error processing. As shown in FIG. 18, the picture decoding circuit is formed into four pipeline stages in units of segments (macro blocks), similarly to the aforementioned embodiment. Consider that an error occurs in a decoding process for block data of a segment MB#11. The error detection indication signal φER (φERR) is asserted in this state, while the variable length decoder and the control unit execute the aforementioned operations upon generation of an error. In the processing section during which this error occurs, the pixel reconfigurator 1220 shown in FIG. 17 carries out a pixel decoding operation so that restored pixel data are stored in the buffer memory 24. When a next processing section is started, predictive picture data for error concealment of a part corresponding to a macro block MB#12 are stored in the buffer memory 22 through the memory interface 1224. The predictive picture filter part 21 forms predictive picture data for the macro block MB#11. On the other hand, the IDCT 1218 forms inverse-quantized data of block data of a macro block MB#10, so that pixel-restored data are formed in accordance with the macro block type thereof through the selection circuit 23 and successively written in the buffer memory 24. In the buffer memory 24, on the other hand, previously stored decoded pixel data of a macro block MB#9 are written in the DRAM through the memory interface 1224. In the buffer memories 20 and 24, new data are written after storage data thereof are entirely read out.

Thereafter pipeline processing is successively executed so that data of corresponding macro blocks of the predictive pictures are successively read from the external memory (DRAM) and picture data are generated in this error state (slanted areas in FIG. 18).

Predictive picture pixel data read in the processing section for the macro block MB#12 are selected by the selection circuit 23. Thus, corresponding pixel data of the predictive pictures are successively stored in the buffer memory 24. The predictive picture filter part 21 carries out filter processing in accordance with a predetermined rule in error detection.

Therefore, pixel data subjected to error countermeasures, i.e., pixel data of predictive pictures, are successively stored in the DRAM from a processing section for processing a macro block MB#15.

When the error state is ended in a processing section for a macro block MB#16, processing of a macro block MB#17 is executed from the next processing section. In this case, the selector 23 selects either data outputted from the IDCT 1218 or data outputted from the computing element 22 in accordance with header information when the processing of the block data of the macro block MB#17 reaches the third pipeline stage.

Figure 19:
FIG. 19 illustrates an error concealment processing in the picture decoding circuit according to the present invention.

Due to the aforementioned series of operations, pixel data which are missed by an error can be replaced by pixel data of predictive pictures in an error state, thereby suppressing picture quality deterioration of decoded picture images caused by mixing of an error bit (see FIG. 19). Namely, it is possible to suppress deterioration in quality of decoded images in the macro blocks MB#12 to MB#16 in the error state, as shown in FIG. 19.

Figure 20:
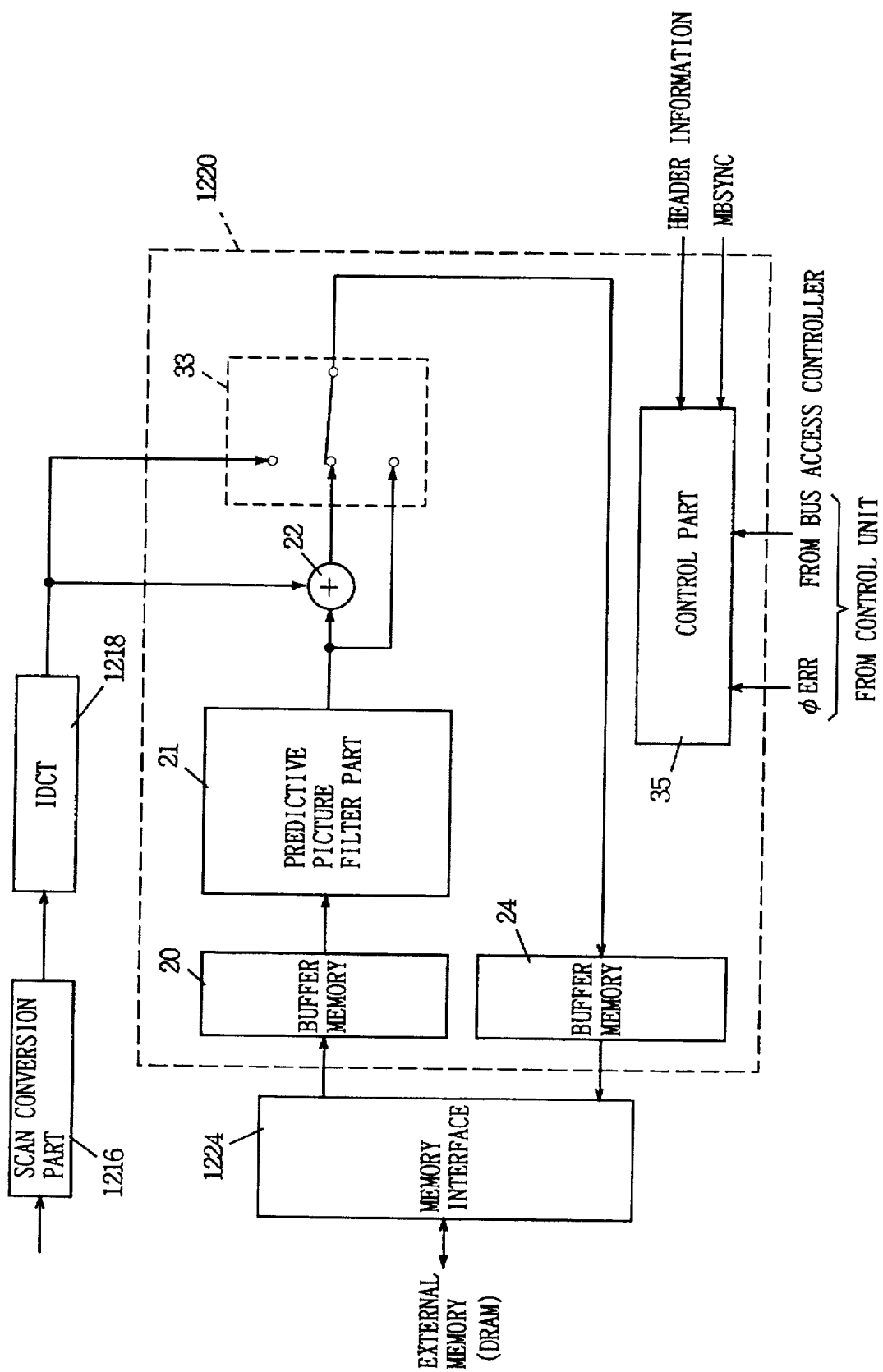
FIG. 20 illustrates another structure of the pixel reconfigurator in the picture decoding circuit according to the present invention.

Error Concealment Processing 2:

FIG. 20 illustrates the structure of a pixel reconfigurator 1220 for implementing second error concealment processing according to the present invention. In the structure of the pixel reconfigurator shown in FIG. 20, a control part 35 sets a selection circuit 33 in a state selecting an output signal of an IDCT 1218 in response to header information, an MB synchronizing signal MBSYNC, an output signal of a bus access controller and an error concealment control circuit included in the control unit of FIG. 6 when an error is generated. Other structures are identical to those shown in FIG. 17, and corresponding parts are denoted by the same reference numerals. In a normal state, the control part 35 makes a computing element 22 process (DPCM-decode) pixel data from a predictive picture filter part 21 and pixel data outputted from the IDCT 1218, and thereafter selects an output signal from the IDCT 1218 or the computing element 22 through the selector 33 in accordance with the type of this picture for writing into a buffer memory 24. In an error state, i.e., in activation of a signal φERR, the control part 35 controls the selection circuit 33 and sets the same in a state selecting the data outputted from the IDCT 1218 regardless of the picture type.

The IDCT 1218 is supplied with data outputted from a scan conversion part 1216 whose structure is hereafter described in detail. As hereafter described in detail, in an error state, the scan conversion part 1216 supplies the IDCT 1218 with decoded macro block data precedent by one line (data before IDCT processing) in the same picture or a predetermined fixed value (when no macro block precedent by one line is present) from a processing section following that having the error caused.

Figure 21:
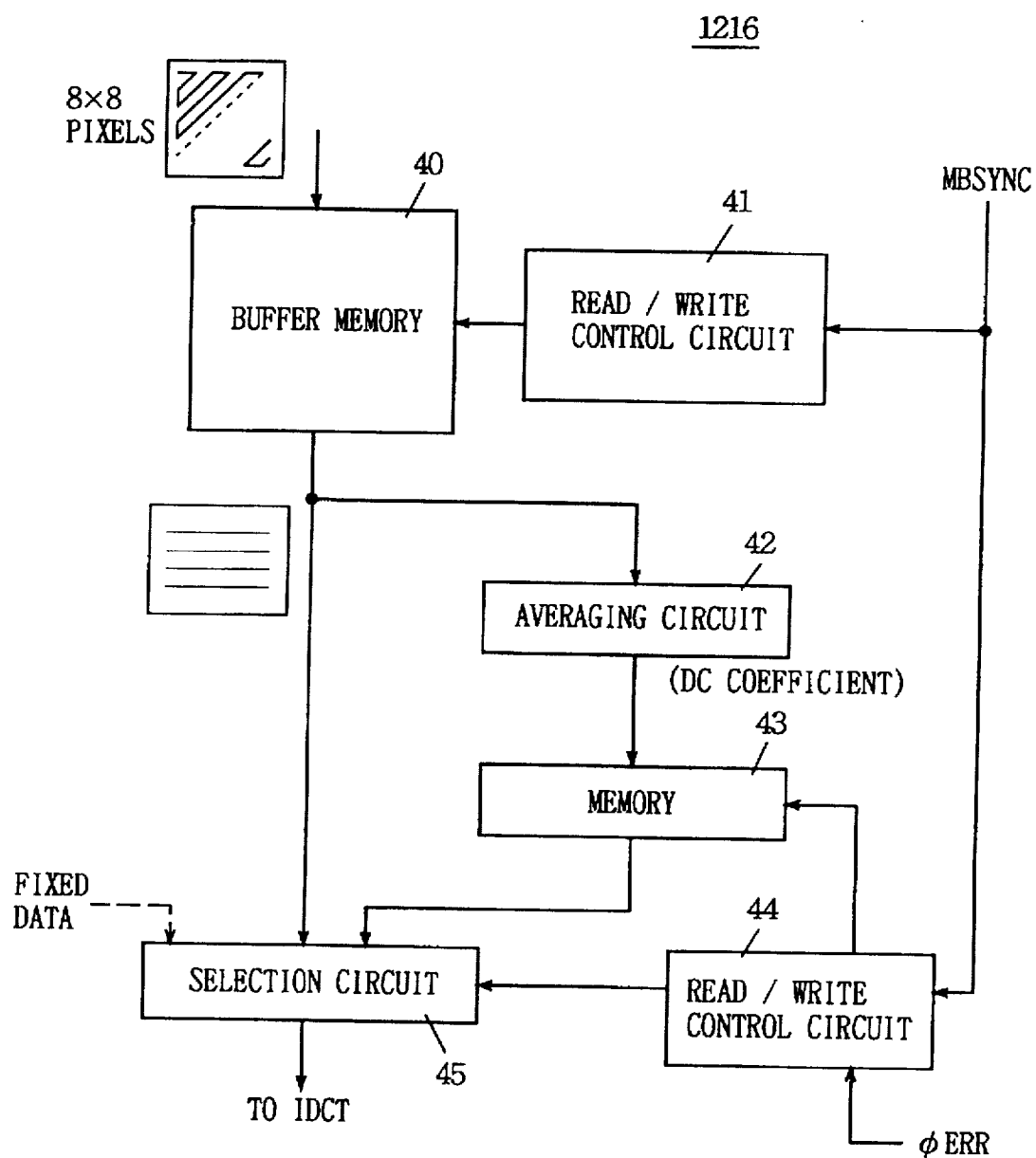
FIG. 21 illustrates the structure of a scan converter shown in FIG. 20.

FIG. 21 illustrates the internal structure of the scan conversion part 1216 shown in FIG. 20 in detail. Referring to FIG. 21, the scan conversion part 1216 includes a buffer memory 40 successively storing inverse-quantized DCT coefficient data outputted from an inverse quantizer and then outputting the stored data in the raster scan order, a read/write control circuit 41 controlling data writing and data reading of the buffer memory 40, an averaging circuit 42 obtaining the average value of DCT coefficients read from the buffer memory 40, a memory 43 storing average data of macro blocks by one line, for example, among average value data outputted from the averaging circuit 42 in a FIFO fashion, a read/write control circuit 44 controlling data writing and reading of the memory 43, and a selection circuit 45 selecting either DCT coefficient data outputted from the buffer memory 40 or data from the memory 43 for outputting to the IDCT 1218 under control by the read/write control circuit 44.

The read/write control circuit 41 stores in buffer memory 41 inverse quantized DCT coefficient data which are supplied from the inverse quantizer at the precedent stage in synchronization with the MB synchronizing signal MBSYNC. This read/write control circuit 41 simply has a function of converting read and write addresses for the buffer memory 40, and adjusts the addresses to re-arrange the DCT coefficients, which have been scanned in a zigzag scan fashion, into the raster scan order for outputting. The address generation may be so done that either read or write addresses are generated in a predetermined sequence while the other addresses are successively incremented so that zigzag-scanned pixel data are re-arranged in the raster scan order. The zigzag scan converter 1216 may not be particularly included in a pipeline stage, since it functions as a buffer circuit by the buffer memory 40. Therefore, the read/write control circuit 41 may be formed to generate addresses in synchronization with an input synchronizing signal indicating starting of the DCT coefficient data. The averaging circuit 42 obtains the average value of the DCT coefficient data which are read from the buffer memory 40. At this time, the average value may be obtained by arithmetic mean values (all DC and AC coefficients) of all DCT coefficient data. In a block of 8 by 8 pixels, however, a DC coefficient indicates the average value of pixel data of the block. Therefore, the averaging circuit 42 may obtain the average value of the DCT coefficient data of four blocks for a luminance signal while utilizing the DC coefficient as the average value for a chrominance signal, with respect to one macro block.

The memory 43 stores average value data of DCT coefficients with respect to respective macro blocks for one line, for example, in the FIFO fashion. Operations of the scan conversion part and the pixel reconfigurator shown in FIGS. 20 and 21 are now described with reference to FIG. 22, which is an operation sequence diagram.

Figure 22:
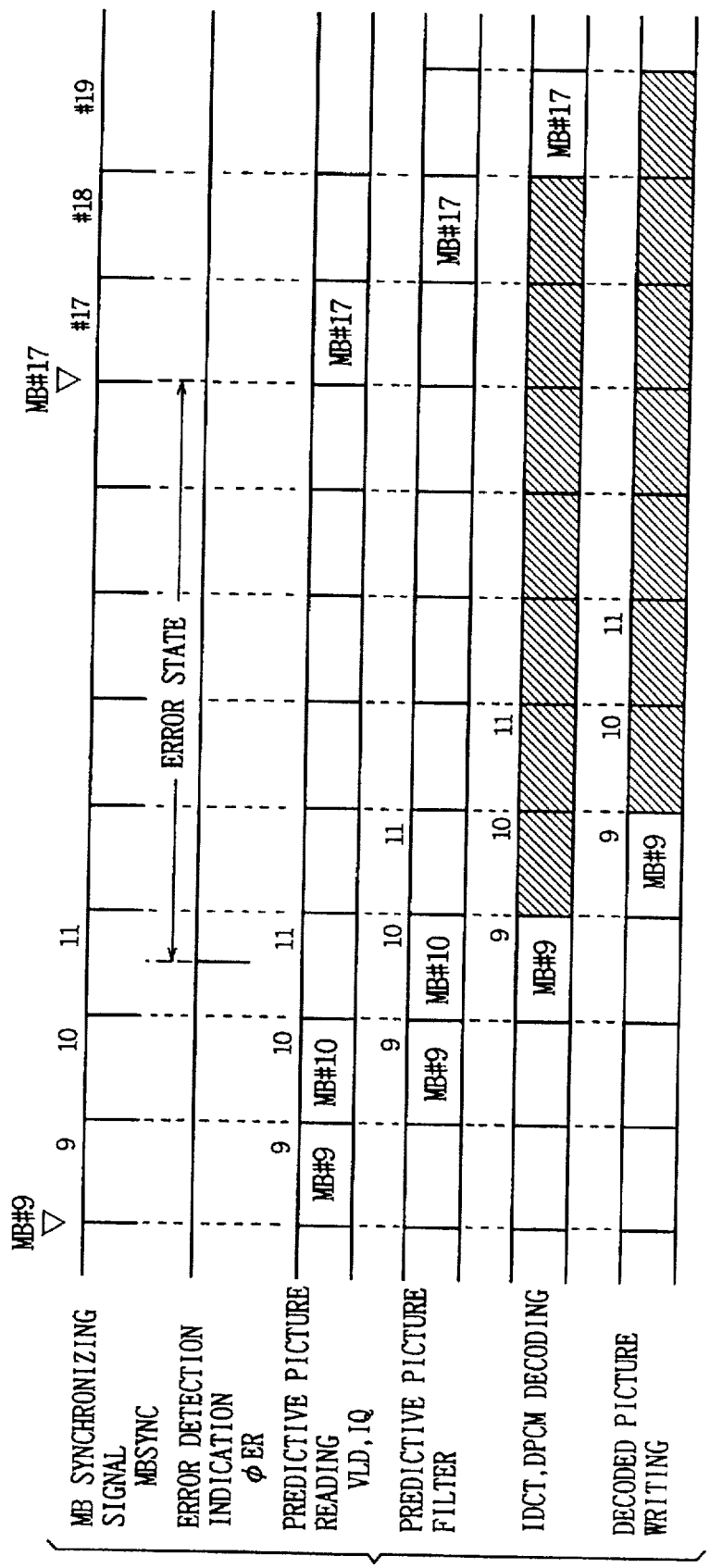
FIG. 22 illustrates still another operation sequence in an error state in the picture decoding circuit according to the present invention.

FIG. 22 illustrates operations in the case where an error is caused in decoding of block data of a macro block MB#11 and return is made to a normal state from a macro block MB#17, for example.

When an error detection indication signal φER is asserted, an error indication signal φERR from the error concealment control circuit is asserted in response (no φERR is shown in FIG. 22). In response to the assertion of the error detection indication signal φERR, the read/write control circuit 44 shown in FIG. 21 inhibits writing of average value data to the memory 43. Namely, storage of an average value data of DCT coefficient data calculated is inhibited in the case of error detection. Therefore, the memory 43 stores the average value of DCT coefficients of one-line worthy macro blocks up to a macro block MB#9. No average value data of DCT coefficients of a macro block MB#10 is stored in the memory 43. Average value data of DCT coefficients of a macro block which is precedent to the macro block MB#10 just by one line is stored in a head address position of the memory 43. In a processing section having this error caused, pixel restoration processing for the macro block MB#9 is executed. Namely, the selection circuit 33 shown in FIG. 20 selects either an output signal of the computing element 22 or data outputted from the IDCT 1218 and supplies the selected one to the buffer memory 24, in accordance with an output signal from the control part 35.

In a processing section subsequent to that having the error caused, the read/write control circuit 44 shown in FIG. 21 reads average value data of DCT coefficients of a macro block, which is precedent by one line, stored in the head position from the memory 43 in response to the error indication signal φERR, and supplies the read average data to the IDCT 1218 through the selection circuit 45. The memory 43 may store one average value data for luminance blocks of the macro block, or average value data for respective luminance signal blocks (since the IDCT 1218 executes inverse discrete cosine transformation processing in units of 8 by 8 pixels).

The selection circuit 33 shown in FIG. 20 is set in a state of selecting data outputted from the IDCT 1218, under control by the control part 35. In the processing section subsequent to that having the error caused, therefore, pixel restoration (DPCM decoding) is executed in accordance with the pixel data of the macro block which is precedent by one line. As shown in FIG. 22, therefore, the error concealment processing can be executed from the macro block which is ahead of that having the error caused while the error concealment processing can be executed also for the macro block causing the error, whereby picture quality deterioration caused by mixture of an error bit can be further suppressed. Data of different macro blocks are successively read from the memory 43 every processing section in synchronization with the MB synchronizing signal MBSYNC.

When return is made from the error state to the normal state, the data from the memory 43 are selected and supplied to the IDCT 1218 in the processing section if the error indication signal φERR is deasserted, average value data from the averaging circuit 42 are written in the memory 43 in the next processing section, and the selection circuit 45 is set in a state of selecting the output of the buffer memory 40 in a processing section subsequent to the next one.

The memory 43 stores the data in the FIFO fashion, and hence the state of successively storing the pixel block data for one line is maintained also when the average value of block data of the macro block MB#17 is newly written in the memory 43 in the FIFO fashion.

In the return to the normal state, data may be written in the buffer memory 40 in synchronization with an input synchronizing signal indicating starting of block data supplied from the precedent stage inverse quantizer under control by the read/write control circuit 41. Alternatively, a normal state return indication signal may be supplied to the read/write control circuit 41 from the control unit so that the writing is performed from the processing section supplied with the normal state return indication signal (when the scan conversion part forms the final substages of the first pipeline stage including multiple substages (the first pipeline stage is up to data writing in the buffer 40)). Alternatively, the data may be written in the buffer memory 40 under control by the read/write control circuit 41 from a processing section subsequent to the processing section of return to the normal state (when the scan conversion part is included in the third pipeline stage). Alternatively, the scan conversion part 1216 may be arranged to form a part of the second pipeline stage.

When the error is caused at the head of the picture, a predetermined fixed value is employed since no corresponding average value data is present. While this structure is not shown, either average value data or fixed value data may be selected in accordance with address (position on the screen) information of the processed macro block, as shown in the dotted line in FIG. 21.

FIG. 23 illustrates modes of the macro blocks which are subject to error-concealment process in the second error concealment processing shown in FIGS. 20 to 22. As shown in FIG. 23, the error concealment processing is executed through pixel data of a macro block which is ahead of the macro block MB#10, precedent to the macro block MB#11 having the error caused, by one line. Namely, the block data of the macro blocks MB#10 to MB#16 are replaced by pixel data of macro blocks MB#2 to MB#8 which are precedent by a single line in the same picture.

In the above description, the error concealment processing is carried out through the average value of the block data of the precedent macro blocks in error development. A line memory storing pixel data of macro blocks for one line may be arranged in the pixel reconfigurator 1220 so that decoded pixel data of the macro blocks stored in this line memory are stored in the external memory (DRAM) through the buffer memory 24 for replacing the respective pixel data with those of the macro block precedent by one line respectively in error development.

According to the structure of the embodiment of the present invention, as hereinabove described, the error concealment processing can be efficiently executed by effectively utilizing the pipeline stages of the picture decoding circuit. Particularly when the error concealment processing is carried out through decoded data (variable length decoded data) in the same picture, the error concealment processing can be executed from the macro block which is precedent in processing order to the segment (macro block) having the detected error, whereby further effective error concealment processing can be carried out and picture quality deterioration caused by mixing of an error bit can be suppressed.

Initialization Operation 1: Restarting (Return from Error)

Figure 24:
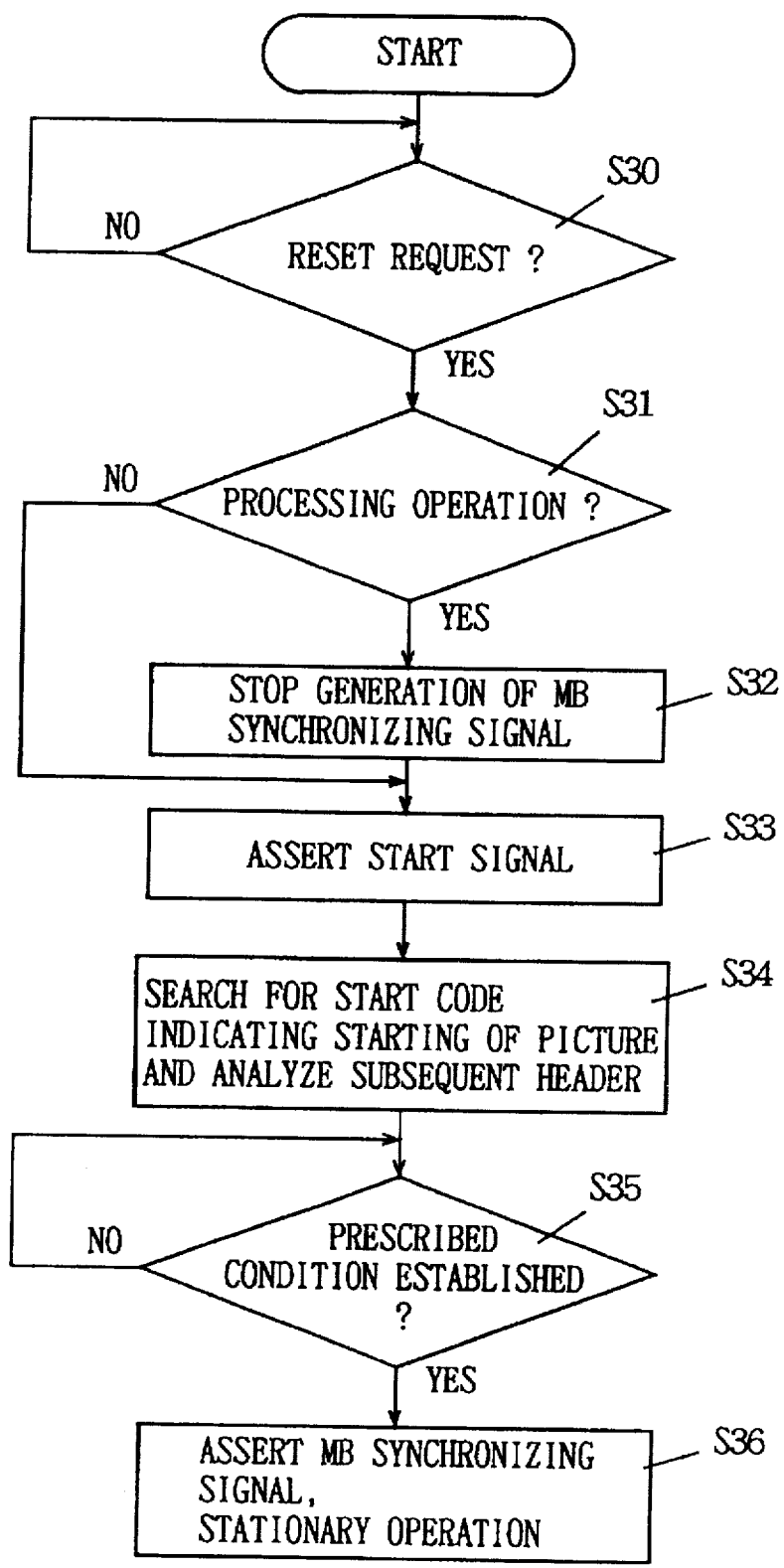
FIG. 24 is a flow chart representing an operation in resetting (restarting) of the picture decoding circuit according to the present invention.

FIG. 24 is a flow chart showing an initialization operation of the picture decoding circuit. The initialization operation of the picture decoding circuit according to the present invention is now described.

First, a determination is made as to whether or not a reset request is made (step S30). This reset request is made in restarting when break of display by interruption through an external control unit or an error state continues over a prescribed time (when a state of returning from an error state to the normal state followed by re-return to the error state is continued).

When a reset request (restart instruction) is made, the control unit 1226 (see FIG. 16) first determines whether or not this picture decoding circuit currently carries out decoding of picture data (step S31). If decoding of the picture data is currently carried out (when a pixel restoration operation is carried out: including an operation in an error state), generation of the MB synchronizing signal MBSYNC from the next processing section is stopped (step S32). When generation of the MB synchronizing signal MBSYNC is stopped, the start signal φACT (R) is asserted and supplied to the variable length decoder (see FIG. 15). When no pixel restoration operation is carried out at the step S31, on the other hand, the step S32 is skipped and the start signal φACT (R) is asserted at a step S33.

The variable length decoder searches for a start code indicating starting of a picture in response to the assertion of the start signal φACT (R). Namely, it searches for a sequence start code, a GOP start code or a picture start code. At this time, a slice start code is neglected because a new picture is searched. When a start code indicating starting of a picture is detected, information of a header part following this start code is analyzed, and header information of a segment of a macro block layer is analyzed (step S34). Establishment of prescribed conditions is waited in the state of having analyzed the header information (step S35). The prescribed conditions are that a sufficient quantity of bit stream is stored in the rate buffer and a vertical synchronizing signal supplied from the external display control unit is asserted. It is possible to discriminate whether or not a sufficient quantity of bit stream is stored in the rate buffer by detecting difference between write and read addresses of FIFO area of the external memory device (DRAM) through the bus access controller 12 shown in FIG. 16.

When the prescribed conditions are established, the control unit asserts a picture synchronizing signal indicating the starting of the picture, resets a counter included in its interior for indicating a macro block address, asserts the MB synchronizing signal in synchronization with the picture synchronizing signal, and makes the picture decoding circuit execute a normal operation (step S36). Due to the assertion of the MB synchronizing signal MBSYNC in synchronization with the picture synchronizing signal PSYNC, display picture data can be correctly read in synchronization with a vertical synchronizing signal, for example, supplied from the external control unit when the reset request is made and a new picture is displayed. Further, pixel decoding operations can be successively executed in parallel with the picture display.

The series of operations through the steps S30 to S33 are executed by the initialization control circuit 14 shown in FIG. 16.

Initialization Operation 2: Reset Operation

Figure 25:
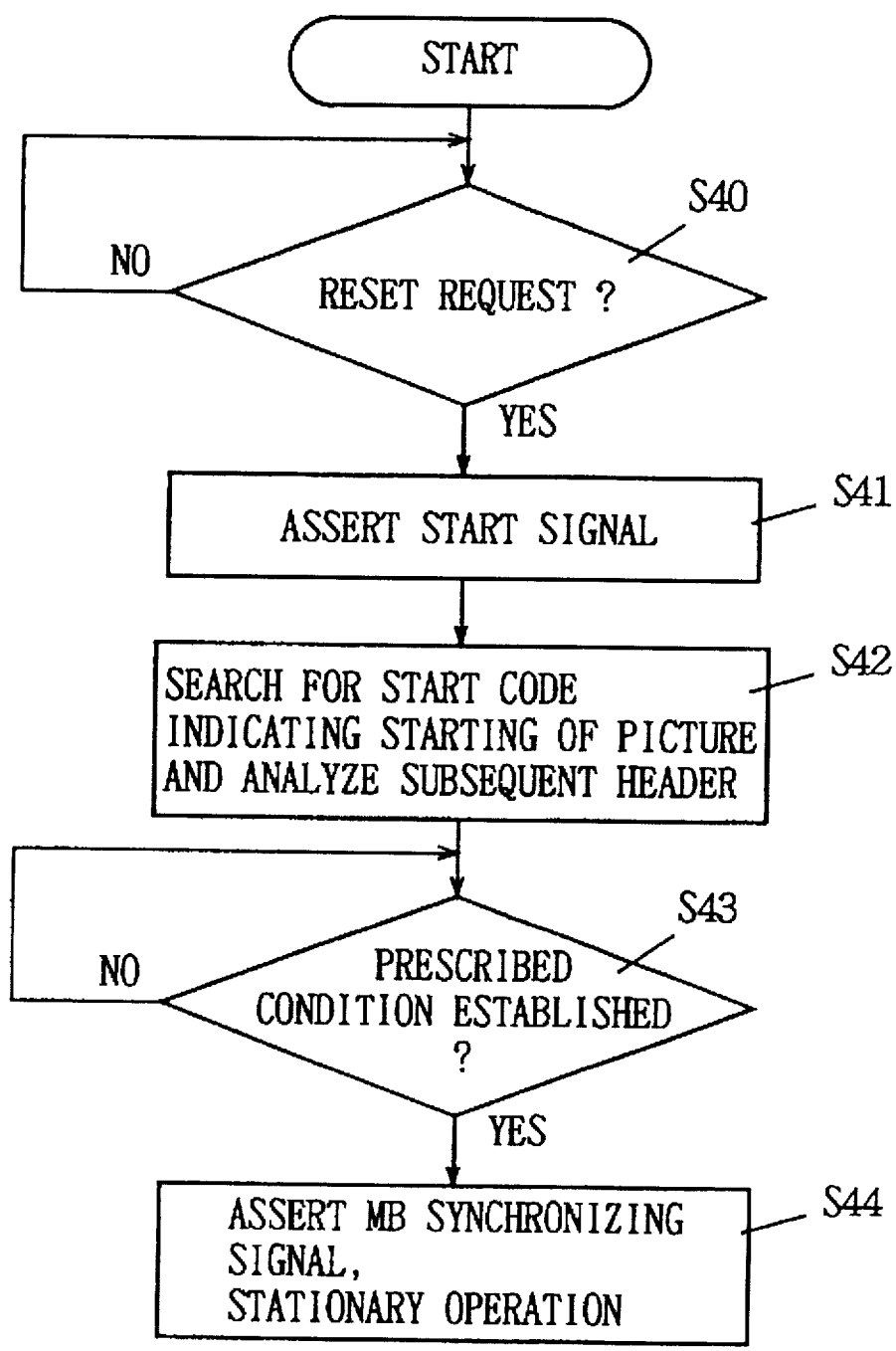
FIG. 25 is a flow chart representing an operation in resetting (initialization) of the picture decoding circuit according to the present invention.

FIG. 25 is a flow chart showing another initialization operation of the picture decoding circuit. This initialization operation of the picture decoding circuit according to the present invention is now described. In this initialization operation, the user newly designates picture display.

First, a determination is made as to whether or not a reset request (initialization instruction) is made (step S40). This reset request is generated from hardware or software (set of register values) in accordance with a picture display designation from the user.

When the reset request is made to designate display of a new picture, a start signal φACT (I) is asserted and supplied to the variable length decoder (see FIG. 15) since the picture decoding circuit carries out no picture data decoding operation at this time (step S41).

In response to the assertion of the start signal φACT (I), the variable length decoder searches for a sequence start code. A GOP start code, a picture start code and a slice start code are neglected. When a sequence start code is detected and a start code indicating starting of a picture is then detected, information of a header part following the start code is analyzed and header information of a segment of a macro block layer is analyzed (step S42). In the state of having analyzed this header information, establishment of prescribed conditions is waited (step S43). The prescribed conditions are identical to those described with reference to the step S35 in FIG. 24. Namely, the prescribed conditions are that a sufficient quantity of bit stream is stored in the rate buffer and a vertical synchronizing signal supplied from the external display control unit is asserted. When the prescribed conditions are established, the control unit asserts a picture synchronizing signal indicating starting of a picture, resets a counter indicating a macro block address included in its interior, asserts an MB synchronizing signal in synchronization with the picture synchronizing signal and makes the picture decoding circuit carry out a normal operation (step S44). Upon user's reset request, the assertion of the MB synchronizing signal is made in synchronization with the assertion of the picture synchronizing signal, whereby display picture data can be correctly read in synchronization with the vertical synchronizing signal, for example, supplied from the external control unit in the case of displaying a picture of a new sequence, and pixel decoding operations can be successively executed along the picture display.

The series of processing operations are executed by the initialization control circuit 14 shown in FIG. 16. The start signal φACT is so indicated that the same signal is asserted in a reset request designating restarting of display and in that designating initialization of display. However, these are different signals, and start codes to be searched in restarting and initialization are discriminated in response to the types of the start signals φACT, or φACT (R) and φACT (I).

Figure 26:
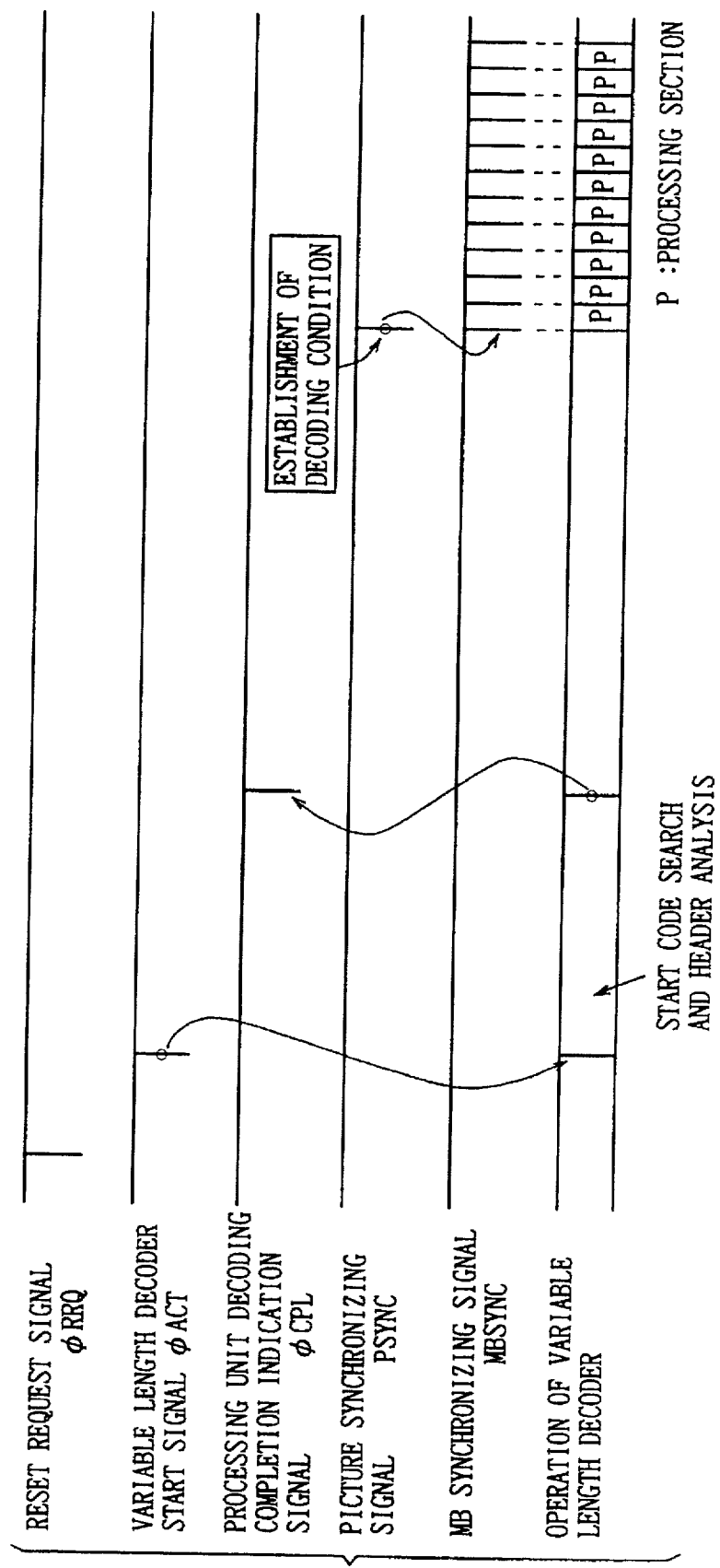
FIG. 26 illustrates an exemplary operation sequence in resetting of the picture decoding circuit according to the present invention.
Figure 27:
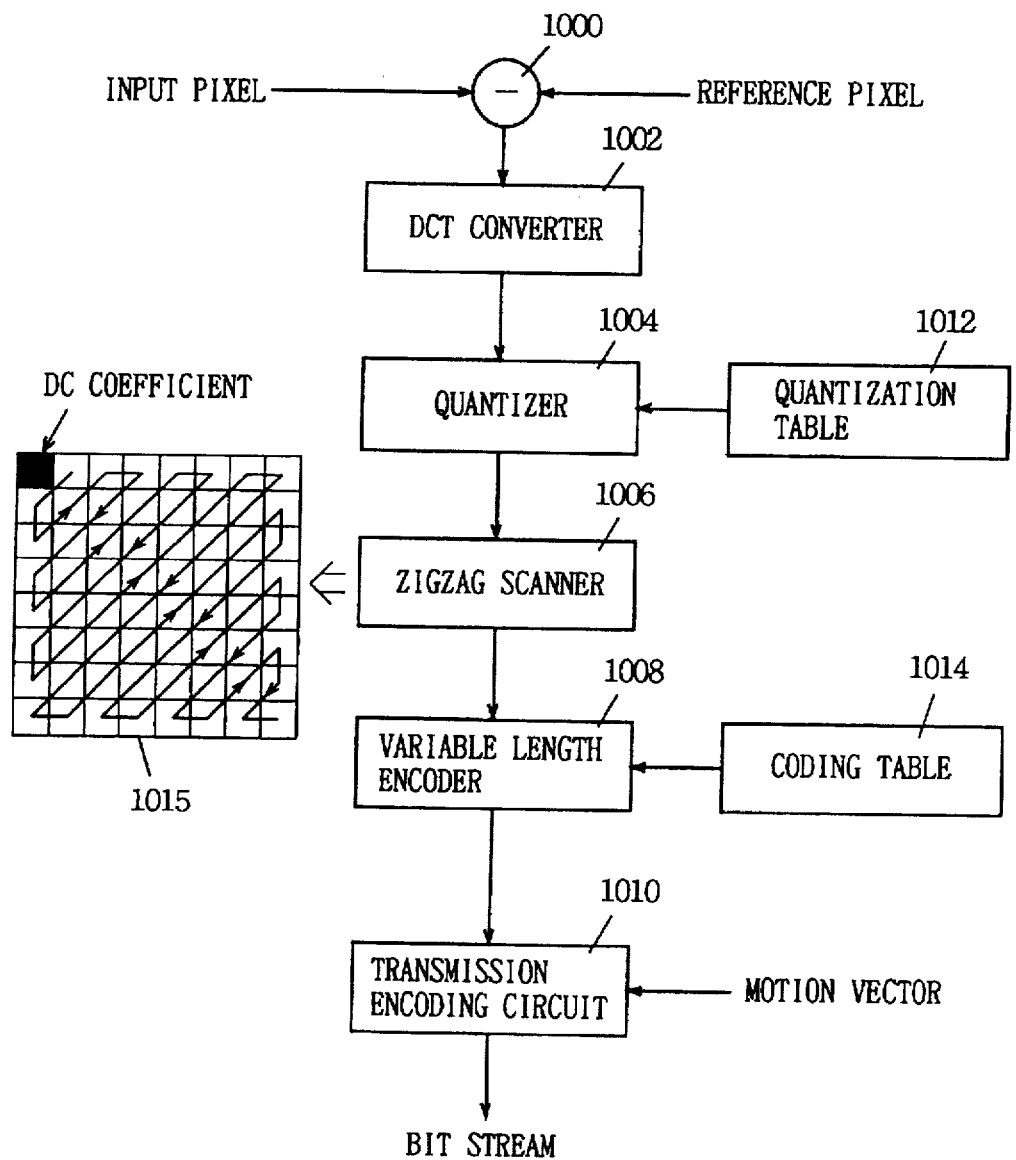
FIG. 27 illustrates a structure for generating a variable length code which the present invention processes.
Figure 28:
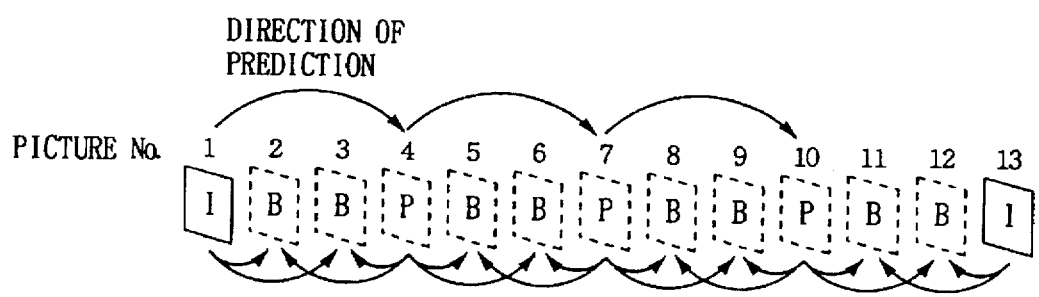
FIG. 28 illustrates a picture arrangement in a GOP layer utilized in a picture decoding circuit to which the present invention is applied.
Figure 29:
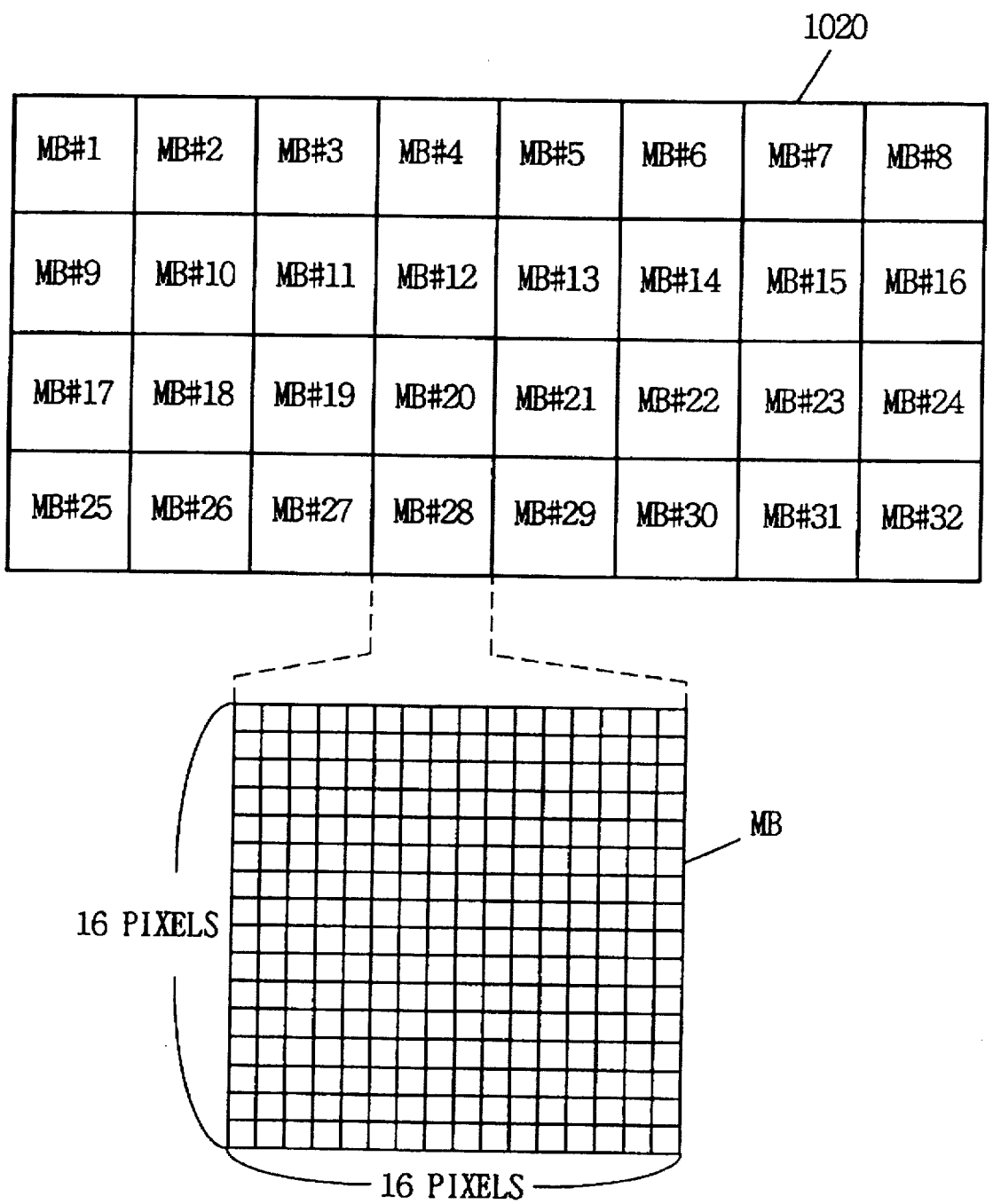
FIG. 29 illustrates the structure of picture data to which the present invention is applied.
Figure 30:
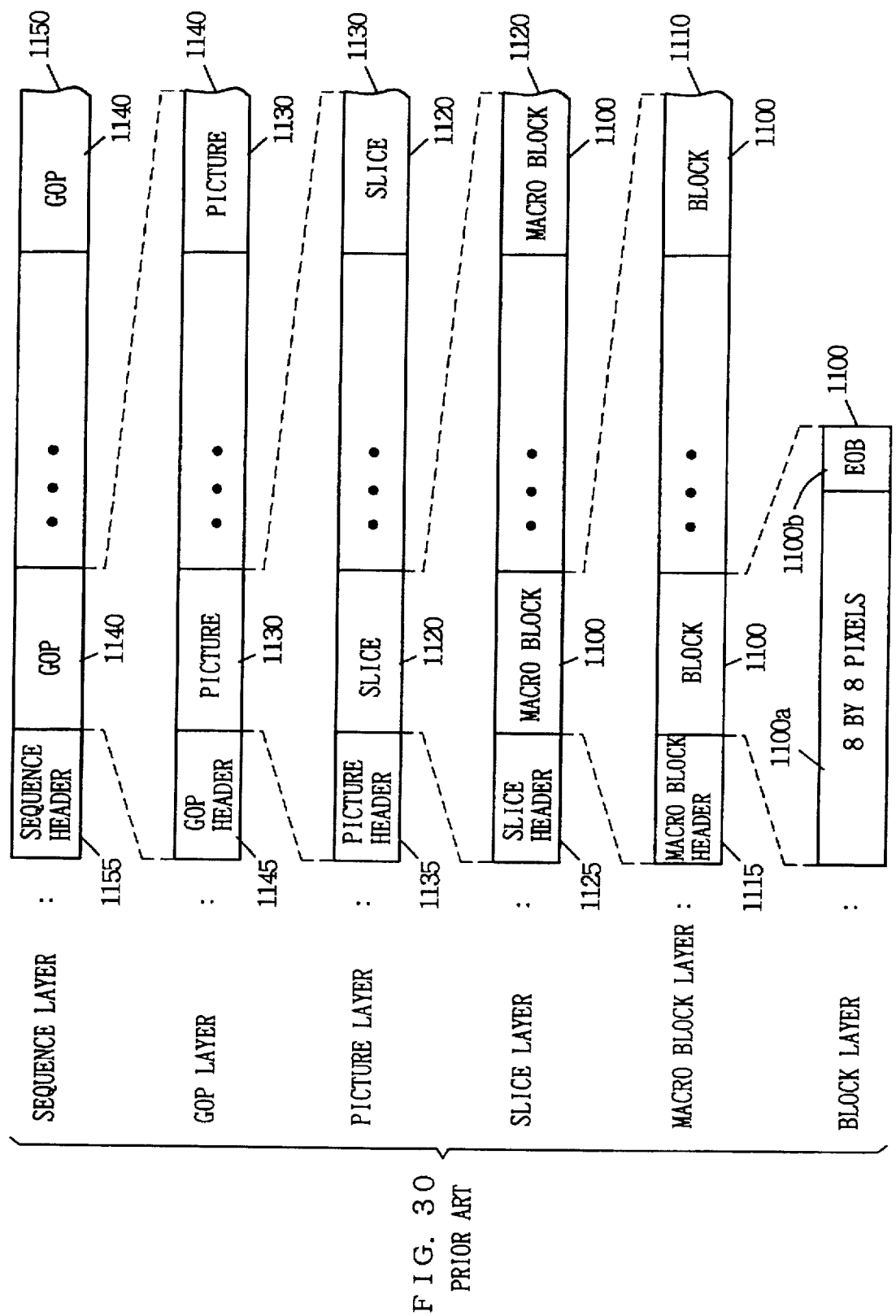
FIG. 30 illustrates the syntax of picture data to which the present invention is applied.
Figure 31:
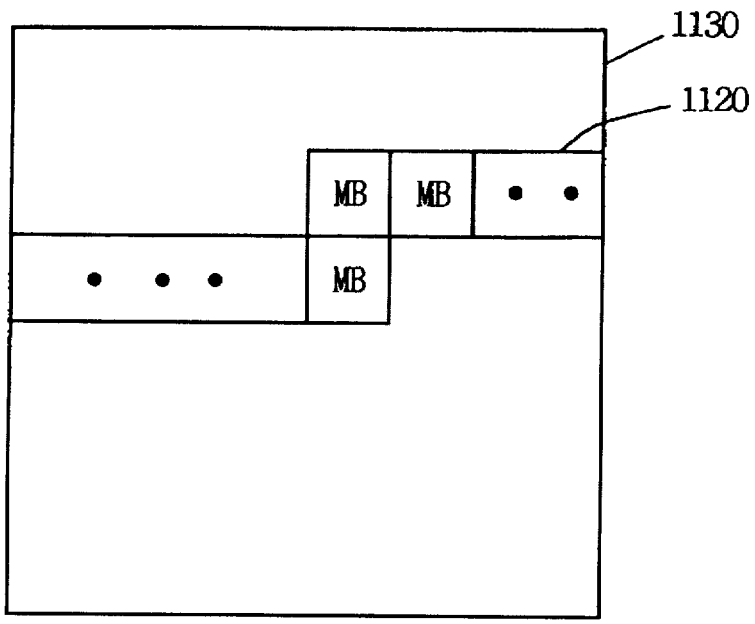
FIG. 31 illustrates a slice layer shown in FIG. 30.

FIG. 26 illustrates exemplary operations of the picture decoding circuit in a reset operation. This figure shows such a state that an initialization indication (reset indication) instructing picture display is supplied from the exterior, for example (see FIG. 25). In this state, no MB synchronization signal MBSYNC is asserted since the picture decoding circuit carries out no pixel decoding operation.

When a reset request signal φRRQ is asserted, the start signal φACT (I) is outputted (asserted) from the initialization control circuit shown in FIG. 16. In response to the assertion of the start signal φACT (I), the variable length decoder searches for a start code indicating starting of a picture of a sequence layer. In this search operation, data are read from the rate buffer under control by the control unit. If no bit stream is yet stored in the rate buffer but the bit stream first arrives upon generation of the reset request signal φRRQ, the control unit directly supplies the bit stream supplied through the FIFO interface to the variable length decoder, to make the same search a start code. The variable length decoder analyzes the start code detected by the start code detector (see FIG. 15) in the control part 6, detects the picture start code indicating the starting of the picture subsequently to the detection of the sequence start code, and analyzes header information subsequent to the detected picture start code. In restarting, a start code in a layer above a macro block layer is searched and header information is analyzed after detection thereof. When the header information of the segment of the macro block layer is completely analyzed, the variable length decoder asserts a processing unit decoding completion indication signal φCPL. In response to the assertion of the processing unit decoding completion indication signal φCPL, the control unit waits for establishment of prescribed conditions. When the prescribed conditions are established, i.e., when a sufficient quantity of bit stream is stored in the rate buffer and a vertical synchronizing signal is supplied, the control unit asserts the picture synchronizing signal PSYNC in its interior, while asserting the MB synchronizing signal MBSYNC in synchronization with this picture synchronizing signal PSYNC. In a first processing section, decoding of block data of the segment whose header information has been analyzed and analysis of header information following this segment are executed. Thereafter the MB synchronizing signal MBSYNC is asserted every time header information is analyzed in each processing section and prescribed conditions are established.

Due to the series of initialization or reset operations, decoding of block data of the segments can be reliably started in response to assertion of the MB synchronizing signal MBSYNC to implement high speed arithmetic processing also in a reset operation including an error return operation.

In the aforementioned embodiment, decoding processing of picture data (pixel data) decoded along the MPEG standard is described as an example of pixel data decoding processing. However, the present invention is applicable also where processing is made in units of data blocks having certain sizes of variable length codes in place of the MPEG standard pixel data, if header information is provided in a form of variable length codes for the block data. Further, the present invention is also applicable to data subjected to orthogonal transformation other than DCT processing.

Principal features of the present invention are as follows:

(1) Header information is analyzed following processing of a data block in one processing section, and data processing starting is done after all analysis of the header information is completed. One processing section is started in decoding of the data block and ended in analysis of the header information. When starting of the data processing is designated, therefore, each operational processor can immediately execute its processing, whereby utilization efficiency of the operational processors is improved and the data processing can be executed at a high speed. Further, the standby time of the operational processor is reduced, whereby the time period of one processing section can be reduced.

(2) The time period of the processing section is changed in accordance with the result of analysis of the header information. The time period of the processing section can be changed depending on the attributes of the segment to be processed and the optimum length of the processing section can be set in accordance with the attributes of the segment to be processed. It is possible to prevent such a malfunction that a next processing section is started before completion of one processing section, which may be caused in the case of a processing section of a fixed length time, and picture data can be efficiently and correctly processed.

(3) Access to an external memory is executed in parallel with decoding of data block data. An influence exerted on pixel data decoding processing by the access to the external memory can be eliminated, and the processing time can be reduced. Further, necessary data can be efficiently supplied to a data processing part with no destruction of data required for pipeline processing in data processing part by carrying out the access to the external memory successively in order of writing of restored data, writing of an incoming bit stream, reading of display picture data, reading of predictive picture data and reading of the bit stream.

(4) When an error occurs in a header information analyzing process or a variable length decoding process, a start code having a prescribed pattern is detected and header information of a segment following the start code is analyzed so that processing of a data block subsequent to the analyzed header information is delayed until prescribed conditions are satisfied after completion of the analysis. Processing can be started at a segment having no influence by an error in starting of processing in error generation, while the processing is started from decoding of the data block also in this processing starting upon error generation, whereby reduction of utilization of each operational processor included in data processing part can be suppressed also after recovery from the error, and data processing can be executed at a high speed.

(5) A pipeline is formed having one processing unit of a processing section correspond to a segment. Reduction of utilization efficiency of a computing element of each pipeline can be suppressed to the minimum and high-speed data processing is enabled. Further, one processing unit (segment) can be shared by a plurality of processing sections in a pipeline manner due to pipeline stages, whereby the time period for the processing section can be reduced and high-speed data processing is enabled.

(6) The pipeline stages are formed into a four-stage pipeline structure in units of segments in accordance with the content of the processing. It is possible to execute a pipeline operation with the minimum wait time of each operational processor even if the time period of the processing section varies, whereby high-speed data processing can be carried out. Due to the pipeline structure, further, header information can be analyzed in parallel with data processing, whereby the time period for the processing section can be reduced and high-speed data processing is implemented.

(7) In error processing, block data of a segment precedent to that having an error detected are repaired in the pipeline stage, with delay of the pipeline stage efficiently utilized, an error repair operation can be made on the segment having the error caused, and deterioration in quality of a decoded picture caused by mixing of an error bit can be suppressed.

(8) When a reset request is made, a start code having a prescribed pattern is searched and a processing start indication signal is asserted when prescribed conditions are established after header information of a segment following the start code is entirely analyzed, to execute processing of the data block of this segment. Processing can be reliably executed from the starting of a picture also in resetting while each operational processor can be immediately driven in response to the processing starting to carry out data processing, whereby high speed processing can be carried out.

(9) Data decoding processing is started in synchronization with an externally supplied picture synchronizing signal (vertical synchronizing signal) indicating starting of a picture. Also in resetting, a correct pixel data processing operation and reading of display picture data can be carried out by establishing synchronization with the synchronizing signal supplied from an external control unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A picture decoding circuit for expanding a moving picture compressed in accordance with a predetermined procedure in units of segments of prescribed sizes, each said segment having a data block including data to be processed and a header having information indicating an attribute of said data of said data block, said picture decoding circuit comprising:

header decoding means receiving a bit stream including said segments and indicating moving picture information for extracting and analyzing said information of said header of a segment and forming information indicating a processing to be subsequently executed;

control means generating a data processing start indication signal in response to a completion signal from said header decoding means indicating completion of said analysis of said information of said header of said segment; and data processing means coupled to receive said bit stream and activated in response to said data processing start indication signal for executing processing of a data block following said header of said segment in accordance with the result of said analysis by said header decoding means, said header decoding means analyzing information of a header supplied in continuation without interruption to each said segment, continuously without interruption to processing of a precedent segment to generate said completion signal.

2. The picture decoding circuit according to claim 1, wherein said control means includes drive means coupled to receive said completion signal and responsive to assertion of said completion signal for determining whether a predetermined condition is met and asserting said data processing start indication signal when said predetermined-condition is met in accordance with the result of determination.

3. The picture decoding circuit according to claim 1, wherein said data processing start indication signal determines a period for processing a segment.

4. The picture decoding circuit according to claim 2, further comprising an external memory for storing data of said bit stream, data processed by and supplied form said data processing means, and wherein said control means comprises drive means for identifying that no access is made to said external memory and that a preset time is elapsed since a precedent assertion of said data processing start indication signal when said completion signal being asserted is applied.

5. The picture decoding circuit according to claim 1, wherein said control means includes a timer activated in response to said data processing start indicating signal being asserted for counting a time up to a preset time, and an operation driver coupled to receive the completion signal from said header decoding means for asserting said data process start indicating signal in response to assertion of said completion signal, conditioned that at least said timer generates a time up signal indicating that the count of time attains said preset time.

6. The picture decoding circuit according to claim 5, wherein said timer has said preset time variable.

7. The picture decoding circuit according to claim 5, wherein said control means includes means coupled to receive the information of the header from said header decoding means, for changing said preset time in accordance with the received information of the header.

8. The picture decoding circuit in accordance with claim 1, wherein said compressed moving picture includes pixel data subjected to a prediction encoding, said data processing means includes means carrying out expansion processing inverse to said prediction encoding on said data of said data block for restoring original pixel data, and said control means includes access means for sequentially executing storage of said restored pixel data from said data processing means in an externally provided memory device, writing of data of said bit stream into the memory device, reading of data to be displayed among said restored pixel data from said memory device, and reading of predictive picture pixel data required for restoration of pixel data into said data processing means in a prescribed order in said unit processing section in response to said data processing start indication signal being asserted.

9. The picture decoding circuit according to claim 8, wherein said access means executes said storage, said writing and said reading within a period between successive assertion of said data process start indicating signal.

10. The picture decoding circuit according to claim 8, wherein said access means executes, in response to assertion of said data process start indicating signal, storage of the restored pixel data into the memory device, the writing of data of the bit stream into said memory device, reading of data to be displayed from said memory device, the reading data of the predictive pixel data from said memory device into said data processing means, and reading of data of the bit stream from said memory device into said data processing means successively in this described order.

11. The picture decoding circuit in accordance with claim 1, wherein said data processing means includes a plurality of pipeline stages processing in a pipeline manner on said segments, with each pipeline stage responsible for one segment.

12. The picture decoding circuit in accordance with claim 11, wherein said pipeline stages include:

a first pipeline stage for carrying out loading of predictive picture data from a memory device, variable length decoding of an orthogonal transformation coefficient of said data block and inverse quantization thereof, a second pipeline stage for forming a predictive picture from said loaded predictive picture pixel data, a third pipeline stage for carrying out inverse orthogonal transformation processing of said inverse quantized pixel data and restoration of said pixel data of said data block from said predictive picture pixel data and said inverse orthogonal transformation processed pixel data, and a fourth pipeline stage for writing said restored pixel data in said memory device.

13. The picture decoding circuit in accordance with claim 11, further comprising means carrying out a prescribed error repair processing in said pipeline stages from a data block of a segment positioned in front of a segment having said error detected in processing order in said data processing means, in response to an error detection signal generated from said control means.

14. The picture decoding circuit according to claim 1, wherein said data processing means includes a variable length decoder for variable length decoding data of said data block to generate fixed length data, an inverse quantizer coupled to receive said fixed length data for inverse-quantizing the received fixed length data, a scan converter coupled to said inverse quantizer for converting a scan order of the received inverse-quantized fixed length data into a raster scan order, an inverse orthogonal transformer coupled to said scan converter for performing a predetermined orthogonal transformation on data received from said scan converter, and a pixel reconfigurator coupled to said inverse orthogonal transformer for performing a predetermined operation on data received from said inverse orthogonal transformer to restore original pixel data, wherein said variable length decoder, said inverse quantizer, said scan converter, said inverse orthogonal transformer and said pixel reconfigurator are activated to start respective processings in response to assertion of said data processing start indicating signal.

15. The picture decoding circuit according to claim 14, wherein said header decoding means includes analyzing means performing the analyzing of the information of the header of a subsequent segment in parallel with processing operation of a current segment in at least said inverse quantizer, after completion of processing of the data block of said current segment in said variable length decoder.

16. The picture decoding circuit according to claim 14, further comprising an error detector coupled to said header decoding means and said data processing means for detecting an error generated in said header decoding means and said data processing means to assert an error detect signal, and wherein said control means includes an error process means coupled to receive said error detect signal for asserting an error processing signal, and wherein said scan converter includes error conceal means for storing error concealment data and for supplying the error concealment data to said inverse orthogonal transformer in response to the assertion of said error processing signal.

17. The picture decoding circuit according to claim 16, wherein said scan converter includes, decoder means coupled to receive data from the inverse quantizer for reordering a sequence of data into the raster scan order on a unit of the segment, average/storage means coupled to receive data from said reorder means for obtaining an average value of received data on a unit of segment for storage, and selection means coupled to receive data of said reorder means and said average/storage means for selecting and passing data received from said average/storage means in response to assertion of said error processing signal onto said inverse orthogonal transformer.

18. The picture decoding circuit according claim 17, wherein said average/storage means includes storage means for storing average data of the segments worthy amount of one line of the screen in a first-in first out fashion.

19. The picture decoding circuit according to claim 17, wherein said pixel reconfigurator includes a selection means in response to assertion of said error processing signal for selecting and passing data received from said inverse orthogonal transformer as said restored pixel data.

20. The picture decoding circuit according to claim 16, further comprising, start code detection means coupled to receive said bit stream and to said error detector, for detecting a start code of a predetermined pattern in the received bit stream to generate a start code detection signal in response to the assertion of said error detect signal, and wherein said control means includes means responsive to the assertion of said start code detection signal for deasserting said error processing signal when a predetermined condition is met.

21. The picture decoding circuit according to claim 20, wherein said bit stream includes said start code followed by the header information including an address indicating a segment at which return from the error is made, and wherein said control means includes means receiving said address and said completion signal from said header decoding means and the start code detecting signal, for determining that said predetermined condition is met when said address indicates a segment to be processed in response to a next assertion of the process start indicating signal and said completion signal and said start code detecting signal are asserted.

22. The picture decoding circuit according to claim 21, wherein said predetermined condition further includes that a predetermined time is elapsed since a precedent assertion of the process start indicating signal, no access is made to an external memory storing bit stream data and restored pixel data, and the bit stream data is supplied from the external memory to the data processing means.

23. The picture decoding circuit according to claim 1, further comprising start code detector coupled to receive the bit stream for detecting a start code of a predetermined pattern, said start code being followed by the header information in the bit stream, and wherein said control means further comprises, initialization means responsive to a reset request signal for maintaining said data processing start indicating signal deasserted and for asserting a start signal onto said start code detector to cause said start code detector to search for the start code, said start signal also applied to said header decoding means to cause the header decoding means to analyze information of a header following the start code, and driving means responsive to a start code detecting signal being asserted from said start code detector and the completion signal from the header decoding means, for asserting said data processing start indication signal.

24. The picture decoding circuit according to claim 23, further comprising an external memory for storing data of the bit stream and pixel data restored by said data processing means, and wherein said control means further comprises bus controller coupled to said external memory, for monitoring an access to said external memory and transfer of data between said external memory and said data processing means, timer coupled to said drive means and responsive to assertion of said data processing start indication signal for counting a time up to a preset time to generate a time-up signal when the count reaches the preset time, and said drive means includes means coupled to said bus controller and said timer and to receive a picture synchronization signal providing a timing of displaying a picture on a display screen, and responsive to said bus controller indicating that data of bit stream is transferred from said external memory to said data processing means and that no access is made to said external memory and to said time-up signal being asserted and to said picture synchronization signal being asserted for causing said data processing start indicating signal to be asserted when said start code detecting signal and said completion signal both are asserted.

25. The picture decoding circuit according to claim 23, wherein said drive means includes means for delaying the assertion of said start signal until said data processing means completes the processing on data of a segment applied when said reset signal is asserted.

26. The picture decoding circuit according to claim 24, wherein said drive means further responds to said bus controller indicating that at least a predetermined amount of data of the bit stream is stored in said external memory and that at least another predetermined amount of data of bit stream is transferred from said external memory to said data processing means.

27. A picture decoding circuit for expanding a moving picture compressed in accordance with a predetermined procedure in units of segments of prescribed sizes for restoring decompressed picture data, said compressed moving picture being variable length encoded, each said segment having a data block including data to be processed and a header having information indicating attributes of said data of said data block, said picture decoding circuit including:

data processing means comprising (i) analysis means for detecting a header from a supplied bit stream and analyzing information of said header including means generating a signal indicating completion of analysis of all said header information, (ii) variable length decoding means for variable length decoding pixel data of a data block of said segment in accordance with the result of said analysis of said analysis means and forming fixed length pixel data and restoring said pixel data of said data block to decompressed pixel data;

detect means coupled to said analysis means and said variable length decoding means for generating an error detection signal indicating an error when said error is detected in processing of said analysis means and said variable length decoding means;

code search means coupled to said detect means for searching for a code having a predetermined pattern from incoming said bit stream in response to said error detection signal;

activation means coupled to said code search means for activating said analysis means in response to code detection by said code search means; and means delaying execution of processing of a data block following a header following the code by said data processing means till establishment of a prescribed condition in response to an analysis completion indication signal indicating completion of analysis of said information of said header from said analysis means.

28. The picture decoding circuit in accordance with claim 27, wherein said data processing means includes a plurality of pipeline stages performing processing in a pipeline manner with said segments as processing units, wherein one pipeline stage is responsible for each said segment.

29. The picture decoding circuit in accordance with claim 28, wherein said pipeline stages include:

a first pipeline stage for carrying out loading of predictive picture data from a memory device, variable length decoding of an orthogonal transformation coefficient of said data block followed by inverse quantization thereof, a second pipeline stage for forming a predictive picture from said loaded predictive picture pixel data, a third pipeline stage for carrying out inverse orthogonal transformation processing of the inverse quantized pixel data and restoration of said pixel data of said data block from said predictive picture pixel data and said inverse orthogonal transformation processed pixel data, and a fourth pipeline stage for writing said restored pixel data in said memory device.

30. The picture decoding circuit in accordance with claim 28, further comprising means responsive to an error detection signal for carrying out prescribed error repair processing in said pipeline stages from a data block of a segment being positioned in front of a segment at which said error is detected in a processing order in said data processing means.

31. A picture decoding circuit for expanding a moving picture compressed in accordance with a predetermined procedure in units of segments of prescribed sizes for restoring decompressed picture pixel data, said compressed moving picture being variable length encoded, each said segment having a data block including pixel data following a header indicating attributes of said data block, said picture decoding circuit including:

analysis means coupled to receive a bit stream for analyzing information included in a header of a segment included in the supplied bit stream;

data processing means including variable length decoding means for performing variable length decoding processing on data of a data block following the header in accordance with the result of said analysis of said analysis means, for restoring said data of said data block to original picture data;

search means for searching for a code having a prescribed pattern in the supplied said bit stream in response to said start signal;

means generating a start signal for starting said search means in response to a reset request signal;

means for activating said analysis means in response to detection of said code by said search means; and means delaying execution of processing of a data block following a header following said code by said data processing means till establishment of a prescribed condition in response to an analysis completion indication signal indicating completion of analysis of said information of said header from said analysis means.

32. The picture decoding circuit in accordance with claim 31, wherein said prescribed condition is application of a synchronizing signal indicating a start point of a picture to be displayed.

* * * * *